(12) United States Patent
Miyauchi et al.

(10) Patent No.: US 10,761,859 B2
(45) Date of Patent: Sep. 1, 2020

(54) INFORMATION PROCESSING SYSTEM, MANAGEMENT DEVICE, AND METHOD FOR CONTROLLING INFORMATION PROCESSING SYSTEM

(71) Applicant: FUJITSU LIMITED, Kawasaki-shi, Kanagawa (JP)

(72) Inventors: Keiji Miyauchi, Yokohama (JP); Asumi Ono, Ota (JP); Takuji Nakamura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 69 days.

(21) Appl. No.: 15/982,679

(22) Filed: May 17, 2018

(65) Prior Publication Data
US 2018/0336046 A1     Nov. 22, 2018

(30) Foreign Application Priority Data
May 19, 2017   (JP) ................................ 2017-099677

(51) Int. Cl.
    *G06F 9/455*     (2018.01)
    *G06F 9/445*     (2018.01)
    *G06F 9/4401*     (2018.01)

(52) U.S. Cl.
    CPC ...... *G06F 9/44505* (2013.01); *G06F 9/45558* (2013.01); *G06F 9/4411* (2013.01);
(Continued)

(58) Field of Classification Search
CPC ............. G06F 11/1662; G06F 11/2069; G06F 9/44505; G06F 9/45558; H04L 41/0889; H04L 67/1002; H04L 67/1008
See application file for complete search history.

(56) References Cited

U.S. PATENT DOCUMENTS

| | | | |
|---|---|---|---|
| 9,590,854 B1* | 3/2017 | Shekhar | .............. H04L 41/0873 |
| 2003/0069972 A1* | 4/2003 | Yoshimura | .......... H04L 12/4645 |
| | | | 709/226 |

(Continued)

FOREIGN PATENT DOCUMENTS

| | | |
|---|---|---|
| JP | 2008-146566 | 6/2008 |
| WO | 97035255 | 9/1997 |

(Continued)

*Primary Examiner* — Dong U Kim
(74) *Attorney, Agent, or Firm* — Fujitsu Patent Center

(57) ABSTRACT

An information processing system comprising a plurality of electronic devices each including a processing unit that changes a configuration of a device, in which the processing unit itself is included, and a management device that manages the plurality of electronic devices, wherein the management device includes a collecting unit that collects present configuration information of the information processing system, a storage unit that stores first configuration definition information indicating a present configuration of the information processing system on the basis of the configuration information collected by the collecting unit and second configuration definition information indicating an input-configuration after the change of the information processing system, and a control unit that generates control information on the basis of difference information between the first configuration definition information and the second configuration definition information and transmits the generated control information to the processing unit included in each of the plurality of electronic devices.

9 Claims, 51 Drawing Sheets

(52) U.S. Cl.
CPC .............. *G06F 2009/45562* (2013.01); *G06F 2009/45579* (2013.01); *G06F 2009/45583* (2013.01)

(56) References Cited

U.S. PATENT DOCUMENTS

| | | | |
|---|---|---|---|
| 2008/0162800 A1* | 7/2008 | Takashige | G06F 9/5077 711/104 |
| 2009/0288084 A1* | 11/2009 | Astete | G06F 9/45533 718/1 |
| 2013/0235519 A1 | 9/2013 | Miyauchi | |
| 2014/0047441 A1* | 2/2014 | Miyauchi | G06F 11/2005 718/1 |
| 2015/0229546 A1* | 8/2015 | Somaiya | H04L 43/045 715/736 |
| 2016/0112252 A1* | 4/2016 | Notari | H04L 41/0843 709/221 |
| 2017/0060705 A1* | 3/2017 | Sridhara | G06F 11/1662 |

FOREIGN PATENT DOCUMENTS

| | | |
|---|---|---|
| WO | 2012053115 | 4/2012 |
| WO | 2012176278 | 12/2012 |

* cited by examiner

FIG.5

D1 SERVER CONFIGURATION DEFINITION INFORMATION

| USER | | | VIRTUAL SERVER | | | | | | VIRTUAL DISK | | | | VIRTUAL NETWORK | | |
|---|---|---|---|---|---|---|---|---|---|---|---|---|---|---|---|
| USER NAME | USER ID | STATUS | HOST NAME | VIRTUAL SERVER NAME | PHYSICAL SERVER NAME (HYPERVISOR) | CLUSTER GROUP | TYPE | SERVER TYPE | OS_type | ID | Disk NAME | Disk_type | ... | Port | VIRTUAL NETWORK SWITCH NAME | V-LAN |
| AA CORPORATION | 0001 | NEW | AAA | Dom0001 | HW001 | A | REDUNDANT | 2 | OS11u3 | 1101 | vd-1101 | SHARED | ... | Vnet001 | vNex2 | 1101 |
| AA CORPORATION | 0001 | NEW | AAB | Dom0002 | HW002 | B | REDUNDANT | 2 | OS11u3 | 1101 | vd-1101 | SHARED | ... | Vnet001 | vNex2 | 1101 |
| BB CORPORATION | 0002 | OPERATING | CCC | Dom0003 | HW003 | - | SINGLE | 1 | OS11u2 | 1002 | vd-1002 | SINGLE | ... | Vnet002 | vNex1 | 3101 |
| ... | | | | | | | | | | | | | | | | |

D2 NETWORK CONFIGURATION DEFINITION INFORMATION

| USER | | | NETWORK SWITCH DEVICE NAME | Port | CONNECTION DESTINATION SERVER | Type | VLAN |
|---|---|---|---|---|---|---|---|
| USER NAME | USER ID | STATUS | | | | | |
| BB CORPORATION | 0002 | OPERATING | Nex1 | 010 | HW003 | Tag | 3101 |
| AA CORPORATION | 0001 | NEW | Nex2 | 010 | HW001 | Tag | 1101 |
| AA CORPORATION | 0001 | NEW | Nex2 | 011 | HW002 | Tag | 1101 |
| ... | | | | | | | |

D3 STORAGE CONFIGURATION DEFINITION INFORMATION

| USER | | | STORAGE DEVICE NAME | LUN | | | | volume | | | |
|---|---|---|---|---|---|---|---|---|---|---|---|
| USER NAME | USER ID | STATUS | | LUN GROUP (CONNECTION GROUP) NAME | Lun NUMBER | RAID GROUP | | Vol NUMBER | Vol NAME | | SIZE |
| AA CORPORATION | 0001 | NEW | ET200-1 | Dom0001 | 1101 | RG#020 | | 1101 | vd-1101 | | 1TB |
| AA CORPORATION | 0001 | NEW | ET200-1 | Dom0002 | 1101 | RG#020 | | 1101 | vd-1101 | | 1TB |
| BB CORPORATION | 0002 | OPERATING | ET200-2 | Dom0003 | 1002 | RG#000 | | 1002 | vd-1002 | | 120GB |
| ... | | | | | | | | | | | |

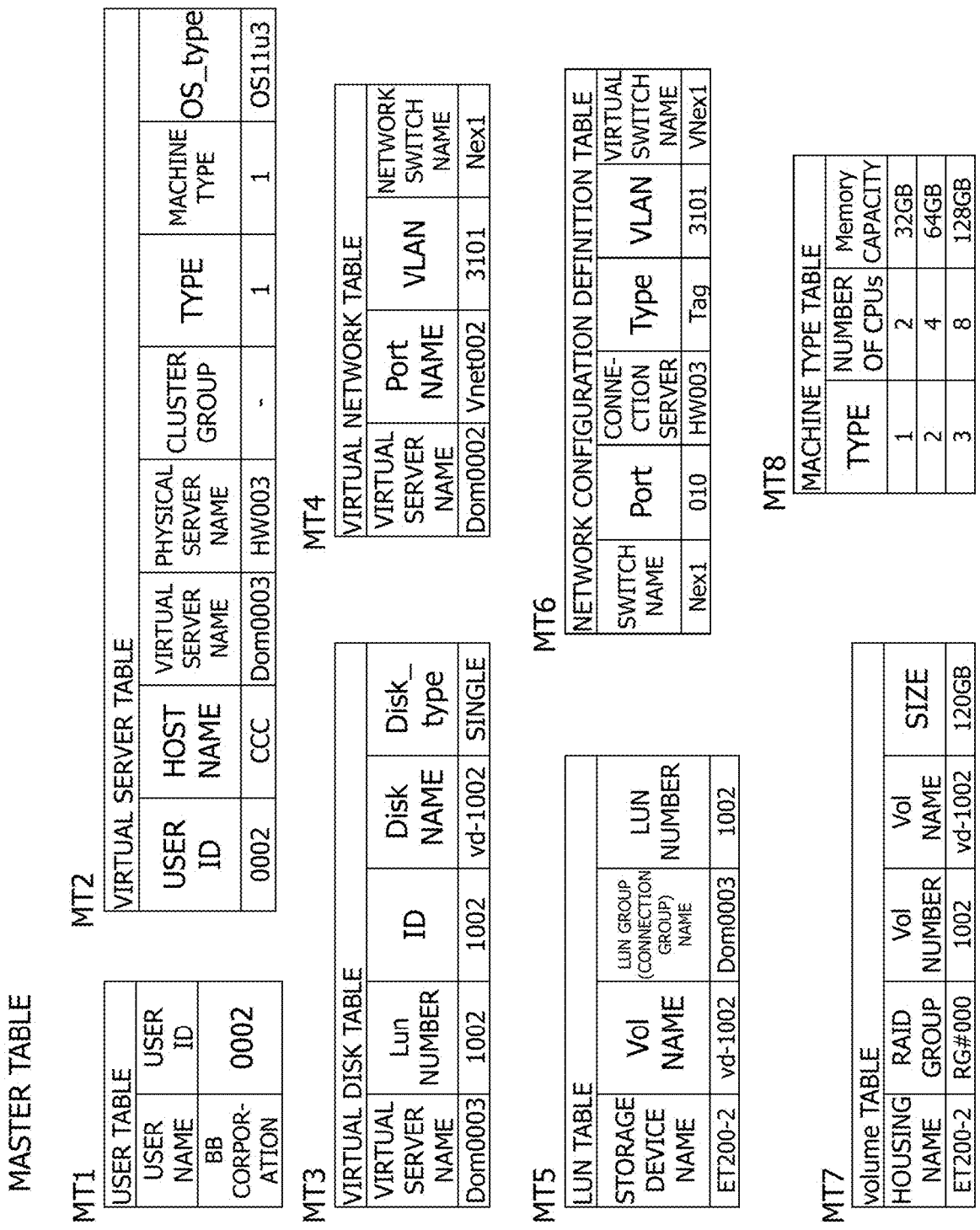

FIG.7

WORK TABLE

WT1 USER TABLE

| USER NAME | USER ID |
|---|---|
| AA CORPORATION | 0001 |

WT2 VIRTUAL SERVER TABLE

| USER ID | HOST NAME | VIRTUAL SERVER NAME | PHYSICAL SERVER NAME | CLUSTER GROUP | TYPE | MACHINE TYPE | OS_type |
|---|---|---|---|---|---|---|---|
| 0001 | AAA | Dom0001 | HW001 | A | REDUNDANT | 2 | OS11u3 |
| 0001 | AAB | Dom0002 | HW002 | B | REDUNDANT | 2 | OS11u3 |

WT3 VIRTUAL DISK TABLE

| VIRTUAL SERVER NAME | Lun NUMBER | ID | Disk NAME | Disk_type |
|---|---|---|---|---|
| Dom0001 | 1101 | 1101 | vd-1101 | SHARED |
| Dom0002 | 1101 | 1101 | vd-1101 | SHARED |

WT4 VIRTUAL NETWORK TABLE

| VIRTUAL SERVER NAME | Port NAME | VLAN | NETWORK SWITCH NAME |
|---|---|---|---|
| Dom0001 | Vnet001 | 1101 | Nex2 |
| Dom0002 | Vnet001 | 1101 | Nex2 |

WT5 LUN TABLE

| STORAGE DEVICE NAME | Vol NAME | LUN GROUP (CONNECTION GROUP) NAME | LUN NUMBER |
|---|---|---|---|
| ET200-1 | vd-1101 | Dom0001 | 1101 |
| ET200-1 | vd-1101 | Dom0002 | 1101 |

WT6 NETWORK CONFIGURATION DEFINITION TABLE

| SWITCH NAME | Port | CONNECTION SERVER | Type | VLAN | VIRTUAL SWITCH NAME |
|---|---|---|---|---|---|
| Nex2 | 010 | HW001 | Tag | 1101 | VNex2 |
| Nex2 | 011 | HW002 | Tag | 1101 | VNex2 |

WT7 volume TABLE

| HOUSING NAME | RAID GROUP | Vol NUMBER | Vol NAME | SIZE |
|---|---|---|---|---|
| ET200-1 | RG#020 | 1101 | vd-1101 | 1TB |
| ET200-1 | RG#020 | 1101 | vd-1101 | 1TB |

FIG.8 COMMANDS RELATED TO VIRTUAL SERVER CREATION i1
virtual server creation: ssh <management user>@<physical server name>
ldm add-domain <virtual server name> i2
CPU addition: ssh <management user>@<physical server name>
ldm set-core <number of cores> <virtual server name> i3
Memory addition: ssh <management user>@<physical server name>
ldm set-memory <capacity> <virtual server name> i4
virtual disk addition: ssh <management user>@<physical server name>ldm add-vdsdev <LUN> <virtual disk name>@<virtual disk service name>
; ssh <management user>@<physical server name> ldm add-vdisk <virtual disk name> <virtual disk name>@<virtual disk service name> <virtual server name> i5
virtual network addition: ssh <management user>@<physical server name>
ldm add-vnet pvid=<VLAN ID> <virtual network port name><virtual switch name>
<virtual server name> i6
multipath driver addition: ssh <management user>@<physical server name> grmpdautoconf

FIG.9

COMMANDS RELATED TO VOLUME CREATION i7: volume creation: ssh <management user>@<storage device name> create volume -name <volume name> <RAID group name>-size <size> -volume-number <volume number> i8: LUN group mapping: ssh <management user>@<storage device name> set lun-group -lg-name <LUN group name> -volume-name <volume name> -lun <lun number>

FIG.10

COMMANDS RELATED TO VLAN CREATION i9
VLAN creation: ssh <management user>@<network switch name> vlan <VLAN ID> i10
VLAN ADDITION: ssh <management user>@<network switch name> interface <port>
: ssh <management user>@<network switch name> switch mode trunk
: ssh <management user>@<network switch name> switch trunk allowed vlan add <VLAN ID>

FIG.12
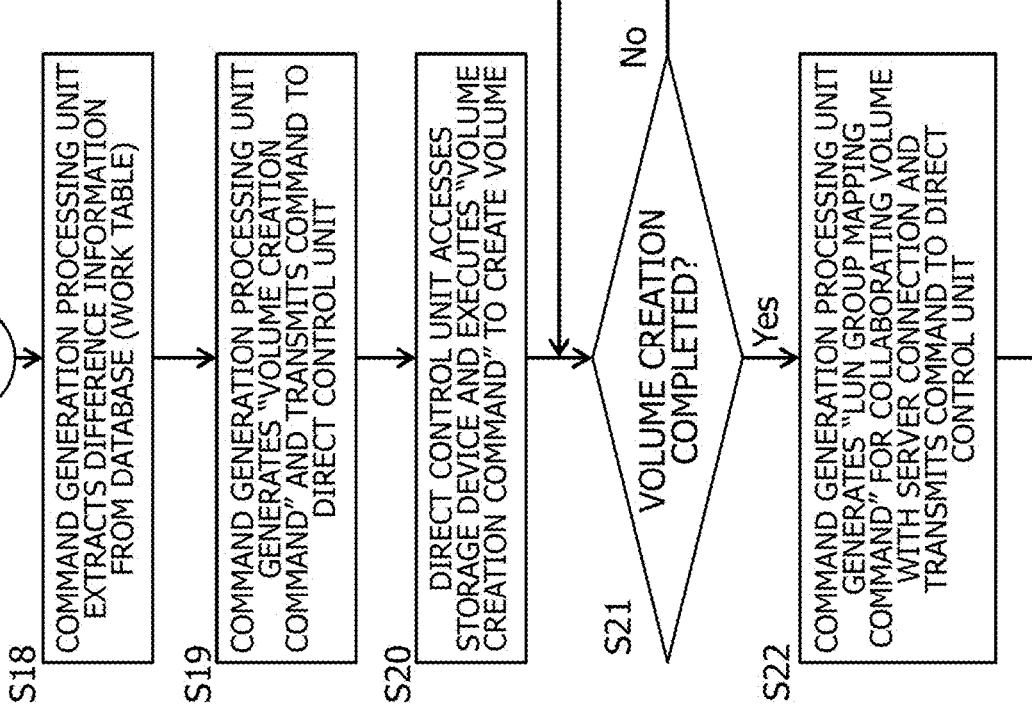
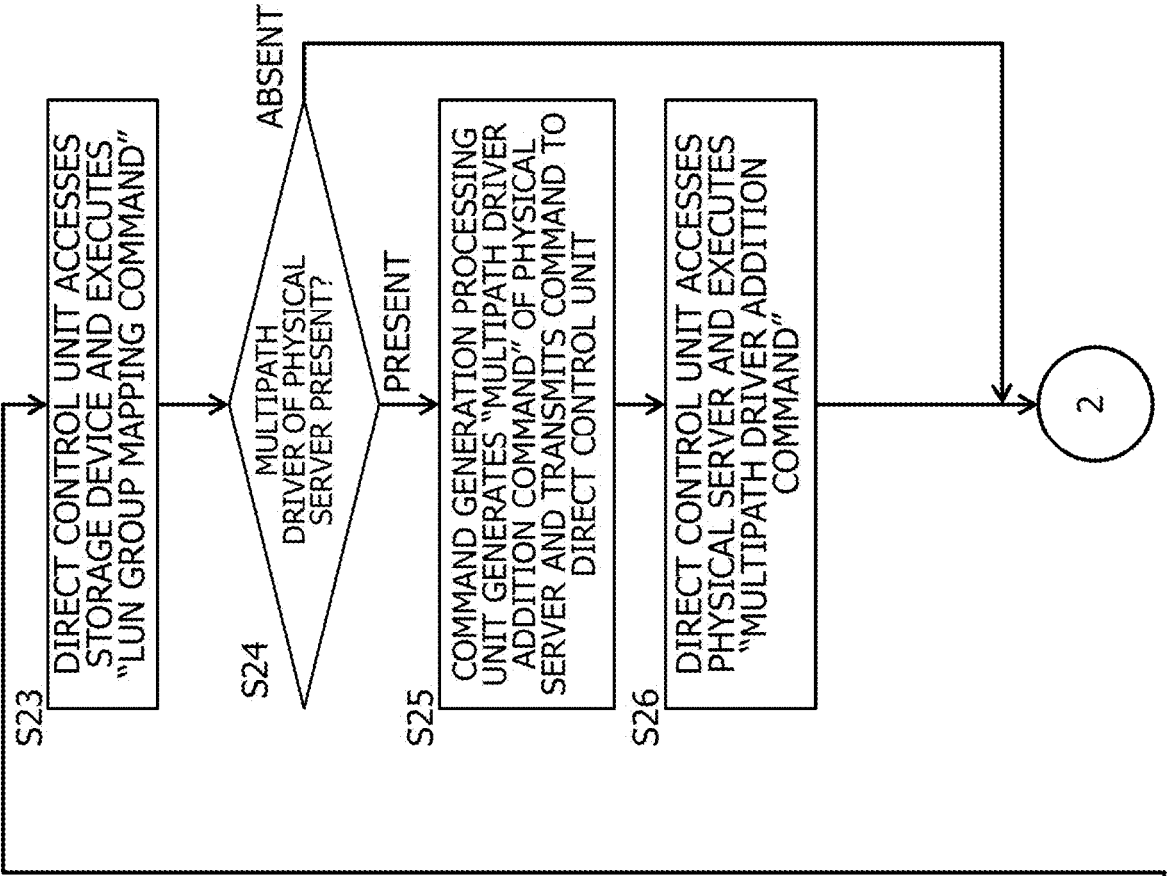

FIG.23

VIRTUAL SERVER DEFINITION TABLE

T1

| SERVER | | | | | | | | |
|---|---|---|---|---|---|---|---|---|
| VIRTUAL SERVER NAME | NUMBER OF CPUs | Memory CAPACITY | Disk NAME | MULTIPATH | port NAME | VIRTUAL SWITCH NAME | VLAN | PHYSICAL PORT | STATUS |
| Dom0001 | 4 | 64GB | vd-1101 | PRESENT | Vnet001 | VNex2 | 1101 | DEDICATED SWITCH | ACTIVE |
| Dom0002 | 4 | 64GB | vd-1101 | PRESENT | Vnet001 | VNex2 | 1101 | DEDICATED SWITCH | ACTIVE |
| ... | | | | | | | | | |

DISK-AND-SERVER CONNECTION DEFINITION TABLE

T2

| LUN | | | |
|---|---|---|---|
| STORAGE DEVICE NAME | Vol NAME | CONNECTION SERVER NAME | STATUS |
| ET200-1 | vd-1101 | Dom0001 | AVAILABLE |
| ET200-1 | vd-1101 | Dom0002 | AVAILABLE |
| ... | | | |

VIRTUAL NETWORK DEFINITION TABLE

T3

| NETWORK | | | |
|---|---|---|---|
| Port | Type | VLAN | STATUS |
| 010 | Tag | 1101 | ONLINE |
| 011 | Tag | 1101 | ONLINE |
| ... | | | |

FIG. 24

D4 SERVER CONFIGURATION DEFINITION INFORMATION

| USER | | VIRTUAL SERVER | | | | | | | VIRTUAL DISK | | | VIRTUAL NETWORK | | |
|---|---|---|---|---|---|---|---|---|---|---|---|---|---|---|
| USER NAME | USER ID | STATUS | VIRTUAL SERVER NAME | HOST NAME | PHYSICAL SERVER NAME (HYPERVISOR) | CLUSTER GROUP | TYPE | SERVER TYPE | OS_type | ID | Disk NAME | Disk_type | ... | Port | VIRTUAL NETWORK SWITCH NAME | V-LAN |
| AA CORPORATION | 0001 | REMOVED | Dom0001 | AAA | HW001 | A | REDUNDANT | 2 | OS11u3 | 1101 | vd-1101 | SHARED | ... | Vnet001 | vNex2 | 1101 |
| AA CORPORATION | 0001 | REMOVED | Dom0002 | AAB | HW002 | B | REDUNDANT | 2 | OS11u3 | 1101 | vd-1101 | SHARED | ... | Vnet001 | vNex2 | 1101 |
| BB CORPORATION | 0002 | OPERATING | Dom0003 | CCC | HW003 | - | SINGLE | 1 | OS11u2 | 1002 | vd-1002 | SINGLE | ... | Vnet002 | vNex1 | 3101 |
| ... | | | | | | | | | | | | | | | | |

D5 NETWORK CONFIGURATION DEFINITION INFORMATION

| USER | | STATUS | NETWORK SWITCH DEVICE NAME | Port | CONNECTION DESTINATION SERVER | Type | VLAN |
|---|---|---|---|---|---|---|---|
| USER NAME | USER ID | | | | | | |
| BB CORPORATION | 0002 | OPERATING | Nex1 | 010 | HW003 | Tag | 3101 |
| AA CORPORATION | 0001 | REMOVED | Nex2 | 010 | HW001 | Tag | 1101 |
| AA CORPORATION | 0001 | REMOVED | Nex2 | 011 | HW002 | Tag | 1101 |
| ... | | | | | | | |

D6 STORAGE CONFIGURATION DEFINITION INFORMATION

| USER | | STATUS | STORAGE DEVICE NAME | LUN | | | volume | | | |
|---|---|---|---|---|---|---|---|---|---|---|
| USER NAME | USER ID | | | LUN GROUP (CONNECTION GROUP) NAME | Lun NUMBER | RAID GROUP | Vol NUMBER | Vol NAME | SIZE | |
| AA CORPORATION | 0001 | REMOVED | ET200-1 | Dom0001 | 1101 | RG#020 | 1101 | vd-1101 | 1TB | |
| AA CORPORATION | 0001 | REMOVED | ET200-1 | Dom0002 | 1101 | RG#020 | 1101 | vd-1101 | 1TB | |
| BB CORPORATION | 0002 | OPERATING | ET200-2 | Dom0003 | 1002 | RG#000 | 1002 | vd-1002 | 120GB | |
| ... | | | | | | | | | | |

FIG.25  MASTER TABLE

MT1A USER TABLE

| USER NAME | USER ID |
|---|---|
| BB CORPORATION | 0002 |

MT2A VIRTUAL SERVER TABLE

| USER ID | HOST NAME | VIRTUAL SERVER NAME | PHYSICAL SERVER NAME | CLUSTER GROUP | TYPE | MACHINE TYPE | OS_type |
|---|---|---|---|---|---|---|---|
| 0001 | AAA | Dom0001 | HW001 | A | REDUNDANT | 2 | OS11u3 |
| 0001 | AAB | Dom0002 | HW002 | B | REDUNDANT | 2 | OS11u3 |
| 0002 | CCC | Dom0003 | HW003 | - | 1 | 1 | OS11u3 |

MT3A VIRTUAL DISK TABLE

| VIRTUAL SERVER NAME | Lun NUMBER | ID | Disk NAME | Disk_type |
|---|---|---|---|---|
| Dom0001 | 1101 | 1101 | vd-1101 | SHARED |
| Dom0002 | 1101 | 1101 | vd-1101 | SHARED |
| Dom0003 | 1002 | 1002 | vd-1002 | SINGLE |

MT4A VIRTUAL NETWORK TABLE

| VIRTUAL SERVER NAME | Port NAME | VLAN | NETWORK SWITCH NAME |
|---|---|---|---|
| Dom0001 | Vnet001 | 1101 | Nex2 |
| Dom0002 | Vnet002 | 1101 | Nex2 |
| Dom0002 | Vnet002 | 3101 | Nex1 |

MT5A LUN TABLE

| STORAGE DEVICE NAME | Vol NAME | LUN GROUP (CONNECTION GROUP) NAME | Lun NUMBER |
|---|---|---|---|
| ET200-1 | vd-1101 | Dom0001 | 1101 |
| ET200-1 | vd-1101 | Dom0002 | 1101 |
| ET200-2 | vd-1002 | Dom0003 | 1002 |

MT6A NETWORK CONFIGURATION DEFINITION INFORMATION

| SWITCH NAME | Port | CONNECTION DESTINATION SERVER | Type | VLAN | VIRTUAL SWITCH NAME |
|---|---|---|---|---|---|
| Nex2 | 010 | HW001 | Tag | 1101 | VNex2 |
| Nex2 | 011 | HW002 | Tag | 1101 | VNex2 |
| Nex1 | 010 | HW003 | Tag | 3101 | VNex1 |

MT7A volume TABLE

| HOUSING NAME | RAID GROUP | Vol NUMBER | Vol NAME | SIZE |
|---|---|---|---|---|
| ET200-1 | RG#020 | 1101 | vd-1101 | 1TB |
| ET200-1 | RG#020 | 1101 | vd-1101 | 1TB |
| ET200-2 | RG#000 | 1002 | vd-1002 | 120GB |

MT8A MACHINE TYPE TABLE

| Type | NUMBER OF CPUs | Memory CAPACITY |
|---|---|---|
| 1 | 2 | 32GB |
| 2 | 4 | 64GB |
| 3 | 8 | 128GB |

FIG.26

WORK TABLE

WT1A USER TABLE

| USER NAME | USER ID |
|---|---|
| AA CORPORATION | 0001 |

WT2A VIRTUAL SERVER TABLE

| USER ID | HOST NAME | VIRTUAL SERVER NAME | PHYSICAL SERVER NAME | CLUSTER GROUP | TYPE | MACHINE TYPE | OS_type |
|---|---|---|---|---|---|---|---|
| 0001 | AAA | Dom0001 | HW001 | A | REDUNDANT | 2 | OS11u3 |
| 0001 | AAB | Dom0002 | HW002 | B | REDUNDANT | 2 | OS11u3 |

WT3A VIRTUAL DISK TABLE

| VIRTUAL SERVER NAME | Lun NUMBER | ID | Disk NAME | Disk_type |
|---|---|---|---|---|
| Dom0001 | 1101 | 1101 | vd-1101 | SHARED |
| Dom0002 | 1101 | 1101 | vd-1101 | SHARED |

WT4A VIRTUAL NETWORK TABLE

| VIRTUAL SERVER NAME | Port NAME | VLAN | NETWORK SWITCH NAME |
|---|---|---|---|
| Dom0001 | Vnet001 | 1101 | Nex2 |
| Dom0002 | Vnet001 | 1101 | Nex2 |

WT5A LUN TABLE

| STORAGE DEVICE NAME | Vol NAME | LUN GROUP (CONNECTION GROUP) NAME | Lun NUMBER |
|---|---|---|---|
| ET200-1 | vd-1101 | Dom0001 | 1101 |
| ET200-1 | vd-1101 | Dom0002 | 1101 |

WT6A NETWORK CONFIGURATION DEFINITION INFORMATION

| SWITCH NAME | Port | CONNECTION DESTINATION SERVER | Type | VLAN | VIRTUAL SWITCH NAME |
|---|---|---|---|---|---|
| Nex2 | 010 | HW001 | Tag | 1101 | VNex2 |
| Nex2 | 011 | HW002 | Tag | 1101 | VNex2 |

WT7A volume TABLE

| HOUSING NAME | RAID GROUP | Vol NUMBER | Vol NAME | SIZE |
|---|---|---|---|---|
| ET200-1 | RG#020 | 1101 | vd-1101 | 1TB |
| ET200-1 | RG#020 | 1101 | vd-1101 | 1TB |

FIG.27

COMMANDS RELATED TO VIRTUAL SERVER REMOVAL i11  virtual server stop: ssh <management user>@<physical server name>
ldm stop-domain <virtual server name> i12  virtual server removal: ssh <management user>@<physical server name>
ldm remove-domain <virtual server name> i13  virtual disk removal: ssh <management user>@<physical server name>
ldm remove-vdsdev <virtual disk name>@<virtual disk service name> i14  virtual network removal: ssh <management user>@<physical server name>
ldm remove-vnet <virtual network port name> <virtual server name> i15  multipath driver removal: ssh <management user>@<physical server name> grmpdautoconf

FIG.28

COMMANDS RELATED TO VOLUME DELETION i16
```
volume deletion: ssh <management user>@<storage device name>
delete volume -volume-number <volume number>
``` i17
```
LUN group mapping cancel: ssh <management user>@<storage device name>
delete lun-group -lg-name <LUN group name> -lun <lun number>
```

FIG.29

COMMANDS RELATED TO VLAN REMOVAL i18
VLAN removal: ssh <management user>@<network switch name> no vlan <VLAN ID> i19
VLAN removal: ssh <management user>@<network switch name> interface <port>
: ssh <management user>@<network switch name> switch mode trunk
: ssh <management user>@<network switch name> switch trunk allowed vlan remove
<VLAN ID>

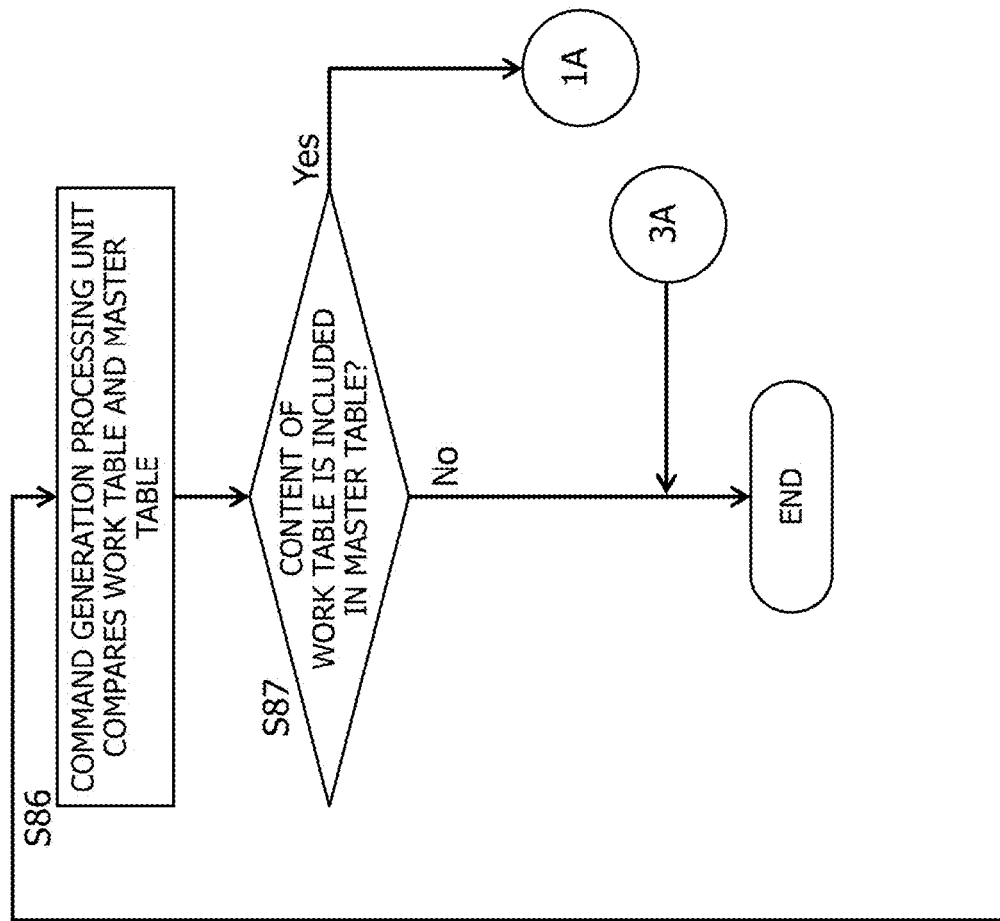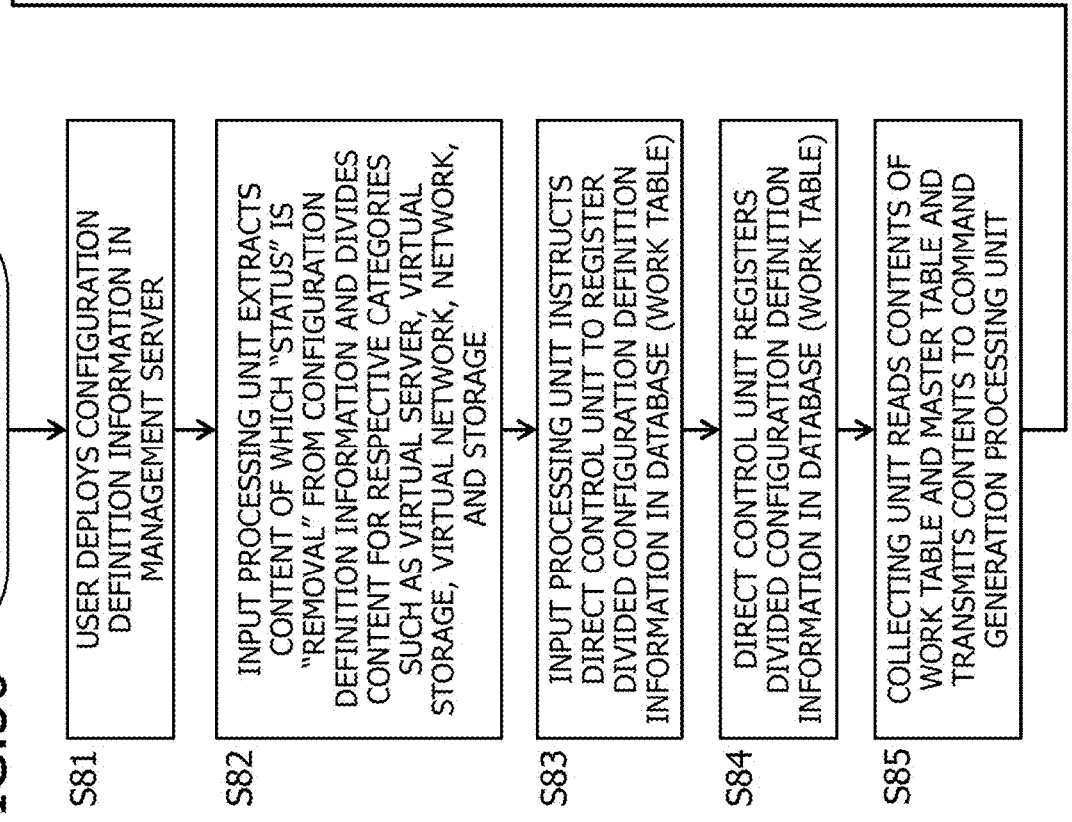

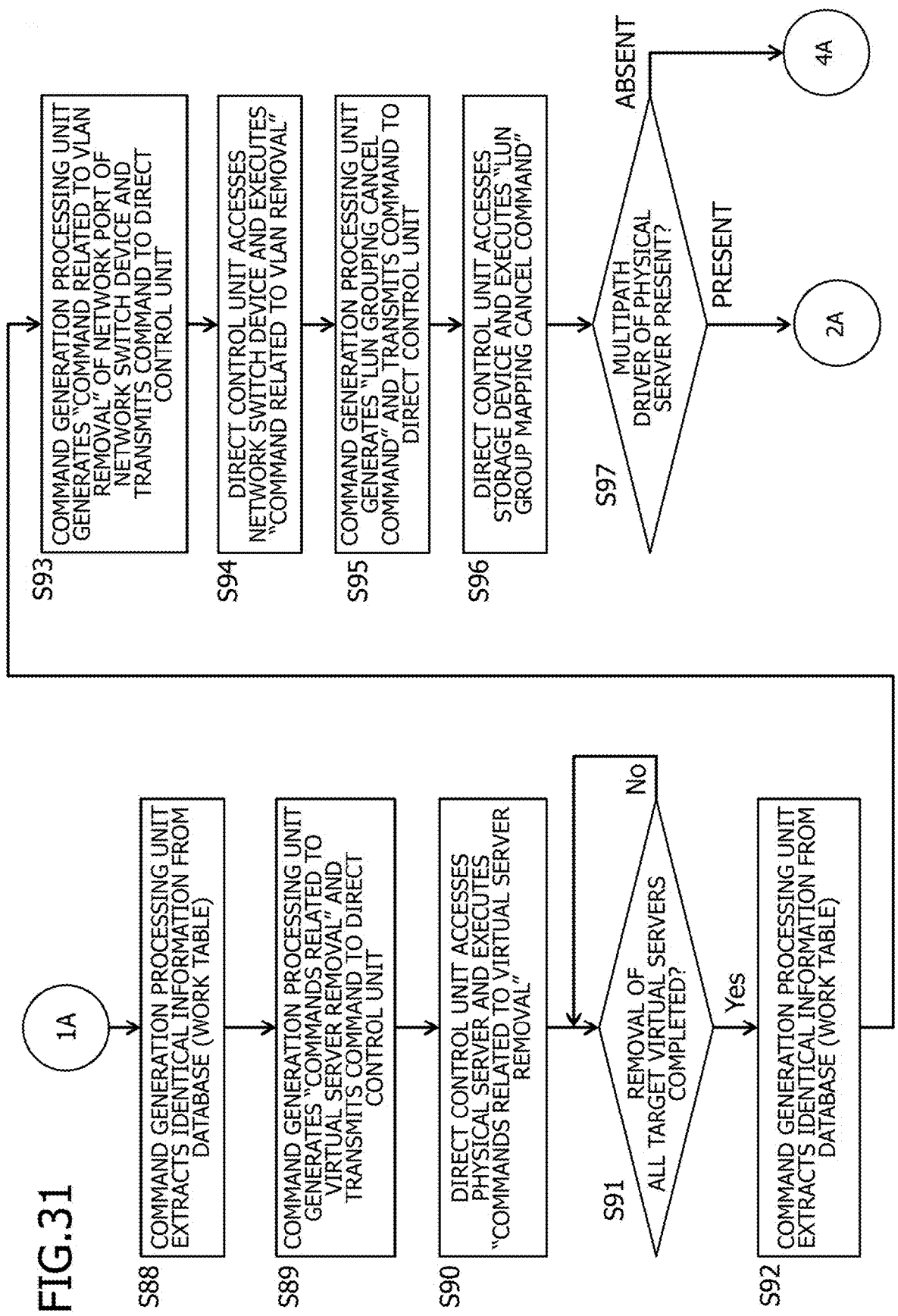

FIG.36

D7 CONFIGURATION DEFINITION INFORMATION

| USER | | | VIRTUAL SERVER | | | | | | | | VIRTUAL DISK | | | | VIRTUAL NETWORK | | |
|---|---|---|---|---|---|---|---|---|---|---|---|---|---|---|---|---|---|
| USER NAME | USER ID | STATUS | HOST NAME | VIRTUAL SERVER NAME | PHYSICAL SERVER NAME (HYPER-VISOR) | CLUSTER GROUP | TYPE | SERVER TYPE | OS_type | ... | ID | Disk NAME | Disk_type | ... | Port | VIRTUAL NETWORK SWITCH NAME | V-LAN |
| AA CORPOR-ATION | 0001 | OPERAT-ING | AAA | Dom0001 | HW001 | A | REDUN-DANT | 2 | OS11u3 | ... | 1101 | vd-1101 | SHARED | ... | Vnet001 | vNex2 | 1101 |
| AA CORPOR-ATION | 0001 | CHANGED | AAB | Dom0002 | HW004 | B | REDUN-DANT | 2 | OS11u3 | ... | 1101 | vd-1101 | SHARED | ... | Vnet001 | vNex2 | 1101 |
| BB CORPOR-ATION | 0002 | OPERAT-ING | CCC | Dom0003 | HW003 | - | SINGLE | 1 | OS11u2 | ... | 1002 | vd-1002 | SINGLE | ... | Vnet002 | vNex1 | 3101 |
| ... | ... | ... | ... | ... | ... | ... | ... | ... | ... | ... | ... | ... | ... | ... | ... | ... | ... |

D8 NETWORK CONFIGURATION DEFINITION INFORMATION

| USER | | STATUS | SWITCH NAME | Port | CONNECTION DESTINATION SERVER | Type | VLAN |
|---|---|---|---|---|---|---|---|
| USER NAME | USER ID | | | | | | |
| BB CORPOR-ATION | 0002 | OPERATING | Nex1 | 010 | HW003 | Tag | 3101 |
| AA CORPOR-ATION | 0001 | OPERATING | Nex2 | 010 | HW001 | Tag | 1101 |
| AA CORPOR-ATION | 0001 | CHANGED | Nex2 | 013 | HW004 | Tag | 1101 |
| ... | ... | ... | ... | ... | ... | ... | ... |

D9 STORAGE CONFIGURATION DEFINITION INFORMATION

| USER | | STATUS | STORAGE DEVICE NAME | LUN GROUP (CONNECTION GROUP) NAME | LUN | | | volume | | | |
|---|---|---|---|---|---|---|---|---|---|---|---|
| USER NAME | USER ID | | | | Lun NUMBER | RAID GROUP | Vol NUMBER | Vol NAME | SIZE | | |
| AA CORPOR-ATION | 0001 | OPERATING | ET200-1 | Dom0001 | 1101 | RG#020 | 1101 | vd-1101 | 1TB | | |
| AA CORPOR-ATION | 0001 | CHANGED | ET200-1 | Dom0004 | 1101 | RG#020 | 1101 | vd-1101 | 1TB | | |
| BB CORPOR-ATION | 0002 | OPERATING | ET200-2 | Dom0003 | 1002 | RG#000 | 1002 | vd-1002 | 120GB | | |
| ... | ... | ... | ... | ... | ... | ... | ... | ... | ... | | |

FIG.37

MT1B MASTER TABLE

USER TABLE

| USER NAME | USER ID |
|---|---|
| AA CORPORATION | 0001 |
| BB CORPORATION | 0002 |

MT2B VIRTUAL SERVER TABLE

| USER ID | HOST NAME | VIRTUAL SERVER NAME | PHYSICAL SERVER NAME | CLUSTER GROUP | TYPE | MACHINE TYPE | OS_type |
|---|---|---|---|---|---|---|---|
| 0001 | AAA | Dom0001 | HW001 | A | REDUNDAN | 2 | OS11u3 |
| 0001 | AAB | Dom0002 | HW002 | B | REDUNDAN | 2 | OS11u3 |
| 0002 | CCC | Dom0003 | HW003 | - | 1 | 1 | OS11u3 |

MT3B VIRTUAL DISK TABLE

| VIRTUAL SERVER NAME | Lun NUMBER | ID | Disk NAME | Disk_type |
|---|---|---|---|---|
| Dom0001 | 1101 | 1101vd-1101 | vd-1101 | SHARED |
| Dom0002 | 1101 | 1101vd-1101 | vd-1101 | SHARED |
| Dom0003 | 1002 | 1002vd-1002 | vd-1002 | SINGLE |

MT4B VIRTUAL NETWORK TABLE

| VIRTUAL SERVER NAME | Port NAME | VLAN | SWITCH NAME | VIRTUAL SWITCH NAME |
|---|---|---|---|---|
| Dom0001 | Vnet001 | 1101 | Nex2 | VNex2 |
| Dom0002 | Vnet001 | 1101 | Nex2 | VNex2 |
| Dom0002 | Vnet002 | 3101 | Nex1 | VNex1 |

MT5B LUN TABLE

| STORAGE DEVICE NAME | Vol NAME | LUN GROUP (CONNECTION GROUP) NAME | LUN NUMBER |
|---|---|---|---|
| ET200-1 | vd-1101 | Dom0001 | 1101 |
| ET200-1 | vd-1101 | Dom0002 | 1101 |
| ET200-2 | vd-1002 | Dom0003 | 1002 |

MT6B NETWORK CONFIGURATION DEFINITION TABLE

| SWITCH NAME | Port | CONNECTION SERVER | Type | VLAN | VIRTUAL SWITCH NAME |
|---|---|---|---|---|---|
| Nex2 | 010 | HW001 | Tag | 1101 | VNex2 |
| Nex2 | 011 | HW002 | Tga | 1101 | VNex2 |
| Nex1 | 010 | HW003 | Tga | 3101 | VNex1 |

MT7B volume TABLE

| HOUSING NAME | RAID GROUP | Vol NUMBER | Vol NAME | SIZE |
|---|---|---|---|---|
| ET200-1 | RG#020 | 1101vd-1101 | vd-1101 | 1TB |
| ET200-1 | RG#020 | 1101vd-1101 | vd-1101 | 1TB |
| ET200-2 | RG#000 | 1002vd-1002 | vd-1002 | 120GB |

MT8B MACHINE TYPE TABLE

| TYPE | NUMBER OF CPUs | Memory CAPACITY |
|---|---|---|
| 1 | 2 | 32GB |
| 2 | 4 | 64GB |
| 3 | 8 | 128GB |

FIG.38   WORK TABLE

WT1B USER TABLE

| USER NAME | USER ID |
|---|---|
| AA CORPORATION | 0001 |

WT2B VIRTUAL SERVER TABLE

| USER ID | HOST NAME | VIRTUAL SERVER NAME | PHYSICAL SERVER NAME | CLUSTER GROUP | TYPE | MACHINE TYPE | OS_type |
|---|---|---|---|---|---|---|---|
| 0001 | AAB | Dom0002 | HW004 | B | REDUNDAN | 2 | OS11u3 |

WT3B VIRTUAL DISK TABLE

| VIRTUAL SERVER NAME | Lun NUMBER | ID | Disk NAME | Disk_type |
|---|---|---|---|---|
| Dom0002 | 1101 | 1101 | vd-1101 | SHARED |

WT4B VIRTUAL NETWORK TABLE

| VIRTUAL SERVER NAME | Port NAME | VLAN | SWITCH NAME | VIRTUAL SWITCH NAME |
|---|---|---|---|---|
| Dom0002 | Vnet001 | 1101 | Nex2 | VNex2 |

WT6B NETWORK CONFIGURATION DEFINITION

| SWITCH NAME | Port | CONNECTION SERVER | Type | VLAN | VIRTUAL SWITCH NAME |
|---|---|---|---|---|---|
| Nex2 | 013 | HW004 | Tag | 1101 | VNex2 |

WT5B LUN TABLE

| STORAGE DEVICE NAME | Vol NAME | LUN GROUP (CONNECTION GROUP) NAME | LUN NUMBER |
|---|---|---|---|
| ET200-1 | vd-1101 | Dom0003 | 1101 |

WT7B volume TABLE

| HOUSING NAME | RAID GROUP | Vol NUMBER | Vol NAME | SIZE |
|---|---|---|---|---|
| ET200-1 | RG#020 | 1101 | vd-1101 | 1TB |
| ET200-1 | RG#020 | 1101 | vd-1101 | 1TB |

FIG.39
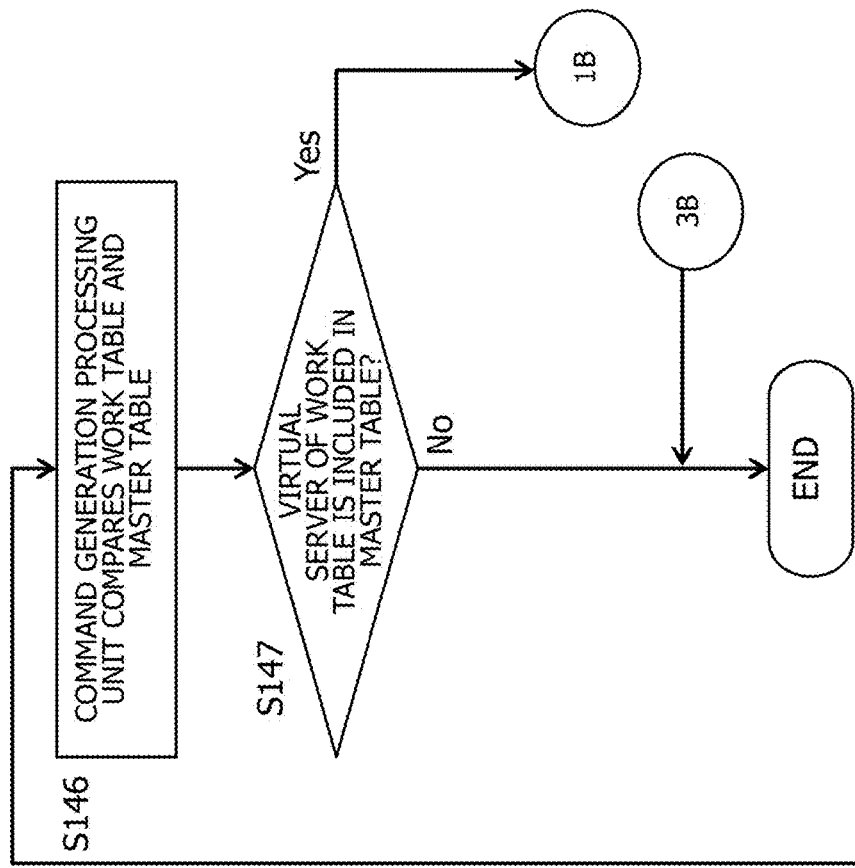
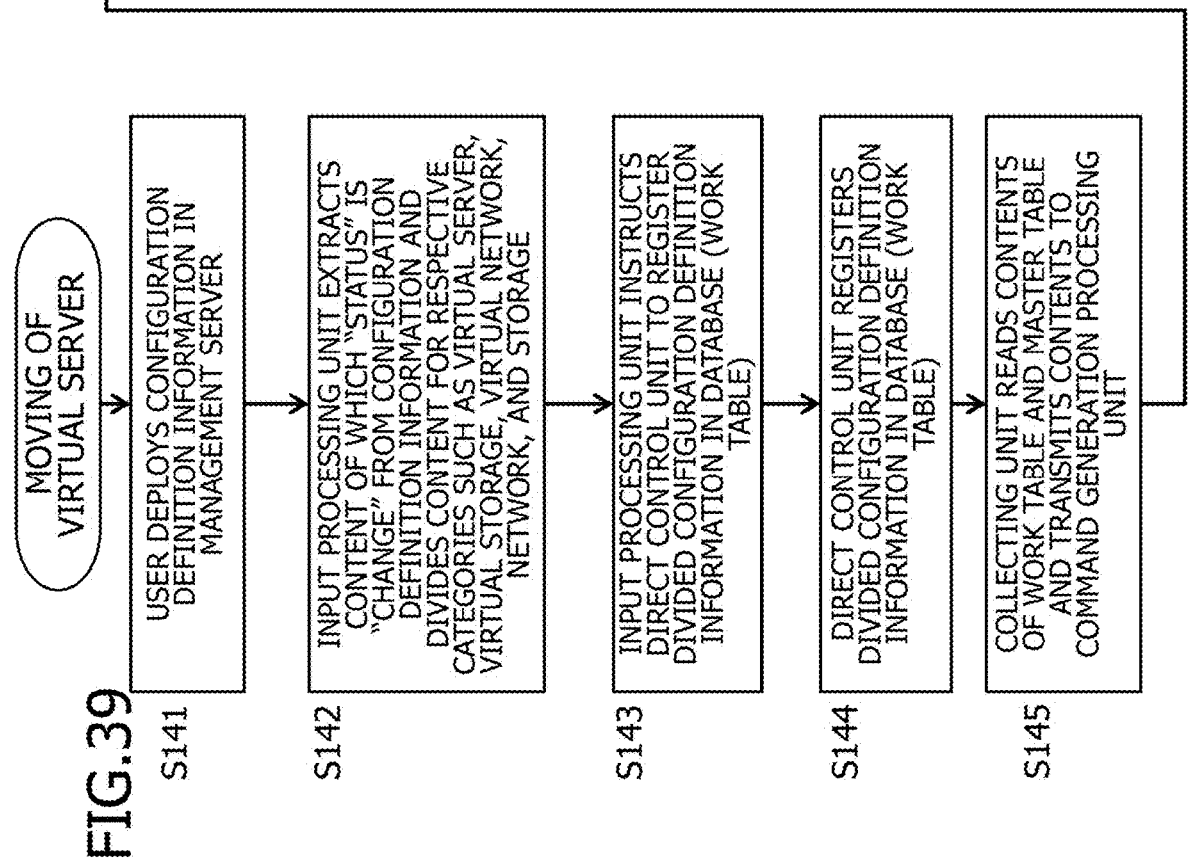

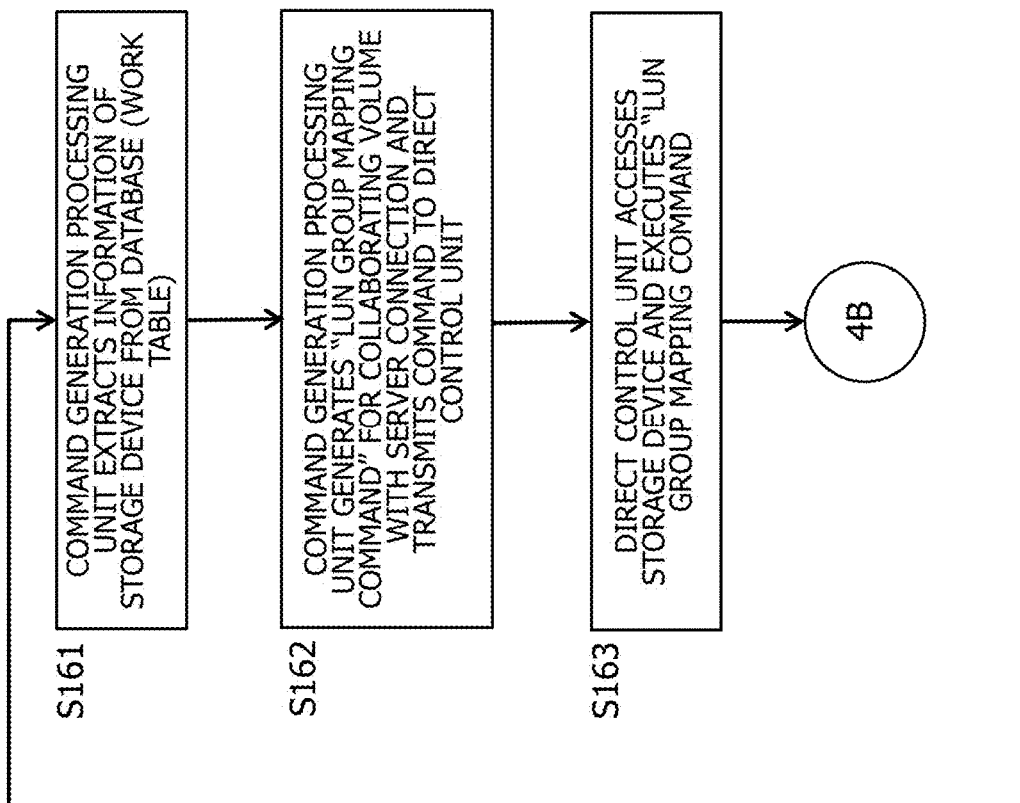
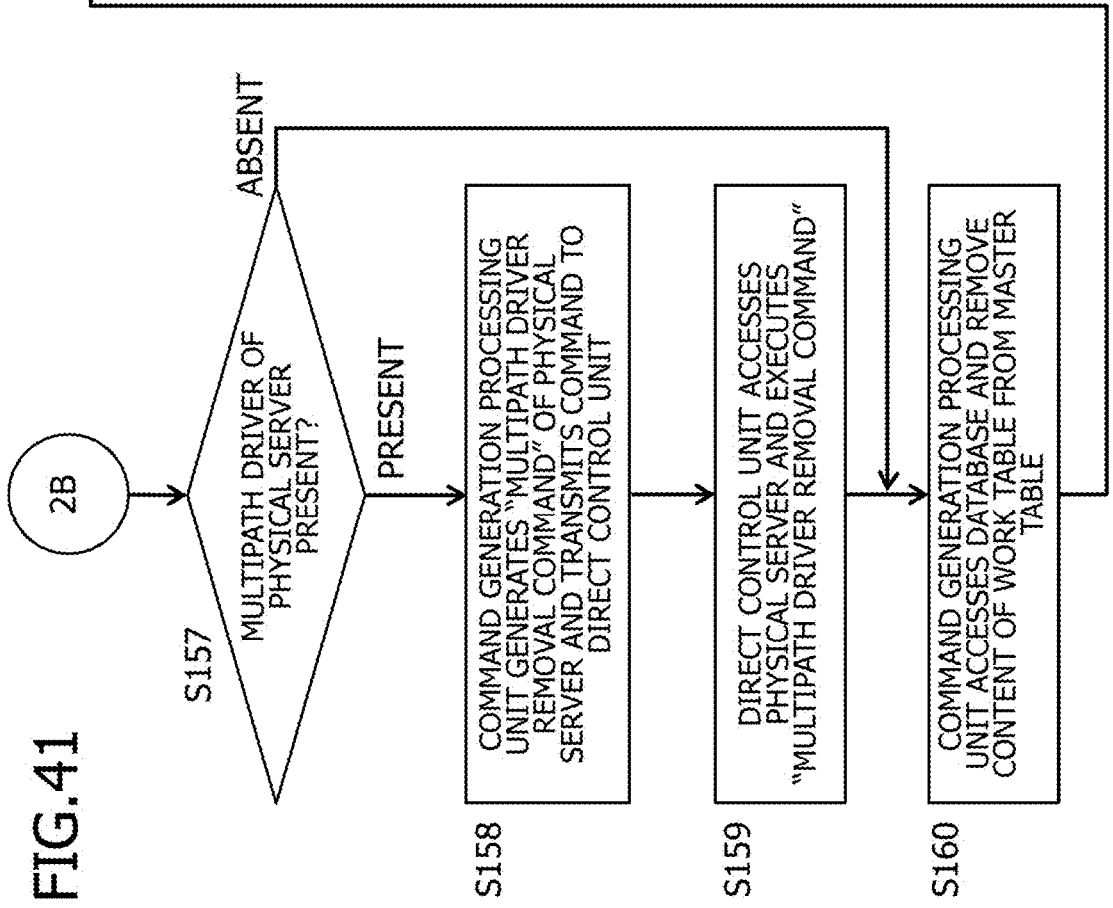
FIG.41

INFORMATION PROCESSING SYSTEM, MANAGEMENT DEVICE, AND METHOD FOR CONTROLLING INFORMATION PROCESSING SYSTEM

CROSS-REFERENCE TO RELATED APPLICATION

This application is based upon and claims the benefit of priority of the prior Japanese Patent Application No. 2017-099677, filed on May 19, 2017, the entire contents of which are incorporated herein by reference.

FIELD

The present invention relates to an information processing system, a management device, and a method for controlling the information processing system.

BACKGROUND

Conventionally, an information processing system in which a plurality of types of configuration definition information including allocation of resources to virtual computers are prepared so that configuration definitions of the virtual computers are dynamically changed using a reservation time as a trigger has been proposed (for example, see International Publication Pamphlet No. WO 97/35255).

SUMMARY

However, in the information processing system disclosed in WO 97/35255, although it is possible to generate a new system configuration dynamically on the basis of the configuration definition information loaded when a reservation time arrives, there is a problem in that it is waste of time to generate an identical configuration that does not change before and after the system configuration is changed.

An information processing system comprising:
a plurality of electronic devices each including a processing unit that changes a configuration of a device, in which the processing unit itself is included, on the basis of received control information; and
a management device that manages the plurality of electronic devices, wherein
the management device includes:
a collecting unit that collects present configuration information of the information processing system from the plurality of electronic devices;
a storage unit that stores first configuration definition information indicating a present configuration of the information processing system on the basis of the configuration information collected by the collecting unit and second configuration definition information indicating an input-configuration after the change of the information processing system; and
a control unit that generates control information on the basis of difference information which is about a difference between the first configuration definition information and the second configuration definition information and transmits the generated control information to the processing unit included in each of the plurality of electronic devices.

According to a first aspect of the present invention, it is possible to provide an information processing system capable of generating a system configuration dynamically and suppressing an identical configuration that does not change before and after the system configuration is changed from being generated wastefully and to provide a management device and a method for controlling the information processing system.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates a specific example of the configuration definition information.

FIG. 6 illustrates a specific example of the master table.

FIG. 7 illustrates a specific example of the work table.

FIG. 8 illustrates a specific example of the command generated by the management server 50.

FIG. 9 illustrates a specific example of the command generated by the management server 50.

FIG. 10 illustrates a specific example of the command generated by the management server 50.

FIG. 12 is a flowchart for describing Operation Example 1 (virtual server creation process) of the management server 50.

FIG. 23 illustrates a specific example of such as a virtual server definition table.

FIG. 24 illustrates a specific example of the configuration definition information used in Operation Example 2.

FIG. 25 illustrates a specific example of the master table used in Operation Example 2.

FIG. 26 illustrates a specific example of the work table used in Operation Example 2.

FIG. 27 illustrates a specific example of the command generated by the management server 50 in Operation Example 2.

FIG. 28 illustrates a specific example of the command generated by the management server 50 in Operation Example 2.

FIG. 29 illustrates a specific example of the command generated by the management server 50 in Operation Example 2.

FIG. 30 is a flowchart for describing Operation Example 2 (a virtual server removal process) of the management server 50.

FIG. 31 is a flowchart for describing Operation Example 2 (a virtual server removal process) of the management server 50.

FIG. 36 is a specific example of the configuration definition information used in Operation Example 3.

FIG. 37 illustrates a specific example of the master table used in Operation Example 3.

FIG. 38 illustrates a specific example of the work table used in Operation Example 3.

FIG. 39 is a flowchart for describing Operation Example 3 (a virtual server moving process) of the management server 50.

FIG. 41 is a flowchart for describing Operation Example 3 (a virtual server moving process) of the management server 50.

DESCRIPTION OF EMBODIMENTS

Configuration (Overview) of Information Processing System

Figure 1:
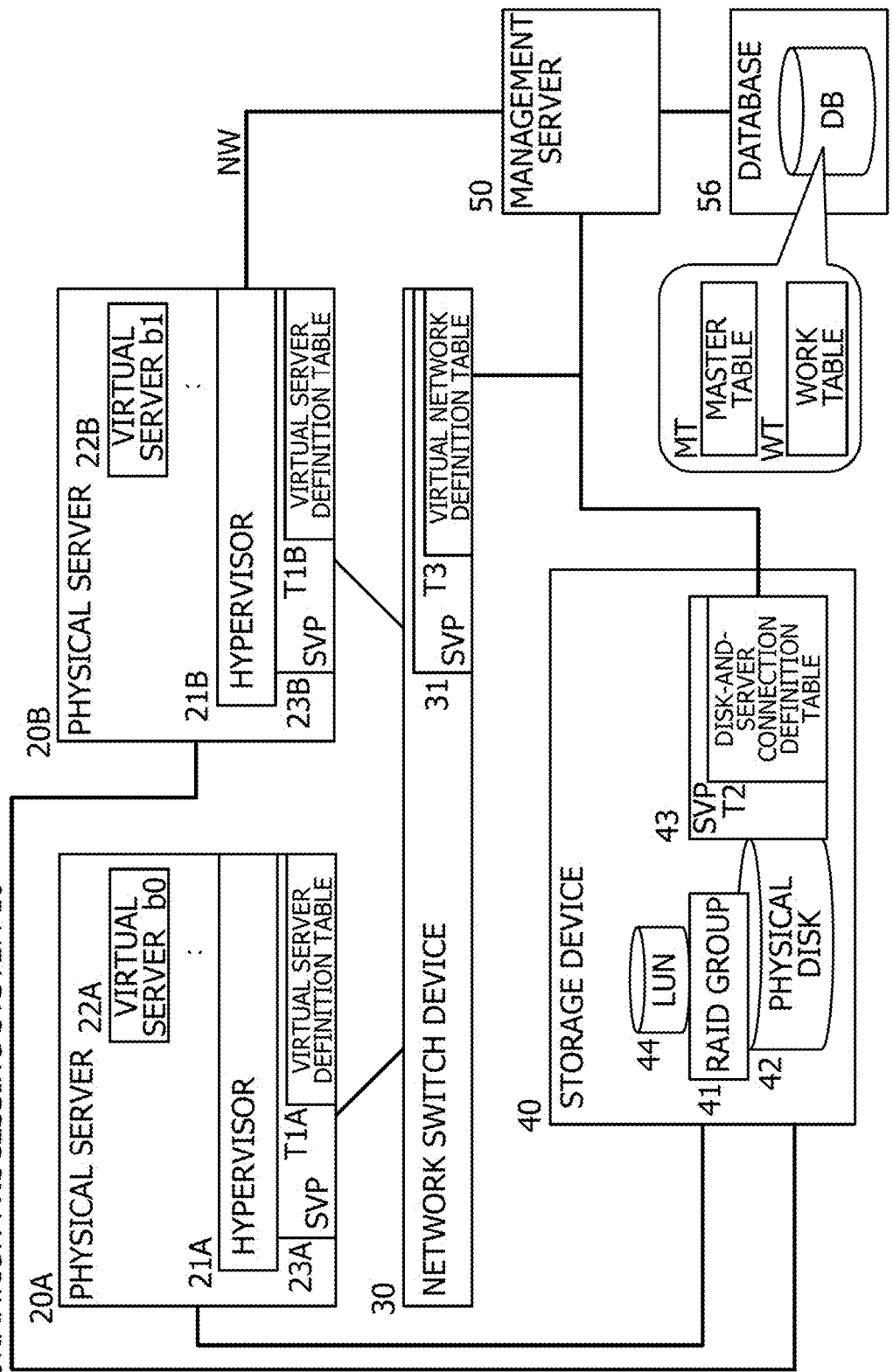
FIG. 1 is a diagram illustrating a configuration of an information processing system 10.

First, a configuration of an information processing system 10 will be described. FIG. 1 is a diagram illustrating a configuration of an information processing system 10. The information processing system 10 illustrated in FIG. 1 includes a plurality of electronic devices and a management device (hereinafter referred to as a management server 50). Specifically, the plurality of electronic devices include a plurality of information processing devices (hereinafter referred to as physical servers 20A and 20B) that execute virtual servers, a storage device 40 that can be shared by the physical servers 20A and 20B, and a communication device (hereinafter referred to as a network switch device 30) that can connect to the physical servers 20A and 20B. Hereinafter, it is assumed that a physical server name of the physical server 20A is HW001, a physical server name of the physical server 20B is HW002, a storage device name of the storage device 40 is ET200-1, a switch name of the network switch device 30 is Nex2.

Although a case in which the information processing system 10 has the physical server 20A and the physical server 20B will be described, the information processing system 10 may have three or more physical servers. In this case, the physical servers and the storage device 40 may be connected directly, and although not illustrated in the drawings, they may be connected via an FC switch or a network switch (for example, iSCSI). In this way, a larger number of physical servers can be connected to the storage device 40.

Although a case in which the information processing system 10 has the storage device 40 will be described, the information processing system 10 may have two or more storage devices. Although a case in which the information processing system 10 has the network switch device 30 will be described, the information processing system 10 may have two or more network switch devices. For example, a high-speed communication network switch device and a low-speed communication network switch device may be connected to a network NW.

The physical servers 20A and 20B, the storage device 40, the network switch device 30, and the management server 50 are connected to a network NW such as a LAN and can communicate with each other via the network NW. Although not illustrated in FIG. 1, actually, the physical server 20A and the management server 50 are connected by the network NW.

As illustrated in FIG. 1, the physical servers 20A and 20B operate hypervisors 21A and 21B (dedicated software for generating a virtualization environment) on hardware, respectively. At least one set of virtual servers 22A and 22B are generated by the hypervisors 21A and 21B, respectively. Hereinafter, it is assumed that a virtual server name of the virtual server 22A is Dom0001 and a virtual server name of the virtual server 22B is Dom0002. The physical server is also referred to as a physical machine. The virtual server is also referred to as a virtual machine.

The virtual servers 22A and 22B are virtual hardware generated by the hypervisors 21A and 21B, respectively, and can operate an OS (guest OS) and an application program on the virtual servers 22A and 22B, respectively, similarly to ordinary hardware. Since the virtual servers 22A and 22B are separated from the physical servers 20A and 20B serving as bases by the hypervisors 21A and 21B, it is possible to allocate resources such as a CPU, a memory, a storage, a network, and the like dynamically and flexibly.

The physical servers 20A and 20B, the storage device 40, and the network switch device 30 have processing units 23A, 23B, 43, and 31 (hereinafter referred to as SVPs 23A, 23B, 43, and 31), respectively. The SVP is an abbreviation of a service processor. The hypervisors 21A and 21B (or the SVPs 23A and 23B), the SVP 43, and the SVP 31 change the configurations of devices that include the SVPs, for example, on the basis of control information (hereinafter referred to as commands) received from the management server 50.

Hereinafter, the physical servers 20A and 20B will be referred to as a physical server 20 when the physical servers are not distinguished particularly. Moreover, the hypervisors 21A and 21B will be referred to as a hypervisor 21 when the hypervisors are not distinguished particularly. Moreover, the virtual servers 22A and 22B will be referred to as a virtual server 22 when the virtual servers are not distinguished particularly. Furthermore, the SVPs 23A and 23B will be referred to as an SVP 23 when the SVPs are not distinguished particularly.

The management server 50 includes a master table MT and a work table WT. The master table MT and the work table WT are stored in a storage unit (hereinafter referred to as a database 56) connected to the management server 50, for example. The database 56 may be stored in a storage 53 (see FIG. 3) included in the management server 50.

Information indicating a present configuration (a logical configuration) of the information processing system 10 is registered in the master table MT. Information (configuration definition information) for changing a present configuration (a logical configuration) of the information processing system 10 is registered in the work table WT.

The management server 50 generates a command (control information or a control file) that the physical server 20 (the hypervisor 21 or the SVP 23), the storage device 40 (the SVP 43), and the network switch device 30 (the SVP 31) execute on the basis of difference information which is a difference between the master table MT and the work table WT. The command is generated in the format of a file (a control file), for example. The management server 50 transmits the generated command to the physical server 20, the storage device 40, and the network switch device 30 via the network NW.

The physical server 20, the storage device 40, and the network switch device 30 receive the command transmitted from the management server 50 via the network NW.

Upon receiving the command transmitted from the management server 50 via the network NW, the physical server 20A (the hypervisor 21 or the SVP 23A) rejisters the data in a virtual server definition table T1A stored in a memory included in the SVP 23A. Moreover, the physical server 20A (the hypervisor 21A or the SVP 23A) executes the received command. Similarly, upon receiving the command transmitted from the management server 50 via the network NW, the physical server 20B (the hypervisor 21B or the SVP 23B) rejisters the data in a virtual server definition table T1B stored in a memory (not illustrated) included in the SVP 23B. Moreover, the physical server 20B (the hypervisor 21B or the SVP 23B) executes the received command. Hereinafter, the virtual server definition tables T1A and T1B will be referred to as a virtual server definition table T1 when the virtual server definition tables are not distinguished particularly.

The command transmitted from the management server 50 may be received by the SVP 23 of the physical server 20 and may be received by a network interface circuit 20d (see FIG. 2) different from the SVP 23. The received command may be executed by the SVP 23 of the physical server 20 and may be executed by the hypervisor 21, for example, different from the SVP 23. Hereinafter, it is assumed that the command transmitted from the management server 50 is received by the network interface circuit 20d, and the received command is executed by the hypervisor 21.

On the other hand, upon receiving the command transmitted from the management server 50 via the network NW, the storage device 40 (the SVP 43) registers the data in a disk-and-server connection definition table T2 stored in a memory (not illustrated) included in the SVP 43. Moreover, the storage device 40 (the SVP 43) executes the received command.

Upon receiving the command transmitted from the management server 50 via the network NW, the network switch device 30 (the SVP 31) registers the data in a virtual network definition table T3 stored in a memory (not illustrated) included in the SVP 31. Moreover, the network switch device 30 (the SVP 31) executes the received command.

Figure 22:
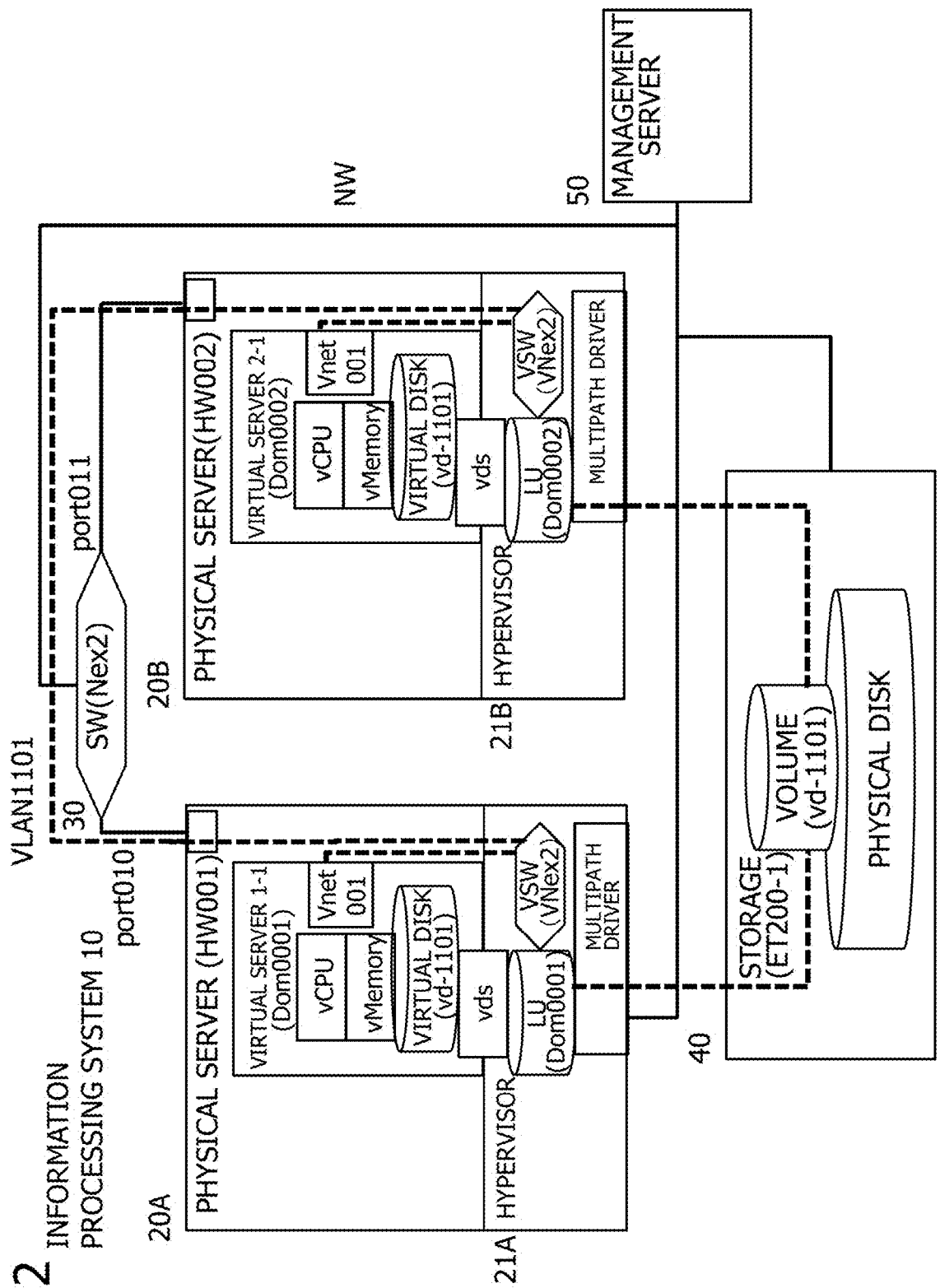
FIG. 22 illustrates a state in which the virtual server 22 (the virtual CPU, the memory, the virtual disk, the virtual network, and the like) is created in the state illustrated in FIG. 21.

As described above, the data is stored in the virtual server definition table T1, the disk-and-server connection definition table T2, and the virtual network definition table T3 and the physical server 20 (the hypervisor 21), the storage device 40 (the SVP 43), and the network switch device 30 (the SVP 31) execute the command transmitted from the management server 50. In this way, as illustrated in FIG. 22, for example, it is possible to generate the virtual servers 22A and 22B in the physical servers 20A and 20B, respectively, and construct an environment for connecting the virtual servers 22A and 22B in common to the storage device 40.

[Physical Server]

Figure 2:
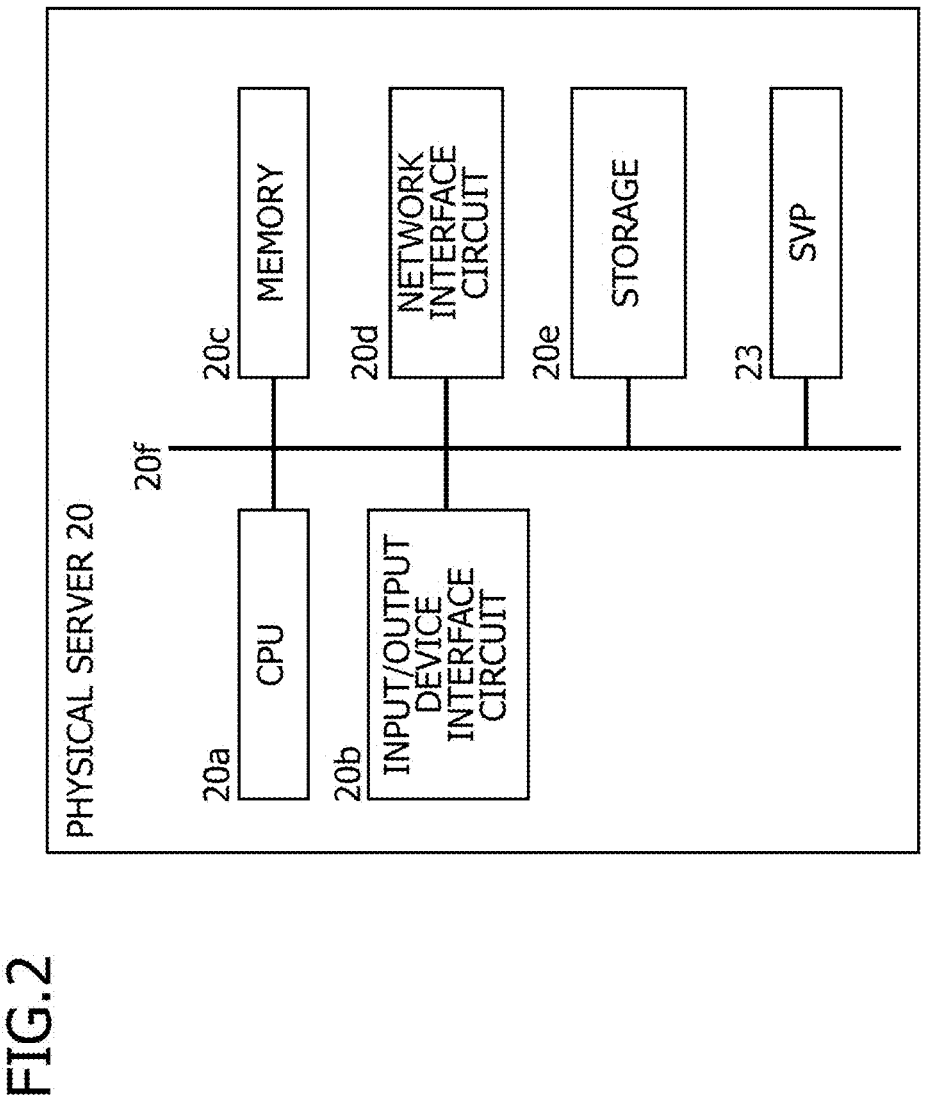
FIG. 2 is a diagram illustrating a hardware configuration of the physical server 20.

Next, the physical server 20 will be described. FIG. 2 is a diagram illustrating a hardware configuration of the physical server 20.

The physical server 20 is a desktop computer, a laptop computer, or a server computer, for example.

As illustrated in FIG. 2, the physical server 20 includes a CPU 20a, an input/output device interface circuit 20b, a memory 20c, a network interface circuit 20d, a storage 20e, and the SVP 23.

The CPU 20a accesses interface circuits such as the memory 20c and the input/output device interface circuit 20b via an internal bus 20f. The CPU 20a is an electronic component of a processor such as a central processing unit (CPU) and a microprocessing unit (MPU). The CPU 20a may be provided solely or plurally. The CPU 20a reads a program and data stored in the storage 20e into the memory 20c to execute program processing related to a virtualization environment and an application program and the like executed by the virtual server 22.

The input/output device interface circuit 20b is a circuit for controlling input and output to and from a peripheral device including devices such as a mouse or a keyboard (not illustrated).

The memory 20c is a storage device such as a random access memory (RAM). The memory 20c may be provided solely or plurally.

The network interface circuit 20d is an interface circuit for performing communication with other devices (the management server 50 and the like) via the network NW and is a network interface card (NIC), for example. The network interface circuit 20d (hereinafter also referred to a NIC 20d) receives a command transmitted from the management server 50 via the network NW. The hypervisor 21 executes a process of causing the SVP 23 to register the data in the virtual server definition table T1 stored in the memory (not illustrated) included in the SVP 23 and a process of executing the command received from the management server 50.

An OS and an application program executed by the physical server 20, and data and the like used by the application program are stored in the storage 20e.

The SVP 23 includes a CPU, a memory such as a RAM, a NIC, and the like although not illustrated in the drawings. A program and data used for the processing of the SVP 23 and the virtual server definition table T1 are stored in the memory included in the SVP 23.

The SVP 23 is an independent system separated from the CPU 20a allocated to the virtual server 22 and performs management of the physical server 20 itself. The SVP 23 has a network interface circuit (NIC) separated from the network interface circuit 20d of the physical server 20. The SVP 23 communicates with other devices (the management server 50 and the like) via the network NW. The SVP 23 executes a process of registering the data in the virtual server definition table T1 stored in the memory included in the SVP 23 according to the control from the hypervisor 21.

Network Switch Device

Next, the network switch device will be described.

The network switch device 30 is a layer-2 switch, for example, and includes the SVP 31 and the like as illustrated in FIG. 1.

The SVP 31 is a device for managing the network switch device 30 and includes a CPU, a memory such as a RAM, a NIC, and the like although not illustrated in the drawings. A program and data used for the processing of the SVP 31 and the virtual network definition table T3 are stored in the memory included in the SVP 31.

The SVP 31 communicates with other devices (the management server 50 and the like) via the network NW. The SVP 31 executes a process of receiving the command transmitted from the management server 50 via the network NW, a process of registering the data in the virtual network definition table T3 stored in the memory included in the SVP 31, and a process of executing the command received from the management server 50.

Storage Device

As illustrated in FIG. 1, the storage device 40 includes a plurality of physical disks 42 divided into redundant arrays of inexpensive disks (RAID) groups 41, the SVP 43, and the like. The physical disk 42 may be a rotating disk and may be a solid disk. A logical unit number (LUN) 44 is a volume identifier. A physical storage space is dynamically allocated to the LUN 44.

The SVP 43 is a device for managing the storage device 40 and includes a CPU, a memory such as a RAM, a NIC, and the like although not illustrated in the drawings. A program and data used for processing of the SVP 43 and the disk-and-server connection definition table T2 are stored in the memory included in the SVP 43.

The SVP 43 communicates with other devices (the management server 50 and the like) via the network NW. The SVP 43 executes a process of receiving the command transmitted from the management server 50 via the network NW, a process of registering the data in the disk-and-server connection definition table T2 stored in the memory included in the SVP 43, and a process of executing the command received from the management server 50 to create a volume.

Management Server

Figure 3:
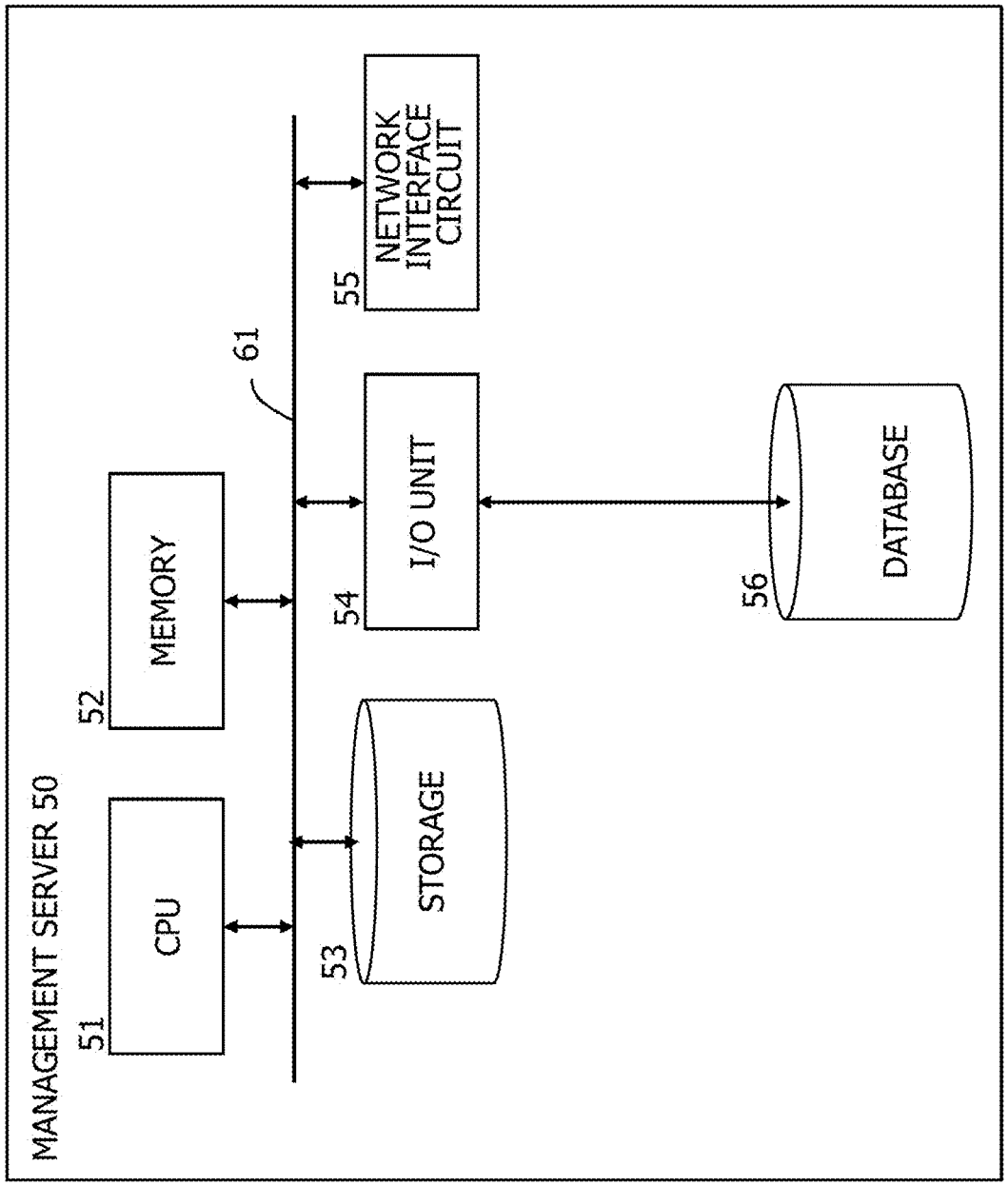
FIG. 3 is a diagram illustrating a hardware configuration of the management server 50.

Next, the management server will be described. FIG. 3 is a diagram illustrating a hardware configuration of the management server 50.

As illustrated in FIG. 3, the management server 50 includes a CPU 51, a memory 52, a storage 53, an I/O unit 54 (an external interface), a network interface circuit 55, and a database 56. The respective units are connected to each other via a bus 61.

Figure 4:
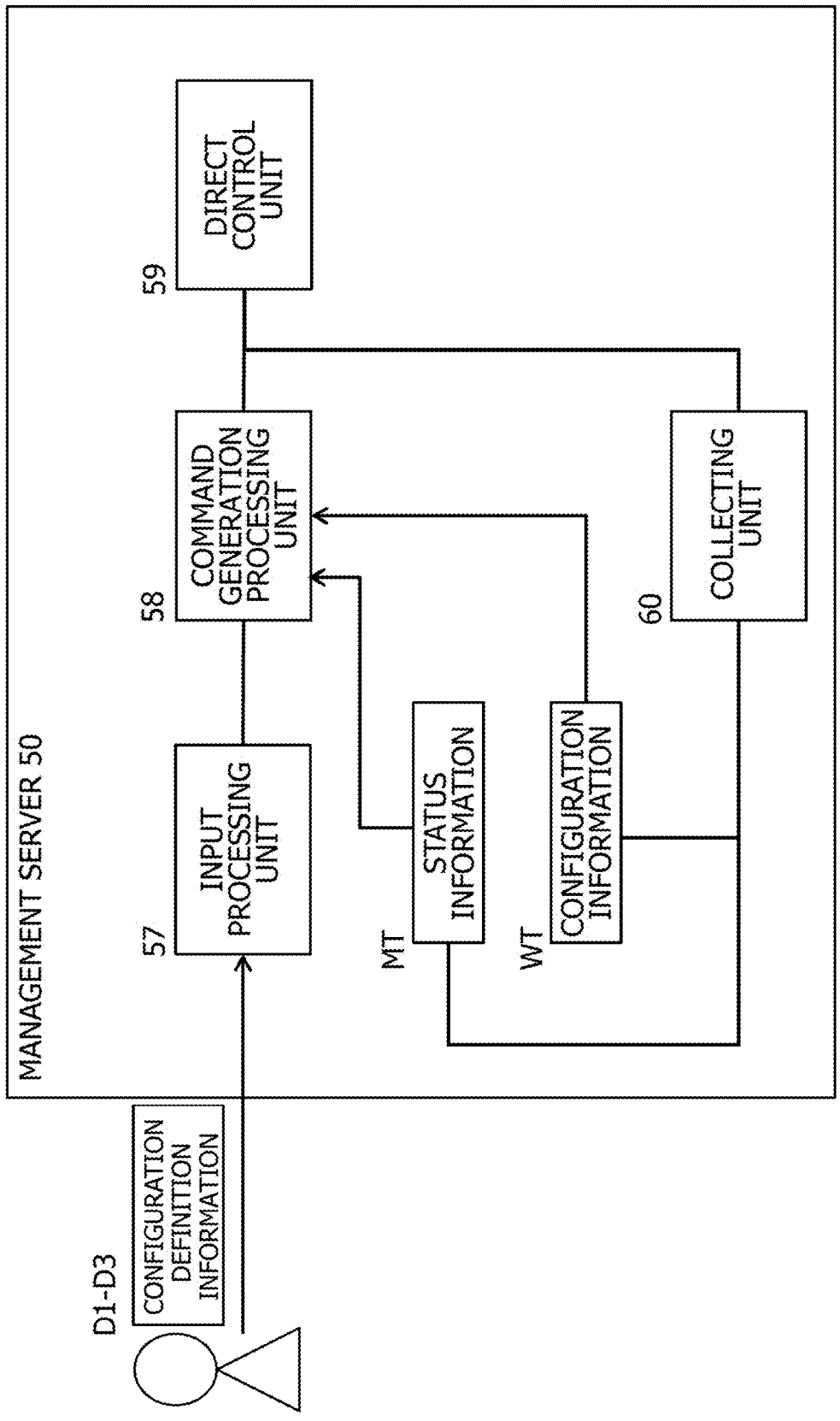
FIG. 4 is a diagram for describing a major function of the management server 50.

The CPU 51 executes a predetermined program read from the storage 53 into the memory 52 to thereby realize an input processing unit 57, a command generation processing unit 58, a direct control unit 59, a collecting unit 60, and the like as illustrated in FIG. 4. The memory 52 is a storage device such as a RAM. An OS and an application program executed by the management server 50 and data and the like used by the application program are stored in the storage 53. The I/O unit 54 communicates with the database 56, for example. The network interface circuit 55 is an interface circuit for communicating with other devices (the physical server 20 and the like) via the network NW and is a NIC, for example.

Function of Management Server

Next, a major function of the management server will be described. FIG. 4 is a diagram for describing a major function of the management server 50.

As illustrated in FIG. 4, the management server 50 includes the input processing unit 57, the command generation processing unit 58, the direct control unit 59, the collecting unit 60, the database 56, and the like. These respective functions are realized by the management server 50 (the CPU 51) executing a predetermined program read from the storage 53 into the memory 52. In FIG. 4, "configuration information" indicates the content of the work table WT that the collecting unit 60 transmits to the command generation processing unit 58, and "status information" indicates the content of the master table MT that the collecting unit 60 transmits to the command generation processing unit 58.

The input processing unit 57 mainly executes a process of receiving (acquiring) pieces of configuration definition information D1 to D3 input by a user.

The command generation processing unit 58 mainly executes a process of comparing the work table WT and the master table MT to extract difference information which is a difference between the work table WT and the master table MT and a process of generating the commands to be executed by the physical server 20 (the hypervisor 21), the storage device 40 (the SVP 43), and the network switch device 30 (the SVP 31) on the basis of the extracted difference information. The command generation processing unit 58 corresponds to a control information generating unit of the present invention.

For example, the command generation processing unit 58 may generate a command (for example, i1 to i10) for causing the physical servers 20A and 20B to be connected in common to the storage device 40. The command generation processing unit 58 may generate control information (for example, i11 to i19 to be described later) for cancelling the sharing state of the storage device 40 to which the physical servers 20A and 20B are connected in common. This command may be generated according to a determination result obtained by the command generation processing unit 58 (or the direct control unit 59) determining whether the physical servers 20A and 20B share the storage device 40 on the basis of the extracted difference information.

For example, the command generation processing unit 58 may generate a command (for example, i1 to i10) for causing the physical servers 20A and 20B to be connected via a virtual switch allocated to the network switch device 30. This command may be generated according to a determination result obtained by the command generation processing unit 58 (or the direct control unit 59) determining whether the physical servers 20A and 20B are to be connected via the network switch device 30 on the basis of the extracted difference information.

The direct control unit 59 mainly executes a process of transmitting the command generated by the command generation processing unit 58 to the physical server 20, the storage device 40, and the network switch device 30 via the network NW. The direct control unit 59 corresponds to a control unit of the present invention.

The collecting unit 60 mainly executes a process of reading the contents of the work table WT and the master table MT from the database 56. The collecting unit 60 may collect present configuration information of the information processing system 10 from a plurality of electronic devices (the physical server 20, the storage device 40, and the network switch device 30). In this case, first configuration definition information (the master table MT) indicating a present configuration of the information processing system 10 may be registered in the database 56 on the basis of the configuration information collected by the collecting unit 60. And second configuration definition information (the work table WT) indicating an input-configuration after the change of the information processing system 10 may be registered in the database 56.

The work table WT and the master table MT are mainly stored in the database 56.

The details of the respective functions illustrated in FIG. 4 will be described later (see FIGS. 11 to 17).

Configuration Definition Information

Next, a specific example of the configuration definition information will be described. FIG. 5 illustrates a specific example of the configuration definition information.

The configuration definition information illustrated in FIG. 5 is information for generating the virtual server 22A (the virtual server name: Dom0001) and the virtual server 22B (the virtual server name: Dom0002) in the physical server 20A (the physical server name: HW001) and the physical server 20B (the physical server name: HW002), respectively, and constructing an environment for connecting the virtual server 22A and 22B in common to the storage device 40 (the volume name: vd-1101).

As illustrated in FIG. 5, the configuration definition information includes server configuration definition information D1, network configuration definition information D2, and storage configuration definition information D3. The pieces of configuration definition information D1 to D3 include a correlation between the virtual servers 22A and 22B and the physical servers 20A and 20B, a correlation between the virtual servers 22A and 22B and the storage device 40, and a correlation between the virtual servers 22A and 22B and the network switch device 30.

The server configuration definition information D1 includes items such as "user", "virtual server", "virtual disk", and "virtual network".

The "user" includes items such as "user name" and "user ID". A user name like "AA corporation" is set in the "user name". Identification information for identifying a user like "0001" is set in the "user ID". As illustrated in FIG. 22, when a cluster system including two virtual servers 22A and 22B is configured, the server configuration definition information D1 includes two rows of server configuration definition information correlated with a "user name" (for example, "AA corporation"). When a cluster system including three or more virtual servers is configured, the server configuration definition information D1 includes three rows of server configuration definition information correlated with a "user name". The same is true for the network configuration definition information D2 and the storage configuration definition information D3.

The "virtual server" includes items such as "status", "host name", "virtual server name", "physical server name", "cluster group", "type", "server type", and "OS_type". A content (for example, "new" or "operating") indicating an operating state of a virtual server indicated by "virtual server name" is set in the "status". A host name like "AAA" is set in the "host name". A virtual server name like "Dom0001" is set in the "virtual server name". The name of the physical server 20 like "HW001" is set in the "physical server name". "A" or "B", for example, is set in the "cluster group". For example, when "A" is set, the content (part or all of the content) of a row immediately above a row that contains the "A" is copied to the row. "redundant" or "single" is set in the "type". The "type" in a master table MT8 (see FIG. 6) is set in the "server type". The type of an OS that operates on the virtual server 22 is stored in the "OS_type".

The "virtual disk" includes items such as "ID", "Disk name", and "Disk_type". Identification information of a virtual disk like "1101" is set in the "ID". A virtual disk name like "vd-1101" is set in the "Disk name". "shared" or "single" is set in the "Disk_type". For example, when "shared" is set, the content (part or all of the content) of a row immediately above a row that contains the "shared" is copied to the row.

The "virtual network" includes items such as "Port", "virtual network switch name", and "VLAN". The port of a virtual network like "Vnet001" is set in the "Port". A virtual network switch name like "vNex2" is set in the "virtual network switch name". An identification number of VLAN like "1101" is set in the "VLAN".

The network configuration definition information D2 includes items such as "user", "status", "network switch device name", "Port", "connection destination server", "Type", and "VLAN".

The "user" includes items such as "user name" and "user ID". The same contents as those of the server configuration definition information D1 are set in the "user name", the "user ID", and the "status". The name of the network switch device 30 like "Nex2" is set in the "network switch device name". A port number of the network switch device 30 is set in the "Port". A physical server name of a connection destination like "HW001" is set in the "connection destination server". The type (Tag or Port) of the "Port" is set in the "Type". An identification number of VLAN like "1101" is set in the "VLAN".

The storage configuration definition information D3 includes items such as "user", "status", "storage device name", "LUN", and "volume".

The "user" includes items such as "user name" and "user ID". The same contents as those of the server configuration definition information D1 are set in the "user name", the "user ID", and the "status". The name of the storage device 40 like "ET200-1" is set in the "storage device name".

The "LUN" includes items such as "LUN group" and "Lun number". The same content as the "virtual server name" in the server configuration definition information D1 like "Dom0001" is set in the "LUN group". A LUN number like "1101" is set in the "Lun number".

The "volume" includes items such as "RAID group", "Vol number", "Vol name", and "size". A RAID group like "RG #020" is set in the "RAID group". A Vol number like "1101" is set in the "Vol number". A Vol name (volume name) like "vd-1101" is set in the "Vol name". The size of a volume like "1 TB" is set in the "size".

Master Table

Next, a specific example of the master table will be described. FIG. 6 illustrates a specific example of the master table.

Information indicating a present configuration (a logical configuration) of the information processing system 10 is registered in the master table MT. The master table MT corresponds to first configuration definition information of the present invention. Hereinafter, it is assumed that the contents illustrated in FIG. 6 are registered in the master table MT as information indicating the present configuration (a logical configuration) of the information processing system 10.

As illustrated in FIG. 6, the master table MT includes a user table MT1, a virtual server table MT2, a virtual disk table MT3, a virtual network table MT4, a LUN table MT5, a network configuration definition table MT6, a volume table MT7, and a machine type table MT8. Since the respective items in the master tables MTs (MT1 to MT7) are the same as the respective items in the respective pieces of configuration definition information D1 to D3, the description thereof will be omitted.

Work Table

Next, a specific example of the work table will be described. FIG. 7 illustrates a specific example of the work table.

Information for changing a present configuration (a logical configuration) of the information processing system 10 is registered in the work table WT. The work table WT corresponds to second configuration definition information of the present invention. Hereinafter, it is assumed that information for generating the virtual server 22A (the virtual server name: Dom0001) and the virtual server 22B (the virtual server name: Dom0002) in the physical server 20A (the physical server name: HW001) and the physical server 20B (the physical server name: HW002), respectively, and constructing an environment for connecting the virtual servers 22A and 22B in common to the storage device 40 (the volume name: vd-1101) is registered in the work table WT as information for changing the present configuration (a logical configuration) of the information processing system 10.

As illustrated in FIG. 7, the work table WT includes a user table WT1, a virtual server table WT2, a virtual disk table WT3, a virtual network table WT4, a LUN table WT5, a network configuration definition table WT6, and a volume table WT7. The work tables WTs (WT1 to WT7) are obtained by dividing the respective pieces of configuration definition information D1 to D3 illustrated in FIG. 5 for respective categories such as a virtual server, a virtual storage, a virtual network, a network, and a storage. Since the respective items in the work tables WTs (WT1 to WT7) are the same as the respective items in the respective pieces of configuration definition information D1 to D3, the description thereof will be omitted.

Command Generated by Management Server (Command Generation Processing Unit)

Next, a specific example of a command generated by the management server 50 (the command generation processing unit 58) will be described. FIGS. 8 to 10 illustrate a specific example of the command generated by the management server 50.

The command generated by the management server 50 mainly includes commands related to virtual server creation (see FIG. 8), commands related to volume creation (see FIG. 9), and commands related to VLAN creation (see FIG. 10).

As illustrated in FIG. 8, the commands related to virtual server creation include a virtual server creation command i1, a CPU addition command i2, a Memory addition command i3, a virtual disk addition command i4, a virtual network addition command i5, and a multipath driver addition command i6. The commands related to virtual server creation i1 to i6 are transmitted from the management server 50 to the physical servers 20A and 20B via the network NW.

As illustrated in FIG. 9, the commands related to volume creation include a volume creation command i7 and a LUN group mapping command i8. The commands related to volume creation i7 to i8 are transmitted from the management server 50 to the storage device 40 via the network NW.

As illustrated in FIG. 10, the commands related to VLAN creation include a VLAN creation command i9 and a VLAN addition command i10. The commands related to VLAN creation i9 to i10 are transmitted from the management server 50 to the network switch device 30 via the network NW.

The details of the commands i1 to i10 illustrated in FIGS. 8 to 10 will be described later.

Operation Example 1 (Virtual Server Creation Process) of Management Server

Figure 11:
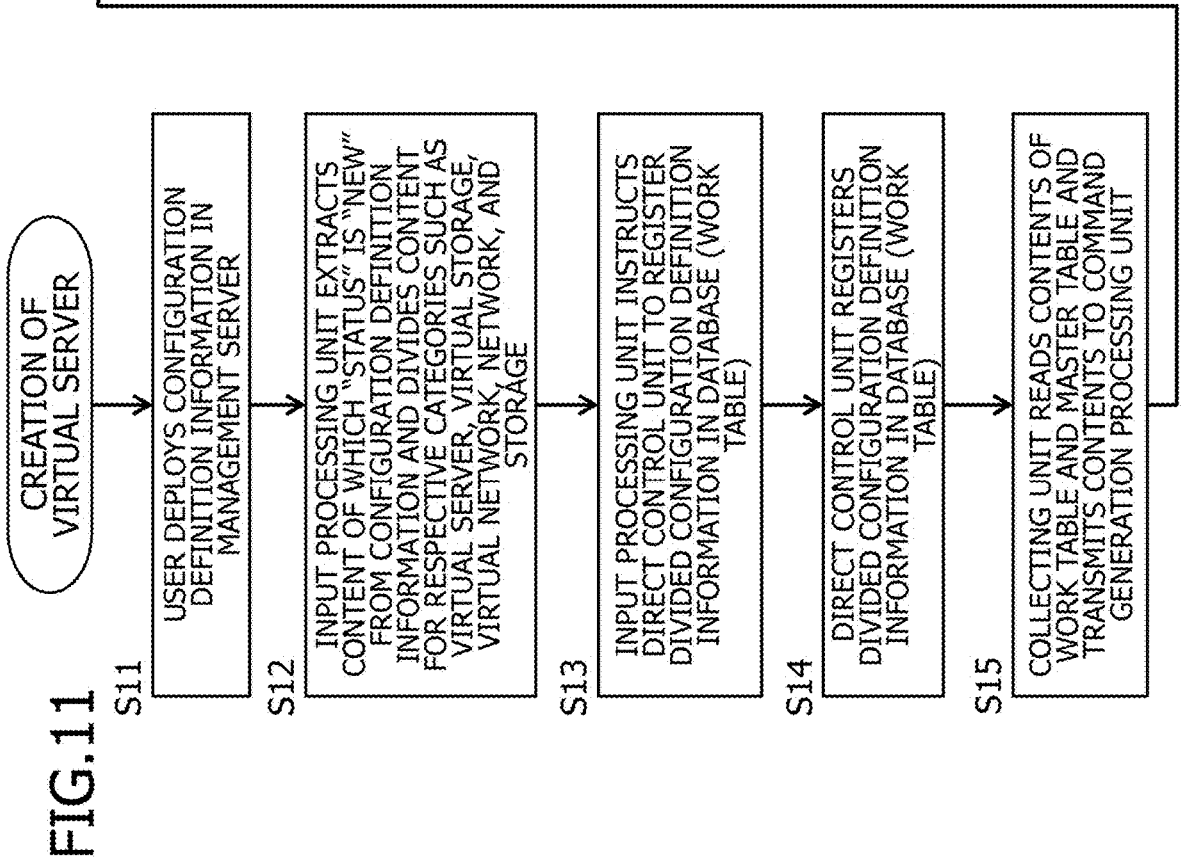
FIG. 11 is a flowchart for describing Operation Example 1 (virtual server creation process) of the management server 50.
Figure 13:
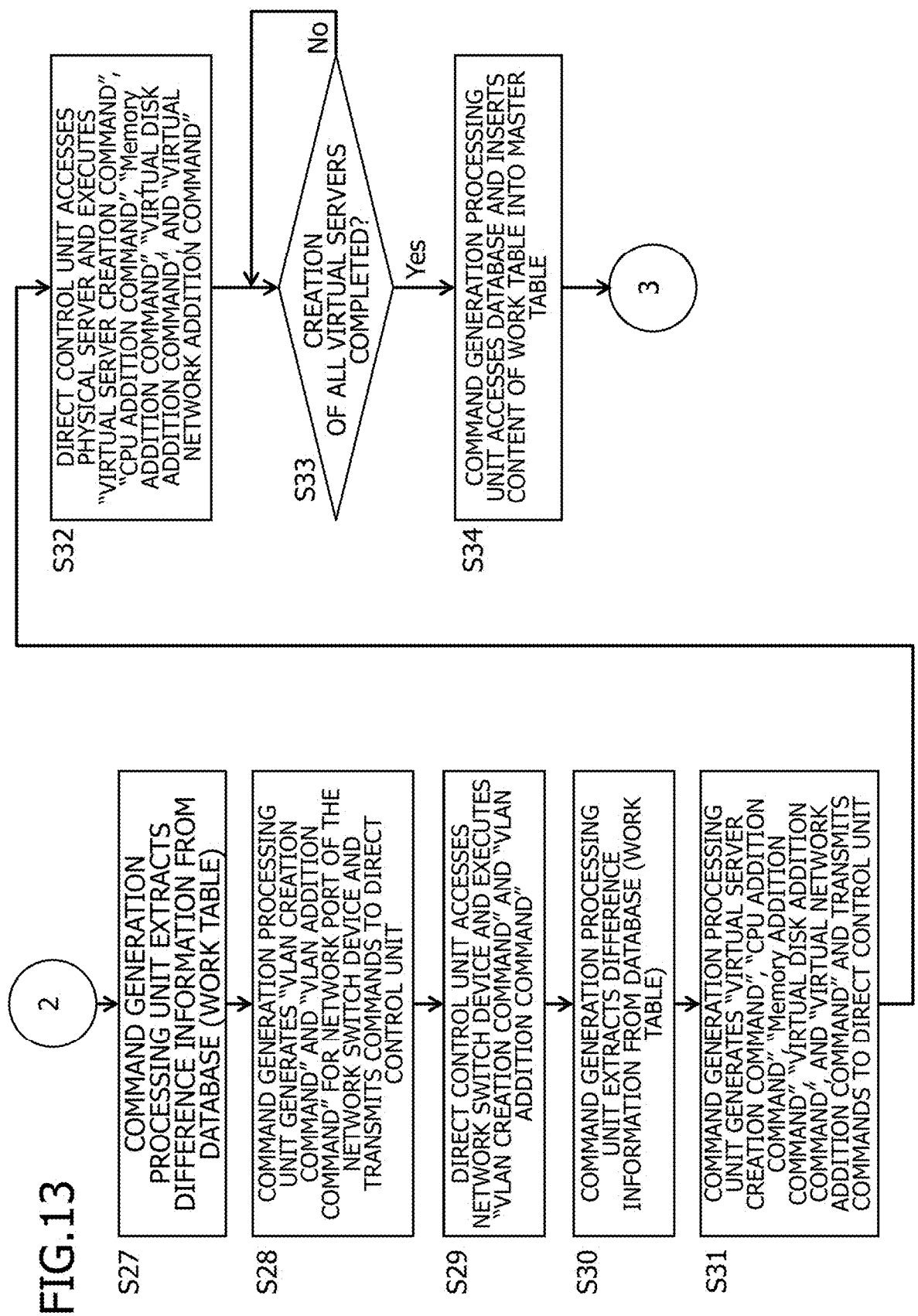
FIG. 13 is a flowchart for describing Operation Example 1 (virtual server creation process) of the management server 50.

Next, Operation Example 1 (a virtual server creation process) of the management server 50 will be described. FIGS. 11 to 13 are flowcharts for describing Operation Example 1 (virtual server creation process) of the management server 50.

As illustrated in FIG. 11, first, a user deploys the respective pieces of configuration definition information D1 to D3 (see FIG. 5) in the management server 50 (step S11). Specifically, the user inputs the respective pieces of configuration definition information D1 to D3 from a terminal (not illustrated) connected to the network NW. The pieces of inputted configuration definition information D1 to D3 are transmitted to the management server 50 via the network NW and the management server 50 (the input processing unit 57) receives (acquires) the same.

Subsequently, the input processing unit 57 extracts the content (row) of which the "status" is "new" from the pieces of configuration definition information D1 to D3 and divides the same for respective categories such as a virtual server, a virtual storage, a virtual network, a network, and a storage (step S12).

Subsequently, the input processing unit 57 instructs the direct control unit 59 to register the divided pieces of configuration definition information D1 to D3 in the database 56 (the work tables WT1 to WT7) (step S13).

Subsequently, the direct control unit 59 registers the divided pieces of configuration definition information D1 to D3 in the database 56 (the work tables WT1 to WT7) (step S14). In this way, the contents illustrated in FIG. 7 is registered in the work tables WT1 to WT7.

Subsequently, the collecting unit 60 reads the contents of the work tables WT1 to WT7 and the master tables MT1 to MT7 from the database 56 and transmits the contents to the command generation processing unit 58 (step S15).

Subsequently, the command generation processing unit 58 compares the work tables WT1 to WT7 and the master tables MT1 to MT7 (step S16). When the content of the work tables WT1 to WT7 is included in the master tables MT1 to MT7 (step S17: Yes), the process ends.

On the other hand, when the content of the work tables WT1 to WT7 is not included in the master tables MT1 to MT7 (step S17: No), the command generation processing unit 58 extracts difference information (for example, the information of a volume and a LUN) which is a difference between the work tables WT1 to WT7 and the master tables MT1 to MT7 from the database 56 (the work tables WT1 to WT7) (step S18).

Subsequently, the command generation processing unit 58 generates the volume creation command i7 on the basis of the extracted difference information and transmits the volume creation command i7 to the direct control unit 59 (step S19).

Subsequently, the direct control unit 59 accesses the storage device 40 and executes the volume creation command i7 to create a volume (step S20). Specifically, the direct control unit 59 transmits the volume creation command i7 to the storage device 40 via the network NW. The storage device 40 (the SVP 43) receives the volume creation command i7 and executes the same to create a volume.

When a volume creation operation is completed (step S21: Yes), the command generation processing unit 58 generates the LUN group mapping command i8 for collaborating the volume with server connection on the basis of the extracted difference information and transmits the LUN group mapping command i8 to the direct control unit 59 (step S22).

Subsequently, the direct control unit 59 accesses the storage device 40 and executes the LUN group mapping command i8 (step S23). Specifically, the direct control unit 59 transmits the LUN group mapping command i8 to the storage device 40 via the network NW. The storage device 40 (the SVP 43) receives the LUN group mapping command i8 and executes the same to create a LUN group (configures a connection with the physical server 20).

Subsequently, the management server 50 determines presence of a multipath driver of the physical server 20 (step S24). When the multipath driver is present (step S24: Present), the command generation processing unit 58 generates the multipath driver addition command i6 of the physical server 20 and transmits the same to the direct control unit 59 (step S25).

Subsequently, the direct control unit 59 accesses the physical server 20 and executes the multipath driver addition command i6 (step S26). Specifically, the direct control unit 59 transmits the multipath driver addition command i6 to the physical server 20 via the network NW. The physical server 20 receives the multipath driver addition command i6 (for example, the NIC 20d receives the command) and executes the same (for example, the hypervisor 21 executes the command) to thereby incorporate an LU into a multipath driver.

Subsequently, the command generation processing unit 58 extracts difference information (for example, information of a network) which is a difference between the work tables WT1 to WT7 and the master tables MT1 to MT7 from the database 56 (the work tables WT1 to WT7) (step S27).

Subsequently, the command generation processing unit 58 generates the VLAN creation command i9 and the VLAN addition command i10 of the network port of the network switch device 30 on the basis of the extracted difference information and transmits the commands to the direct control unit 59 (step S28).

Subsequently, the direct control unit 59 accesses the network switch device 30 and executes the VLAN creation command i9 and the VLAN addition command i10 (step S29). Specifically, the direct control unit 59 transmits the VLAN creation command i9 and the VLAN addition command i10 to the network switch device 30 via the network NW. The network switch device 30 (the SVP 31) receives the VLAN creation command i9 and the VLAN addition command i10 and executes the commands to thereby add a VLAN.

Subsequently, the command generation processing unit 58 extracts difference information (for example, information on a virtual server) which is a difference between the work tables WT1 to WT7 and the master tables MT1 to MT7 from the database 56 (the work tables WT1 to WT7) (step S30).

Subsequently, the command generation processing unit 58 generates the virtual server creation command i1, the CPU addition command i2, the Memory addition command i3, the virtual disk addition command i4, and the virtual network addition command i5 on the basis of the extracted difference information and transmits the commands to the direct control unit 59 (step S31).

Subsequently, the direct control unit 59 accesses the physical server 20 and executes the virtual server creation command i1, the CPU addition command i2, the Memory addition command i3, the virtual disk addition command i4, and the virtual network addition command i5 (step S32). Specifically, the direct control unit 59 transmits the virtual server creation command i1, the CPU addition command i2, the Memory addition command i3, the virtual disk addition command i4, and the virtual network addition command i5 to the physical server 20 via the network NW. The physical server 20 receives the virtual server creation command i1, the CPU addition command i2, the Memory addition command i3, the virtual disk addition command i4, and the virtual network addition command i5 (for example, the NIC 20d receives the commands) and executes the commands (for example, the hypervisor 21 executes the commands) to thereby create the virtual server 22.

When creation of all virtual servers 22 is completed (step S33: Yes), the command generation processing unit 58 inserts (registers) the contents of the work tables WT1 to WT7 in the master tables MT1 to MT7 (step S34).

Operation Example 1 of Information Processing System

Next, Operation Example 1 of the information processing system 10 will be described. FIGS. 14 to 17 are sequence diagrams for describing Operation Example 1 of the information processing system 10.

Figure 18:
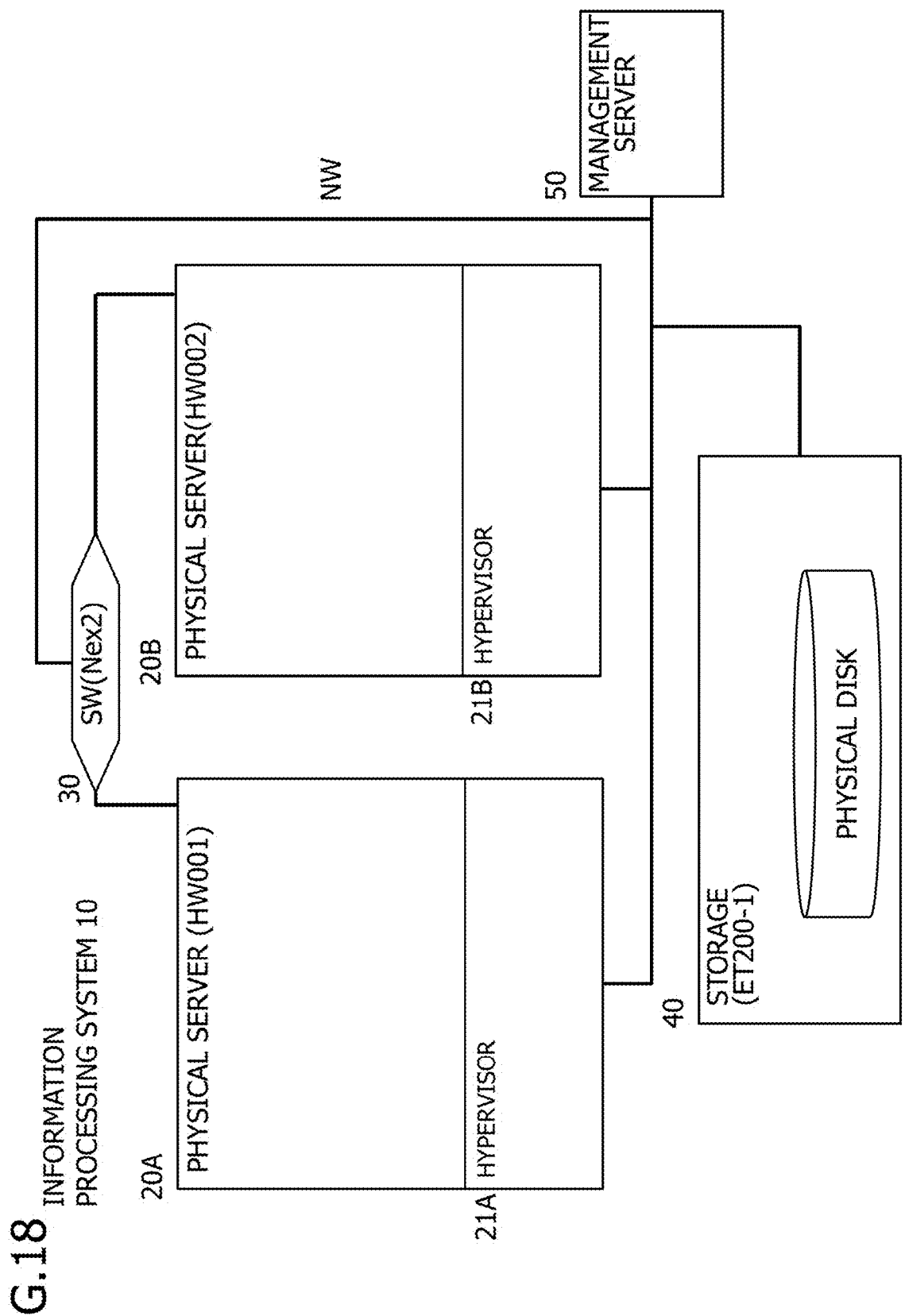
FIG. 18 illustrates a state in which the virtual server 22A (the virtual server name: Dom0001) and the virtual server 22B (the virtual server name: Dom0002) are not generated in the physical server 20A (the physical server name: HW001) and the physical server 20B (the physical server name: HW002), respectively, and an environment for connecting the virtual servers 22A and 22B in common to the storage device 40 (the volume name: vd-1101) is not constructed.

Hereinafter, a process of generating the virtual server 22A (the virtual server name: Dom0001) and the virtual server 22B (the virtual server name: Dom0002) in the physical server 20A (the physical server name: HW001) and the physical server 20B (the physical server name: HW002), respectively, from the state illustrated in FIG. 18, and constructing an environment for connecting the virtual servers 22A and 22B in common to the storage device 40 (the volume name: vd-1101) as illustrated in FIG. 22 will be described as Operation Example 1 of the information processing system 10. FIG. 18 illustrates a state in which the virtual server 22A (the virtual server name: Dom0001) and the virtual server 22B (the virtual server name: Dom0002) are not generated in the physical server 20A (the physical server name: HW001) and the physical server 20B (the physical server name: HW002), respectively, and an environment for connecting the virtual servers 22A and 22B in common to the storage device 40 (the volume name: vd-1101) is not constructed.

Figure 14:
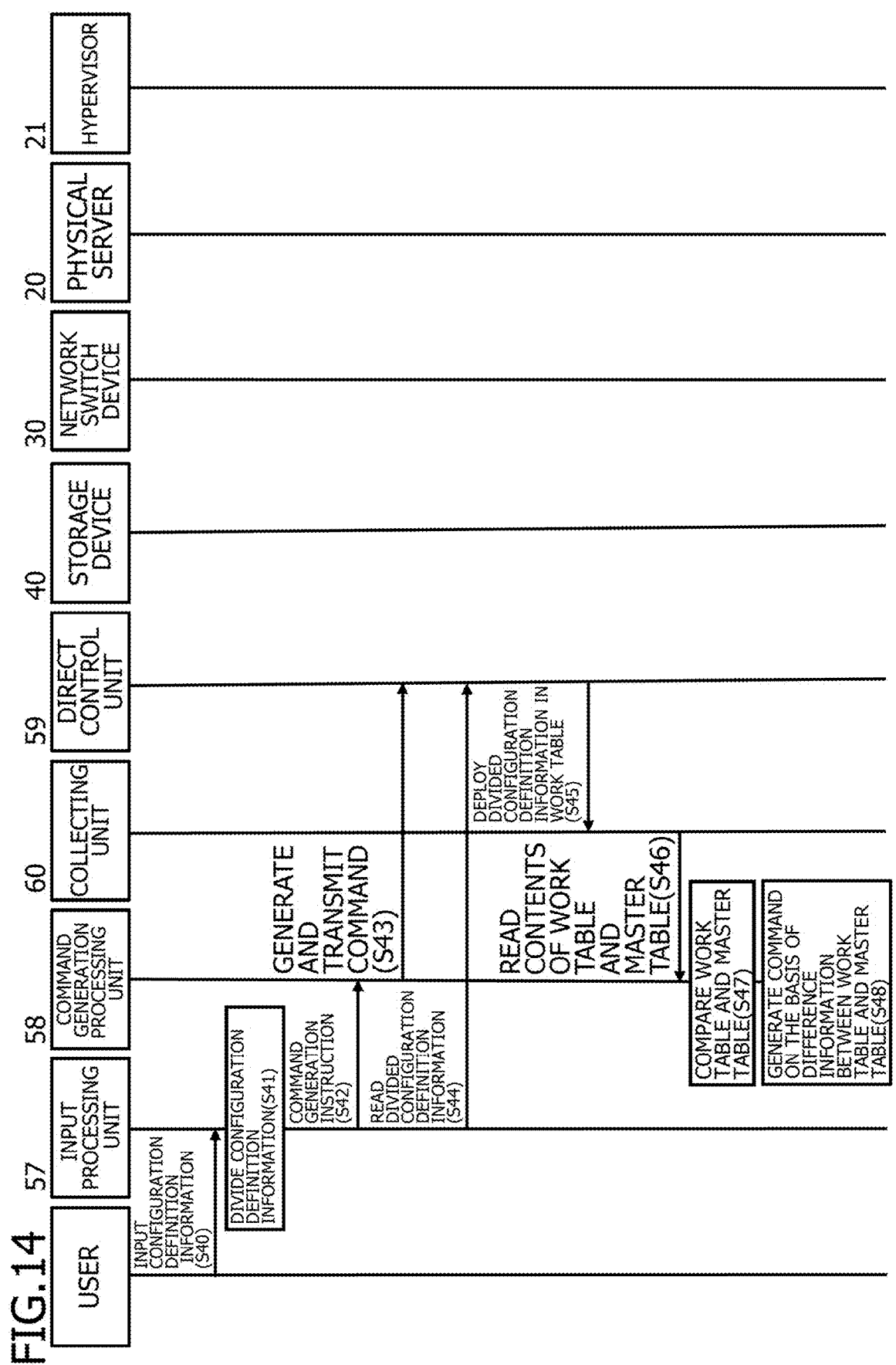
FIG. 14 is a sequence diagram for describing Operation Example 1 of the information processing system 10.

As illustrated in FIG. 14, first, a user inputs pieces of configuration definition information D1 to D3 (see FIG. 5) (step S40). Specifically, the user inputs the pieces of configuration definition information D1 to D3 from a terminal (not illustrated) or the like connected to the network NW. The pieces of configuration definition information D1 to D3 may be input from a keyboard or the like connected to the terminal and may be input by reading a file including the pieces of configuration definition information D1 to D3 into the terminal. The pieces of inputted configuration definition information D1 to D3 are transmitted to the management server 50 via the network NW and are received (acquired) by the management server 50 (the input processing unit 57).

Subsequently, the input processing unit 57 divides the pieces of configuration definition information D1 to D3 (step S41). Specifically, the input processing unit 57 extracts a content (row) of which the "status" is "new" from the pieces of configuration definition information D1 to D3 and divides the extracted content corresponding to the "new" for respective categories such as a virtual server, a virtual storage, a virtual network, a network, a storage, and the like.

Subsequently, the input processing unit 57 instructs the command generation processing unit 58 to generate a command for registering the divided pieces of configuration definition information D1 to D3 in the database 56 (the work tables WT1 to WT7) (step S42).

Subsequently, the command generation processing unit 58 generates a command for registering the divided pieces of configuration definition information D1 to D3 in the database 56 (the work tables WT1 to WT7) and transmits the command to the direct control unit 59 (step S43).

Subsequently, the direct control unit 59 reads the divided pieces of configuration definition information D1 to D3 from the input processing unit 57 (step S44).

Subsequently, the direct control unit 59 registers the read divided pieces of configuration definition information D1 to D3 in the database 56 (the work tables WT1 to WT7) (step S45). In this way, the contents illustrated in FIG. 7 are registered in the work tables WT1 to WT7.

Subsequently, the collecting unit 60 reads the contents of the work tables WT1 to WT7 and the master tables MT1 to MT7 from the database 56 and transmits the contents to the command generation processing unit 58 (step S46).

Subsequently, the command generation processing unit 58 compares the work tables WT1 to WT7 and the master tables MT1 to MT7 (step S47). When the content of the work tables WT1 to WT7 is not included in the master tables MT1 to MT7, the command generation processing unit 58 generates the commands i1 to i10 on the basis of the difference information (in this example, the content of the work tables WT1 to WT7) between the work tables WT1 to WT7 and the master tables MT1 to MT7 (step S48). That is, the command generation processing unit 58 generates the commands i1 to i10 in which the difference information (in this example, the content of the work table WT) between the work tables WT1 to WT7 and the master tables MT1 to MT7 is set (applied). A specific example of the commands i1 to i10 will be described later.

Specific Example of Volume Creation Command i7

First, the command generation processing unit 58 extracts difference information (for example, information of a volume and a LUN) which is a difference between the work tables WT1 to WT7 and the master tables MT1 to MT7 from the database 56 (the work tables WT1 to WT7) and generates the volume creation command i7 on the basis of the extracted difference information.

A specific example of the volume creation command i7 will be described with reference to FIG. 9.

As illustrated in FIG. 9, the volume creation command i7 includes a character string "ssh" arranged at the start, "<management user>", "<storage device name>", a command "create volume-name", "<volume name>", "<RAID group name>", "<size>", and "<volume number>".

A management user name (for example, root) of the storage device 40 is set in the portion "management user". "housing name (ET200-1)" in the volume table WT7 is set in the portion "storage device name". "vol name (vd-1101)" in the volume table WT7 is set in the portion "volume name". "RAID group (RG #020)" in the volume table WT7 is set in the portion "RAID group name". "size (1 TB)" in the volume table WT7 is set in the portion "size". "vol number (1101)" in the volume table WT7 is set in the portion "volume number".

As a result, the following command is generated as the volume creation command i7.

ssh <root>@<ET200-1> create volume-name <vd-1101> <RG #020>-size <1 TB>-volume-number <1101>

Figure 15:
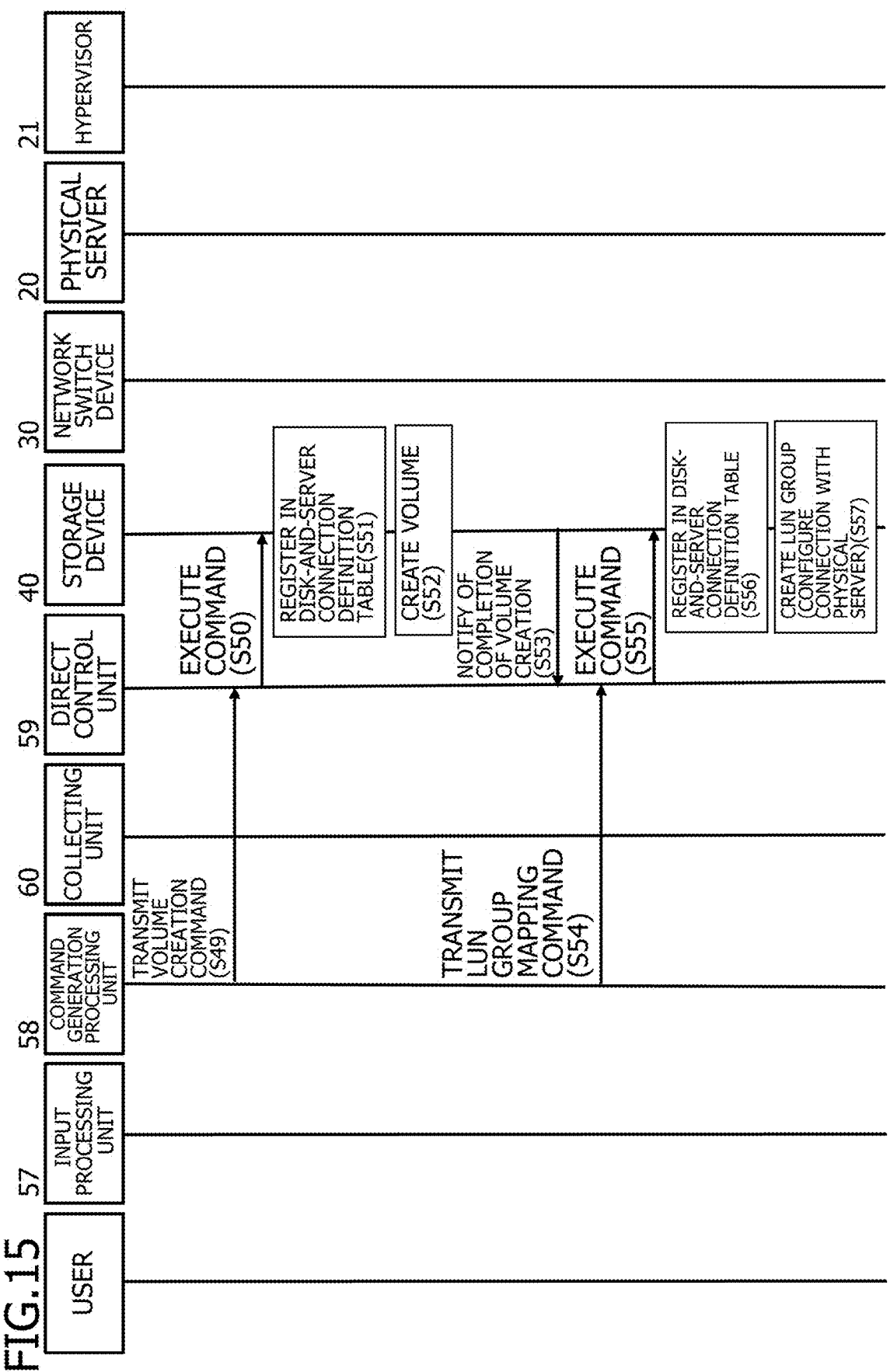
FIG. 15 is a sequence diagram for describing Operation Example 1 of the information processing system 10.

Subsequently, as illustrated in FIG. 15, the command generation processing unit 58 transmits the generated volume creation command i7 to the direct control unit 59 (step S49).

Subsequently, the direct control unit 59 accesses the storage device 40 and executes the volume creation command i7 (step S50). Specifically, the direct control unit 59 transmits the volume creation command i7 to the storage device 40 using an IP address correlated with the "storage device name (ET200-1)" in the volume creation command i7. The IP address can be acquired by referring to a correlation (not illustrated) between the IP address and the "storage device name" retained by the storage 53 of the management server 50, for example. The "storage device name" and the IP address are acquired from the storage device 40 (the SVP 43) by the collecting unit 60, for example, and are stored in the storage 53 of the management server 50 in a correlated state.

Subsequently, the storage device 40 (the SVP 43) executes a process of receiving the volume creation command i7 transmitted from the management server 50 via the network NW and a process of registering the data in the disk-and-server connection definition table T2 stored in the memory included in the SVP 43 (step S51). Specifically, the "storage device name (ET200-1)" and the "volume name (vd-1011)" in the volume creation command i7 are registered in the "storage device name" and the "Vol name" in the disk-and-server connection definition table T2 (see FIG. 23), respectively. Moreover, a connection state of the disk and the server is registered in the "state" in the disk-and-server connection definition table T2.

Figure 19:
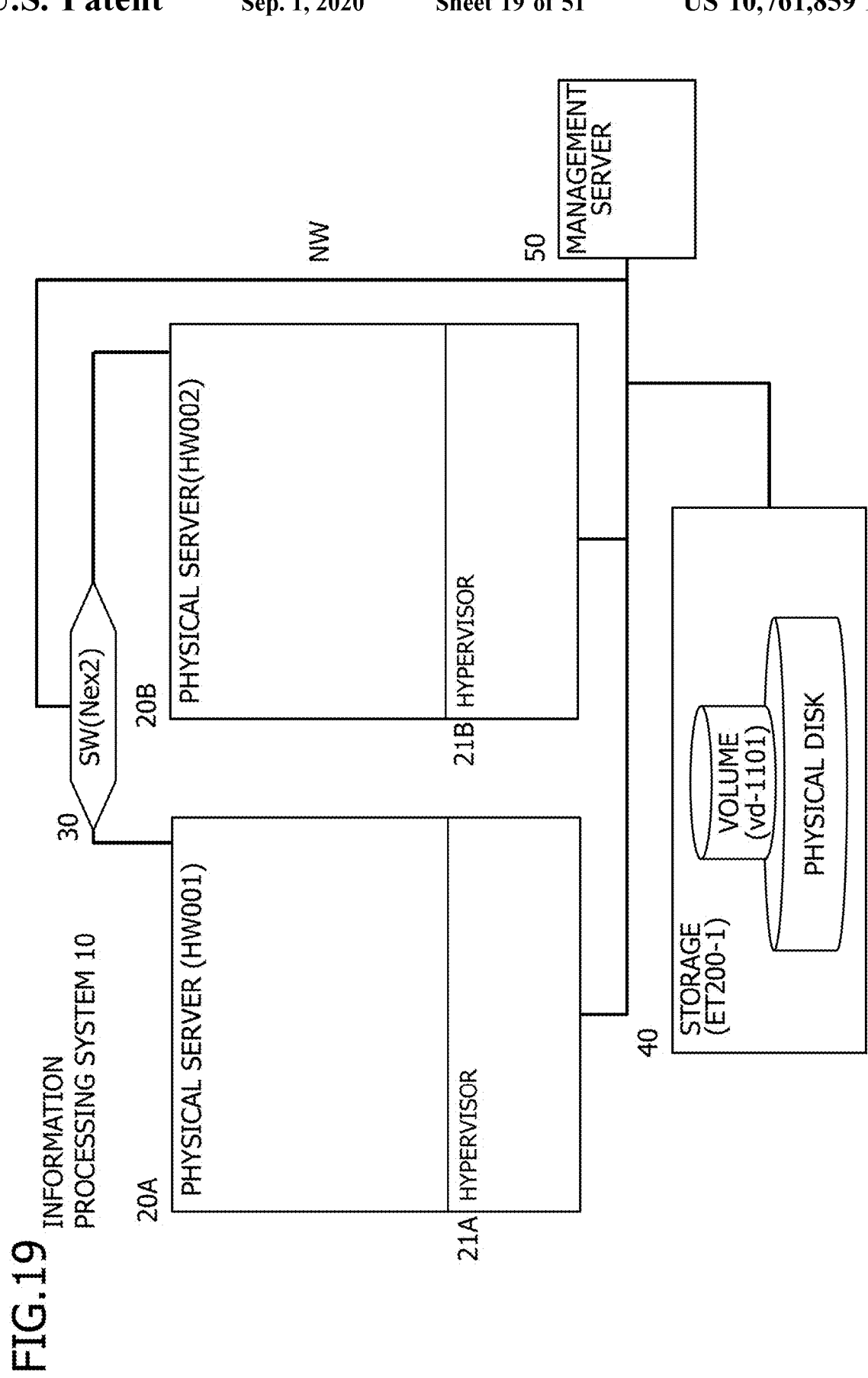
FIG. 19 illustrates a state in which a volume (volume name: vd-1101) is created in the state illustrated in FIG. 18.

The storage device 40 (the SVP 43) executes the volume creation command i7 received from the management server 50 to thereby create a volume (volume name: vd-1101) as illustrated in FIG. 19 (step S52). FIG. 19 illustrates a state in which a volume (volume name: vd-1101) in the state illustrated in FIG. 18.

When creation of the volume is completed, the storage device 40 (the SVP 43) notifies the direct control unit 59 of completion of volume creation (step S53).

Specific Example of LUN Group Mapping Command i8

Subsequently, the command generation processing unit 58 generates the LUN group mapping command i8 on the basis of the extracted difference information and transmits the same to the direct control unit 59 (step S54).

A specific example of the LUN group mapping command i8 will be described with reference to FIG. 9.

As illustrated in FIG. 9, the LUN group mapping command i8 includes a character string "ssh" arranged at the start, "<management user>", "<storage device name>", a command "set lun-group-lg-name", "<LUN group name>", "<volume name>", and "<lun number>".

A management user name (for example, root) of the storage device 40 is set in the portion "management user". "storage device name (ET200-1)" in the LUN table WT5 is set in the portion "storage device name". "LUN group name (Dom0001 and Dom0002)" in the LUN table WT5 is set in the portion "LUN group name". "Vol name (vd-1101)" in the LUN table WT5 is set in the portion "volume name". "LUN number (1101)" in the LUN table WT5 is set in the portion "lun number".

As a result, the following two commands are generated as the LUN group mapping command i8.
 (1) ssh <root>@<ET200-1> set lun-group-Ig-name <Dom0001>-volume-name<vd-1101>-lun <1101>
 (2) ssh <root>@<ET200-1> set lun-group-Ig-name <Dom0002>-volume-name<vd-1101>-lun <1101>

Subsequently, returning to FIG. 15, the direct control unit 59 accesses the storage device 40 and executes the LUN group mapping command i8 (step S55). Specifically, the direct control unit 59 transmits the LUN group mapping command i8 to the storage device 40 using an IP address correlated with the "storage device name (ET200-1)" in the LUN group mapping command i8.

Subsequently, the storage device 40 (the SVP 43) executes a process of receiving the LUN group mapping command i8 transmitted from the management server 50 via the network NW and a process of registering the data in the disk-and-server connection definition table T2 stored in the memory included in the SVP 43 (step S56). Specifically, the "LUN group name (Dom0001)" in the LUN group mapping command i8 is registered in "connection server name" in the disk-and-server connection definition table T2 (see FIG. 23).

Figure 20:
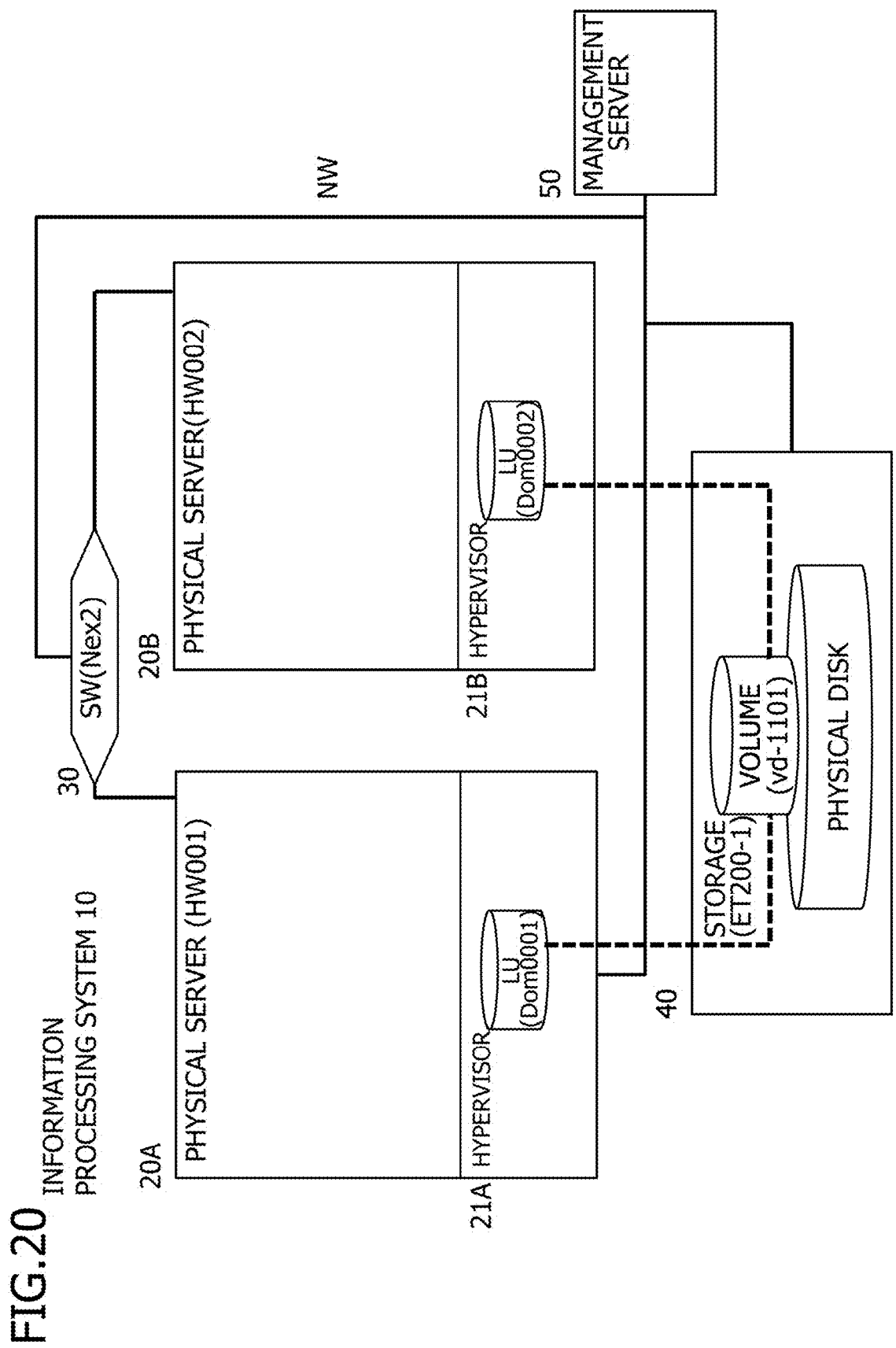
FIG. 20 illustrates a state in which the LUN group (LUN group name: Dom0001 and Dom0002) is created (the connection with the physical server 20 is configured) in the state illustrated in FIG. 19.

The storage device 40 (the SVP 43) executes the LUN group mapping command i8 received from the management server 50 to thereby create a LUN group (LUN group name: Dom0001 and Dom0002) (configure the connection with the physical server 20) as illustrated in FIG. 20 (step S57). FIG. 20 illustrates a state in which the LUN group (LUN group name: Dom0001 and Dom0002) is created (the connection with the physical server 20 is configured) in the state illustrated in FIG. 19.

Specific Example of VLAN Creation Command i9

Figure 16:
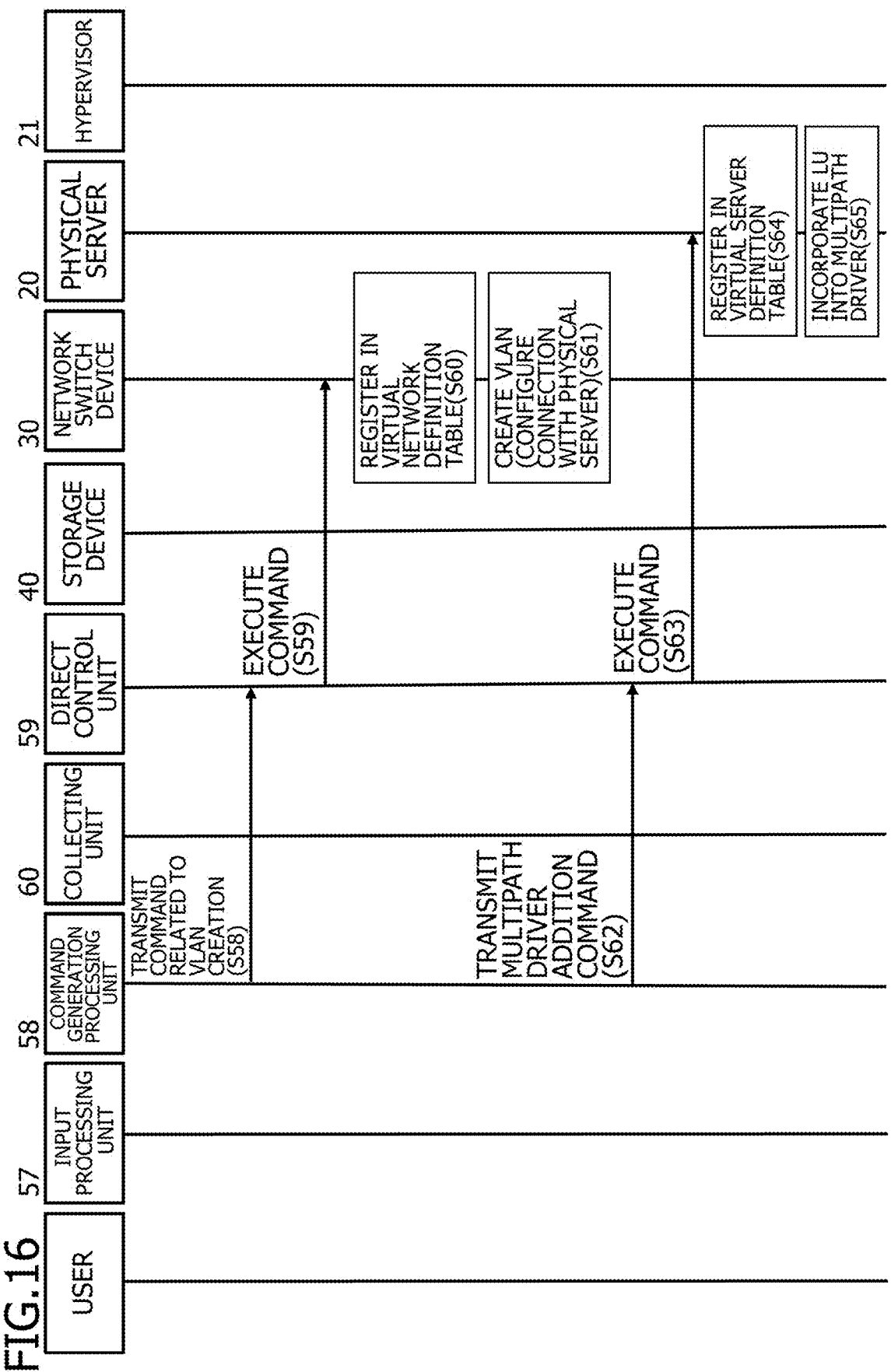
FIG. 16 is a sequence diagram for describing Operation Example 1 of the information processing system 10.
Figure 17:
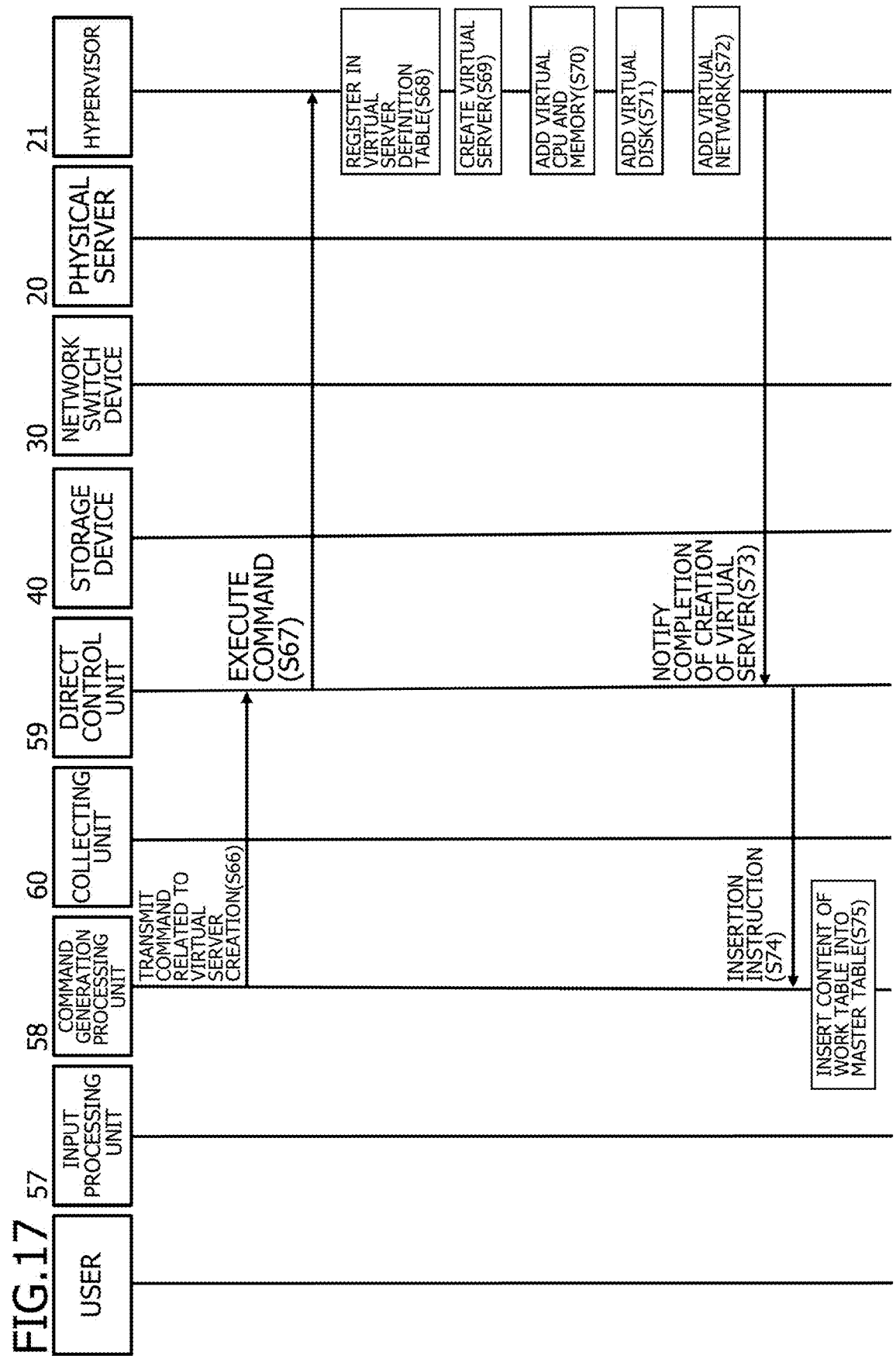
FIG. 17 is a sequence diagram for describing Operation Example 1 of the information processing system 10.

Subsequently, as illustrated in FIG. 16, the command generation processing unit 58 generates commands related to VLAN creation (the VLAN creation command i9 and the VLAN addition command i10) and transmits the commands related to VLAN creation i9 and i10 to the direct control unit 59 (step S58).

A specific example of the VLAN creation command i9 will be described with reference to FIG. 10.

As illustrated in FIG. 10, the VLAN creation command i9 includes a character string "ssh" arranged at the start, "<management user>", "<network switch name>", a command "vlan", and "<VLAN ID>". The management user (for example, root) of the network switch device 30 is set in the portion "management user". "switch name (Nex2)" in the network configuration definition table WT6 is set in the portion "network switch name". "VLAN (1101)" in the network configuration definition table WT6 is set in the portion "VLAN ID".

As a result, the following command is generated as the VLAN creation command i9.
 ssh <root>@<Nex2> vlan <1101>

Specific Example of VLAN Addition Command i10

A specific example of the VLAN addition command i10 will be described with reference to FIG. 10.

As illustrated in FIG. 10, the VLAN addition command i10 includes a character string "ssh" arranged at the start, "<management user>", "<network switch name>", a command "interface", and "<port>". Moreover, the VLAN addition command i10 includes a character string "ssh" arranged at the start, "<management user>", "<network switch name>", a command "switch mode trunk". Moreover, the VLAN addition command i10 includes a character string "ssh" arranged at the start, "<management user>", "<network switch name>", a command "switch trunk allowed vlan add", and "<VLAN ID>". The management user name (for example, root) of the network switch device 30 is set in the portion "management user". The "switch name (Nex2)" in the network configuration definition table WT6 is set in the portion "network switch name". The "port (010 and 011)" in the network configuration definition table WT6 is set in the portion "port". The "VLAN (1101)" in the network configuration definition table WT6 is set in the portion "VLAN ID".

As a result, the following four commands are generated as the VLAN addition command i10.
 (1) ssh <root>@<Nex2> interface <010>
 (2) ssh <root>@<Nex2> interface <011>
 (3) ssh <root>@<Nex2> switch mode trunk
 (4) ssh <root>@<Nex2> switch trunk allowed vlan add <1101>

Subsequently, returning to FIG. 16, the direct control unit 59 accesses the network switch device 30 and executes commands related to VLAN creation i9 and i10 (step S59). Specifically, the direct control unit 59 transmits the commands related to VLAN creation i9 and i10 to the network switch device 30 using an IP address correlated with the "network switch name (Nex2)" in the commands related to VLAN creation i9 and i10. The IP address can be acquired by referring to a correlation (not illustrated) between the IP address and the "network switch name" retained by the storage 53 of the management server 50, for example. The "network switch name" and the IP address are acquired from the network switch device 30 (the SVP 31) by the collecting unit 60, for example, and are stored in the storage 53 of the management server 50 in a correlated state.

Subsequently, the network switch device 30 (the SVP 31) executes a process of receiving the commands related to VLAN creation i9 and i10 transmitted from the management server 50 via the network NW and a process of registering the data in the virtual network definition table T3 stored in the memory included in the SVP 31 (step S60). Specifically, "port (010 and 011)" and "VLAN ID (1101)" in the commands related to VLAN creation i9 and i10 are registered in "Port" and "VLAN" in the virtual network definition table T3 (see FIG. 23), respectively. "Tag" is registered in the "Type" in the virtual network definition table T3 (see FIG. 23) when the VLAN addition command i10 contains a command "trunk (meaning of tag)". Moreover, the state of the virtual network is registered in the "state" in the virtual network definition table T3.

Figure 21:
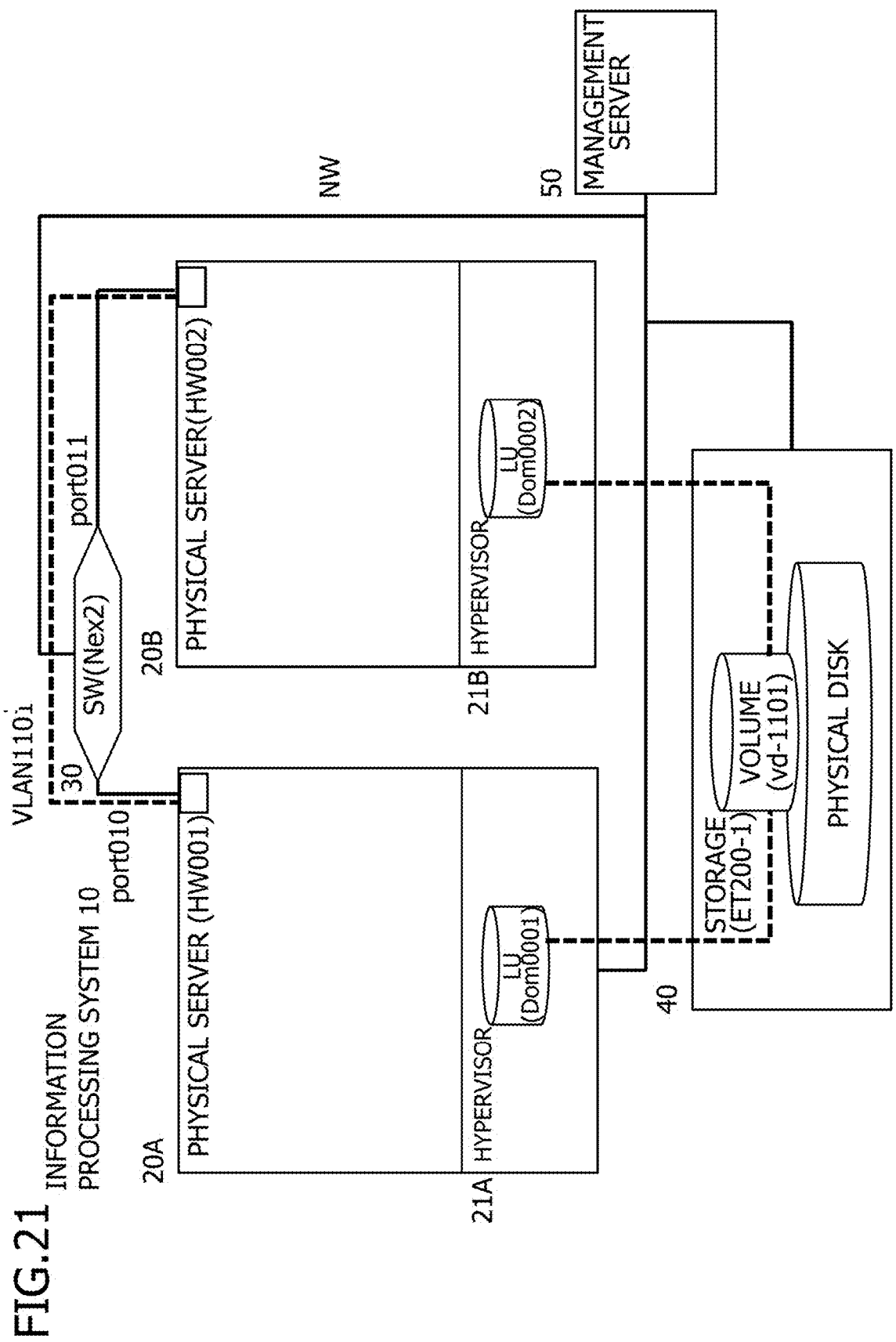
FIG. 21 illustrates a state in which a VLAN (VLAN name: 1101) is created (the connection with the physical server 20 is configured) in the state illustrated in FIG. 20.

The network switch device 30 (the SVP 31) executes the commands related to VLAN creation i9 and i10 received from the management server 50 to thereby create a VLAN (VLAN name: 1101) (configure the connection with the physical server 20) as illustrated in FIG. 21 (step S61). FIG. 21 illustrates a state in which a VLAN (VLAN name: 1101) is created (the connection with the physical server 20 is configured) in the state illustrated in FIG. 20.

Specific Example of Multipath Driver Addition Command i6

Subsequently, when the multipath driver is present in the physical server 20, the command generation processing unit 58 generates the multipath driver addition command i6 of the physical server 20 and transmits the command to the direct control unit 59 (step S62).

A specific example of the multipath driver addition command i6 will be described with reference to FIG. 8.

As illustrated in FIG. 8, the multipath driver addition command i6 includes a character string "ssh" arranged at the start, "<management user>", "<physical server name>", and a command "grmpdautoconf". The management user name (for example, root) of the physical server 20 is set in the portion "management user". The "physical server name (HW001 and HW002)" in the virtual server table WT2 is set in the portion "physical server name".

As a result, the following two commands are generated as the multipath driver addition command i6.
(1) ssh <root>@<HW001> grmpdautoconf
(2) ssh <root>@<HW002> grmpdautoconf Subsequently, the direct control unit 59 accesses the physical server 20 and executes the multipath driver addition command i6 (step S63). Specifically, the direct control unit 59 transmits the multipath driver addition command i6 to the physical server 20 using an IP address correlated with the "physical server name (HW001 and HW002)" in the multipath driver addition command i6. The "physical server name" and the IP address are acquired from the physical server 20 (for example, the NIC 20d) by the collecting unit 60, for example, and are stored in the storage 53 of the management server 50 in a correlated state.

Subsequently, the physical server 20 executes a process of receiving the multipath driver addition command i6 from the management server 50 via the network NW (for example, the NIC 20d receives the command) and a process of registering the data in the virtual server definition table T1 stored in the memory (not illustrated) included in the SVP 23 (for example, the hypervisor 21 causes the SVP 23 to register the data) (step S64). Specifically, when the multipath driver is present in the physical server 20, "present" is registered in the "multipath" in the virtual server definition table T1 (see FIG. 23).

The physical server 20 executes the multipath driver addition command i6 received from the management server 50 (for example, the hypervisor 21 executes the command) to thereby incorporate an LU into the multipath driver (step S65).

Subsequently, the command generation processing unit 58 generates commands related to virtual server creation (the virtual server creation command i1, the CPU addition command i2, the Memory addition command i3, the virtual disk addition command i4, and the virtual network addition command i5) and transmits the commands related to virtual server creation i1 to i5 to the direct control unit 59 (step S66).

Specific Example of Virtual Server Creation Command i1

A specific example of the virtual server creation command i1 will be described with reference to FIG. 8.

As illustrated in FIG. 8, the virtual server creation command i1 includes a character string "ssh" arranged at the start, "<management user>", "<physical server name>", a command "ldm add-domain", and a "<virtual server name>". The management user name (for example, root) of the physical server 20 is set in the portion "management user". The "physical server name (HW001 and HW002)" in the virtual server table WT2 is set in the portion "physical server name". The "virtual server name (Dom0001 and Dom0002)" in the virtual server table WT2 is set in the portion "virtual server name".

As a result, the following two commands are generated as the virtual server creation command i1.
(1) ssh <root>@<HW001> ldm add-domain <Dom0001>
(2) ssh <root>@<HW002> ldm add-domain <Dom0002>

Specific Example of CPU Addition Command i2

A specific example of the CPU addition command i2 will be described with reference to FIG. 8.

As illustrated in FIG. 8, the CPU addition command i2 includes a character string "ssh" arranged at the start, "<management user>", "<physical server name>", a command "ldm set-core", "<number of cores>", and "<virtual server name>". The management user name (for example, root) of the physical server 20 is set in the portion "management user". The "physical server name (HW001 and HW002)" in the virtual server table WT2 is set in the portion "physical server name". The "number of CPUs" in the machine type table MT8 corresponding to the "type" the same as the "machine type" in the virtual server table WT2 is set in the portion "number of cores". For example, as illustrated in FIG. 7, when the "machine type" in the work table WT2 is 2, the "number of CPUs (in this example, 4)" in the machine type table MT8 corresponding to the "type (in this example, 2)" the same as the "machine type (in this example, 2)" in the virtual server table WT2 is set in the "number of cores". The "virtual server name (Dom0001 and Dom0002)" in the virtual server table WT2 is set in the portion "virtual server name".

As a result, the following two commands are generated as the CPU addition command i2.
(1) ssh <root>@<HW001> ldm set-core <4> <Dom0001>
(2) ssh <root>@<HW002> ldm set-core <4> <Dom0002>

Specific Example of Memory Addition Command i3

A specific example of the Memory addition command i3 will be described with reference to FIG. 8.

As illustrated in FIG. 8, the Memory addition command i3 includes a character string "ssh" arranged at the start, "<management user>", "<physical server name>", a command "Idm set-memory", "<capacity>", and "<virtual server name>". The management user name (for example, root)" of the physical server 20 is set in the portion "management user". The "physical server name (HW001 and HW002)" in the virtual server table WT2 is set in the portion "physical server name". The "Memory capacity" in the machine type table MT8 corresponding to the "type" the same as the "machine type" in the virtual server table WT2 is set in the portion "capacity". For example, as illustrated in FIG. 7, when the "machine type" in the work table WT2 is 2, the "Memory capacity (in this example, 64 GB)" in the machine type table MT8 corresponding to the "type (in this example, 2)" the same as the "machine type (in this example, 2)" in the virtual server table WT2 is set in the portion "capacity". The "virtual server name (Dom0001 and Dom0002)" in the virtual server table WT2 is set in the portion "virtual server name".

As a result, the following two commands are generated as the Memory addition command i3.

(1) ssh <root>@<HW001> Idm set-memory <4> <Dom0001>

(2) ssh <root>@<HW002> Idm set-memory <4> <Dom0002>

Specific Example of Virtual Disk Addition Command i4

A specific example of the virtual disk addition command i4 will be described with reference to FIG. 8.

As illustrated in FIG. 8, the virtual disk addition command i4 includes a character string "ssh" arranged at the start, "<management user>", "<physical server name>", a command "Idm add-vdsdev", "<LUN>", "<virtual disk name>", and "<virtual disk service name>". Moreover, the virtual disk addition command i4 includes a character string "ssh" arranged at the start, "<management user>", "<physical server name>", a command "Idm add-vdisk", "<virtual disk name>", "<virtual disk service name>", and "<virtual server name>". The management user name (for example, root) of the physical server 20 is set in the portion "management user". The "physical server name (HW001 and HW002)" in the virtual server table WT2 is set in the portion "physical server name". The "Lun number (1101)" in the virtual disk table WT3 is set in the portion "LUN". The "Disk name (vd-1101)" in the virtual disk table WT3 is set in the portion "virtual disk name". A default name is set in the portion "virtual disk service name". The "virtual server name (Dom0001 and Dom0002)" in the virtual disk table WT3 is set in the portion "virtual server name".

As a result, the following four commands are generated as the virtual disk addition command i4.

(1) ssh <root>@<HW001> Idm add-vdsdev <1101> <vd-1101>@<default name>

(2) ssh <root>@<HW002> Idm add-vdsdev <1101> <vd-1101>@<default name>

(3) ssh <root>@<HW001> Idm add-vdisk <vd-1101> <vd-1101>@<default name> <Dom0001>

(4) ssh <root>@<HW002> Idm add-vdisk <vd-1101> <vd-1101>@<default name> <Dom0002>

Specific Example of Virtual Network Addition Command i5

A specific example of the virtual network addition command i5 will be described with reference to FIG. 8.

As illustrated in FIG. 8, the virtual network addition command i5 includes a character string "ssh" arranged at the start, "<management user>", "<physical server name>", a command "Idm add-vnet pvid=", "<VLAN ID>", "<virtual network port name>", "<virtual switch name>", and "<virtual server name>". The management user name (for example, root) of the physical server 20 is set in the portion "management user". The "physical server name (HW001 and HW002)" in the virtual server table WT2 is set in the portion "physical server name". The "VLAN (1101)" in the virtual network table WT4 is set in the portion "VLAN ID". The "port name (Vnet001)" in the virtual network table WT4 is set in the portion "virtual network port name". The "virtual switch name (VNex2)" in the network configuration definition table WT6 is set in the portion "virtual switch name". The "virtual server name (Dom0001 and Dom0002)" in the virtual network table WT4 is set in the portion "virtual server name".

As a result, the following two commands are generated as the virtual network addition command i5.

(1) ssh <root>@<HW001> Idm add-vnet pvid=<1101> <Vnet001> <VNex2> <Dom0001>

(2) ssh <root>@<HW002> Idm add-vnet pvid=<1101> <Vnet001> <VNex2> <Dom0002>

Subsequently, returning to FIG. 17, the direct control unit 59 accesses the physical server 20 and executes the commands related to virtual server creation i1 to i5 (step S67). Specifically, the direct control unit 59 transmits the commands related to virtual server creation i1 to i5 to the physical server 20 using an IP address correlated with the "physical server name (HM001 and HM002) in the commands related to virtual server creation i1 to i5. The IP address can be acquired by referring to a correlation (not illustrated) between the IP address and the "physical server name" retained by the storage 53 of the management server 50, for example.

Subsequently, the physical server 20 executes a process of receiving the commands related to virtual server creation i1 to i5 transmitted from the management server 50 via the network NW (for example, the NIC 20*d* receives the commands) and a process of registering the data in the virtual server definition table T1 stored in the memory (not illustrated) included in the SVP 23 (for example, the hypervisor 21 causes the SVP 23 to register the data) (step S68). Specifically, the "virtual server name" in the virtual server creation command i1, the "number of cores" in the CPU addition command i2, the "capacity" in the Memory addition command i3, the "virtual disk name" in the virtual disk addition command i4, the "virtual network port name" in the virtual network addition command i5, the "virtual switch name" in the virtual network addition command i5, and the "VLAN ID" in the virtual network addition command i5 are registered in the "virtual server name", the "number of CPUs", the "Memory capacity", the "Disk name", the "port name", the "virtual switch name", and the "VLAN" in the virtual server definition table T1 (see FIG. 23), respectively. Moreover, the type of a physical port like "dedicated switch" is registered in the "physical port" in the virtual server definition table T1. Moreover, the state of the virtual server is registered in the "state" in the virtual server definition table T1.

The physical server 20 (the hypervisor 21) executes the commands related to virtual server creation i1 to i5 received from the management server 50 to thereby create the virtual server 22 (a virtual CPU, a memory, a virtual disk, a virtual network, and the like) as illustrated in FIG. 22 (steps S69 to S72). FIG. 22 illustrates a state in which the virtual server 22 (the virtual CPU, the memory, the virtual disk, the virtual network, and the like) is created in the state illustrated in FIG. 21.

When the creation of the virtual servers is completed, the physical server 20 (the hypervisor 21 or the SVP 23) notifies the direct control unit 59 of completion of creation of the virtual servers (step S73).

Subsequently, the command generation processing unit 58 accesses the database 56 according to an instruction (step S74) of the direct control unit 59 and inserts the contents of the work tables WT1 to WT7 into the master tables MT1 to MT7 (step S75). FIG. 26 illustrates the master tables MTs (MT1A to MT7A) after insertion.

As described above, according to Operation Example 1 of the present embodiment, it is possible to provide an information processing system capable of generating a system configuration dynamically and suppressing an identical configuration that does not change before and after the system configuration is changed from being generated wastefully and to provide a management device and a method for controlling the information processing system.

This results from the fact that the creation commands i1 to i10 for virtual servers and the like are generated on the basis of the difference information (for example, the contents of the work tables WT1 to WT7) which is a difference between the work tables WT1 to WT7 and the master tables MT1 to MT7.

According to Operation Example 1 of the present embodiment, it is possible to generate the creation commands i1 to i10 for virtual servers and the like on the basis of the difference information (for example, the contents of the work tables WT1 to WT7) which is a difference between the work tables WT1 to WT7 and the master tables MT1 to MT7, transmit the generated creation commands i1 to i10 for virtual servers and the like to the physical server 20 (for example, the hypervisor), the network switch device 30 (the SVP 31), and the storage device 40 (the SVP 43) to generate the virtual servers 22, and construct an environment for connecting the virtual servers 22 in common to the storage device 40 (the volume).

Operation Example 2 (Virtual Server Removal Process) of Management Server

First, a specific example of the configuration definition information used in Operation Example 2 will be described. FIG. 24 illustrates a specific example of the configuration definition information used in Operation Example 2.

The configuration definition information illustrated in FIG. 24 is information for removing the virtual server 22A (the virtual server name: Dom0001) and the virtual server 22B (the virtual server name: Dom0002), and removing an environment for connecting the virtual server 22A and 22B in common to the storage device 40 (the volume name: vd-1101) in a case in which the virtual server 22A (the virtual server name: Dom0001) and the virtual server 22B (the virtual server name: Dom0002) are generated in the physical server 20A (the physical server name: HW001) and the physical server 20B (the physical server name: HW002) and an environment for connecting the virtual servers 22A and 22B in common to the storage device 40 (the volume name: vd-1101) is constructed as illustrated in FIG. 22.

As illustrated in FIG. 24, the configuration definition information includes server configuration definition information D4, network configuration definition information D5, and storage configuration definition information D6. The pieces of configuration definition information D4 to D6 correspond to information in which "new" of the "status" in the pieces of configuration definition information D1 to D3 is replaced with "removal". Since the respective items in the pieces of configuration definition information D4 to D6 are the same as the respective items in the pieces of configuration definition information D1 to D3, the description thereof will be omitted.

[Master Table]

Next, a specific example of the master table used in Operation Example 2 will be described. FIG. 25 illustrates a specific example of the master table used in Operation Example 2.

Hereinafter, it is assumed that the contents of the work tables WT1 to WT7 (see FIG. 6) are registered in the master table MT as the information indicating the present configuration (a logical configuration) of the information processing system 10.

As illustrated in FIG. 25, the master table MT includes a user table MT1A, a virtual server table MT2A, a virtual disk table MT3A, a virtual network table MT4A, a LUN table MT5A, a network configuration definition table MT6A, a volume table MT7A, and a machine type table MT8A. Since the respective items in the master tables MTs (MT1A to MT7A) are the same as the respective items in the configuration definition information D4 to D6, the description thereof will be omitted.

Work Table

Next, a specific example of the work table used in Operation Example 2 will be described. FIG. 26 illustrates a specific example of the work table used in Operation Example 2.

Information for changing (removing) the present configuration (the logical configuration) of the information processing system 10 is registered in the work table WT. Hereinafter, it is assumed that information for removing the virtual server 22A (the virtual server name: Dom0001) and the virtual server 22B (the virtual server name: Dom0002) and removing an environment for connecting the virtual servers 22A and 22B in common to the storage device 40 (the volume name: vd-1101) is registered in the work table WT as information for changing (removing) the present configuration (the logical configuration) of the information processing system 10.

As illustrated in FIG. 26, the work table WT includes a user table WT1A, a virtual server table WT2A, a virtual disk table WT3A, a virtual network table WT4A, a LUN table WT5A, a network configuration definition table WT6A, and a volume table WT7A. The work tables WTs (WT1A to WT7A) are obtained by dividing the pieces of configuration definition information D4 to D6 illustrated in FIG. 24 for respective categories such as a virtual server, a virtual storage, a virtual network, a network, a storage, and the like. Since the respective items of the work tables WTs (WT1A to WT7A) are the same as the respective items of the pieces of configuration definition information D4 to D6, the description thereof will be omitted.

[Command Generated by Management Server]

Next, a specific example of commands generated by the management server 50 in Operation Example 2 will be described. FIGS. 27 to 29 illustrate specific examples of the commands generated by the management server 50 in Operation Example 2.

The commands generated by the management server 50 mainly include commands related to virtual server removal (see FIG. 27), commands related to volume deletion (see FIG. 28), and commands related to VLAN removal (see FIG. 29).

As illustrated in FIG. 27, the commands related to virtual server removal include a virtual server stop command i11, a virtual server removal command i12, a virtual disk removal command i13, a virtual network removal command i14, and a multipath driver removal command i15. The commands related to virtual server removal i11 to i15 are transmitted from the management server 50 to the physical servers 20A and 20B via the network NW.

As illustrated in FIG. 28, the commands related to volume deletion include a volume deletion command i16 and a LUN group mapping cancel command i17. The commands related to volume deletion i16 to i17 are transmitted from the management server 50 to the storage device 40 via the network NW.

As illustrated in FIG. 29, the commands related to VLAN removal include a VLAN removal command i18 and a VLAN removal command i19. The commands related to VLAN removal i18 to i19 are transmitted from the management server 50 to the network switch device 30 via the network NW.

The details of the commands i11 to i19 illustrated in FIGS. 27 to 29 will be described later.

Figure 32:
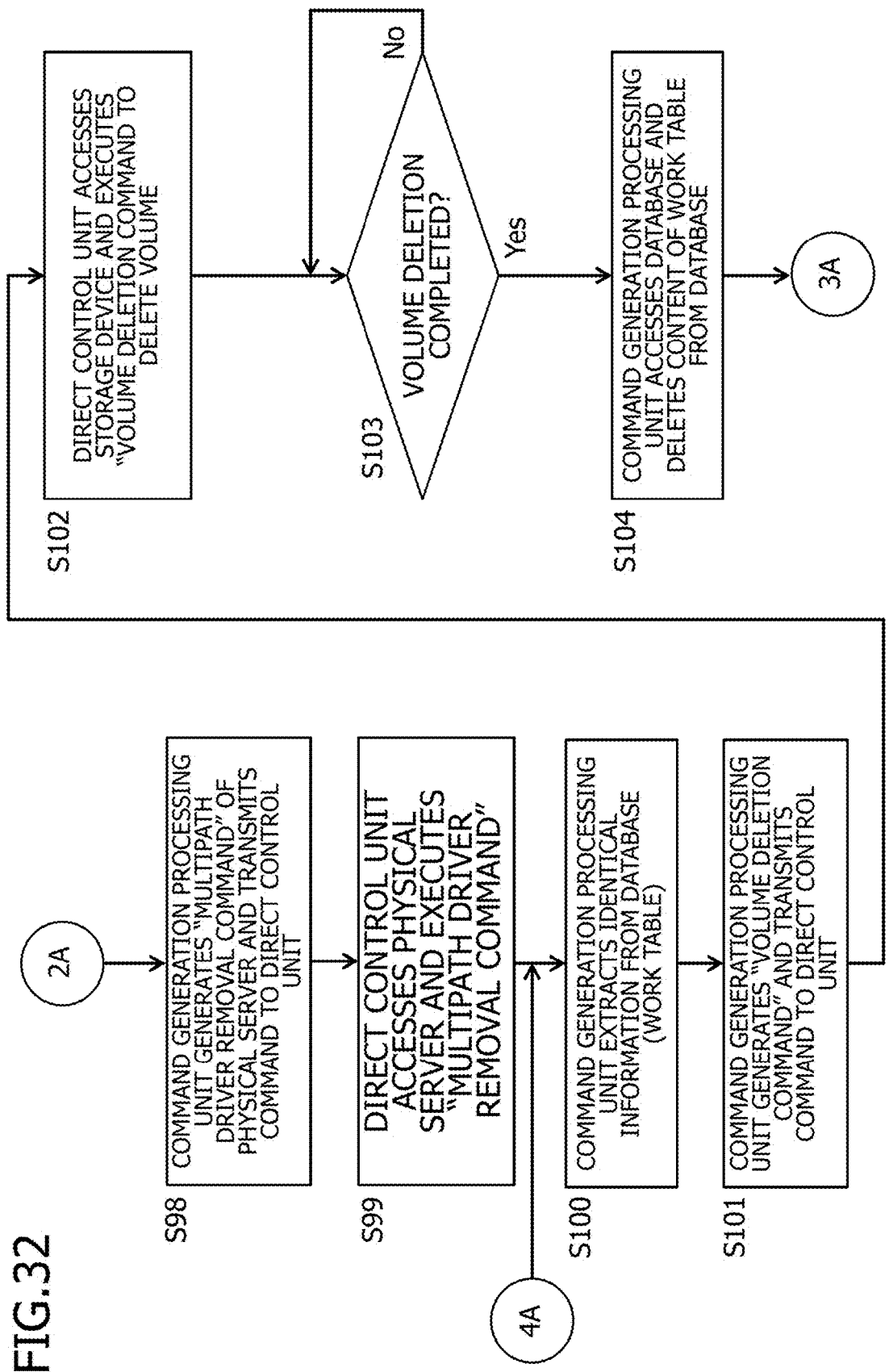
FIG. 32 is a flowchart for describing Operation Example 2 (a virtual server removal process) of the management server 50.

Next, Operation Example 2 (a virtual server removal process) of the management server 50 will be described. FIGS. 30 to 32 are flowcharts for describing Operation Example 2 (a virtual server removal process) of the management server 50.

As illustrated in FIG. 30, first, a user deploys the respective pieces of configuration definition information D4 to D6 (see FIG. 24) in the management server 50 (step S81). Specifically, the user inputs the respective pieces of configuration definition information D4 to D6 from a terminal (not illustrated) connected to the network NW. The pieces of inputted configuration definition information D4 to D6 are transmitted to the management server 50 via the network NW and the management server 50 (the input processing unit 57) receives (acquires) the same.

Subsequently, the input processing unit 57 extracts the content (row) of which the "status" is "removal" from the pieces of configuration definition information D4 to D6 and divides the same for respective categories such as a virtual server, a virtual storage, a virtual network, a network, and a storage (step S82).

Subsequently, the input processing unit 57 instructs the direct control unit 59 to register the divided pieces of configuration definition information D4 to D6 in the database 56 (the work tables WT1A to WT7A) (step S83).

Subsequently, the direct control unit 59 registers the divided pieces of configuration definition information D4 to D6 in the database 56 (the work tables WT1A to WT7A) (step S84). In this way, the contents illustrated in FIG. 26 is registered in the work tables WT1A to WT7A.

Subsequently, the collecting unit 60 reads the contents of the work tables WT1A to WT7A and the master tables MT1A to MT7A from the database 56 and transmits the contents to the command generation processing unit 58 (step S85).

Subsequently, the command generation processing unit 58 compares the work tables WT1A to WT7A and the master tables MT1A to MT7A (step S86). When the content of the work tables WT1A to WT7A is not included in the master tables MT1A to MT7A (step S87: No), the process ends.

On the other hand, when the content of the work table WT1A to WT7A is included in the master table MT1A to MT7A (step S87: Yes), the command generation processing unit 58 extracts identical information (for example, the information of a virtual server) between the work tables WT1A to WT7A and the master tables MT1A to MT7A from the database 56 (the work tables WT1A to WT7A) (step S88).

Subsequently, the command generation processing unit 58 generates the commands related to virtual server removal i11 to i14 (the virtual server stop command i11, the virtual server removal command i12, the virtual disk removal command i13, and the virtual network removal command i14) on the basis of the extracted identical information and transmits the commands to the direct control unit 59 (step S89).

Subsequently, the direct control unit 59 accesses the physical server 20 and executes the commands related to virtual server removal i11 to i14 (step S90). Specifically, the direct control unit 59 transmits the commands related to virtual server removal i11 to i14 to the physical server 20 via the network NW. The physical server 20 receives the commands related to virtual server removal i11 to i14 and executes the commands to thereby remove the virtual server 22.

When removal of all virtual servers 22 is completed (step S91: Yes), the command generation processing unit 58 extracts identical information (for example, information of a network) between the work tables WT1A to WT7A and the master table MT1A to MT7A from the database 56 (the work tables WT1A to WT7A) (step S92).

Subsequently, the command generation processing unit 58 generates commands related to VLAN removal i18 to i19 (the VLAN removal command i18 and the VLAN removal command i19) of the network port of the network switch device 30 on the basis of the extracted identical information and transmits the commands to the direct control unit 59 (step S93).

Subsequently, the direct control unit 59 accesses the network switch device 30 and executes the commands related to VLAN removal i18 to i19 (step S94). Specifically, the direct control unit 59 transmits the commands related to VLAN removal i18 to i19 to the network switch device 30 via the network NW. The network switch device 30 receives the commands related to VLAN removal i18 to i19 and executes the commands to thereby remove the VLAN.

Subsequently, the command generation processing unit 58 generates the LUN group mapping cancel command i17 on the basis of the identical information between the work tables WT1A to WT7A and the master tables MT1A to MT7A and transmits the command to the direct control unit 59 (step S95).

Subsequently, the direct control unit 59 accesses the storage device 40 and executes the LUN group mapping cancel command i17 (step S96). Specifically, the direct control unit 59 transmits the LUN group mapping cancel command i17 to the storage device 40 via the network NW. The storage device 40 receives the LUN group mapping cancel command i17 and executes the command to thereby cancel the LUN group mapping.

Subsequently, the management server 50 determines whether the multipath driver of the physical server 20 is present (step S97). When the multipath driver is present (step S97: present), the command generation processing unit 58 generates the multipath driver removal command i15 on the basis of the identical information between the work tables WT1A to WT7A and the master tables MT1A to MT7A and transmits the command to the direct control unit 59 (step S98).

Subsequently, the direct control unit 59 accesses the physical server 20 and executes the multipath driver removal command i15 (step S99). Specifically, the direct control unit 59 transmits the multipath driver removal command i15 to the physical server 20 via the network NW. The physical server 20 receives the multipath driver removal command i15 and executes the command to thereby remove an LU from the multipath driver.

Subsequently, the command generation processing unit 58 extracts the identical information (for example, information of a volume and a LUN) between the work tables WT1A to WT7A and the master tables MT1A to MT7A from the database 56 (the work tables WT1 to WT7) (step S100), generate the volume deletion command i16 on the basis of the extracted identical information, and transmits the command to the direct control unit 59 (step S101).

Subsequently, the direct control unit 59 accesses the storage device 40 and executes the volume deletion command i16 to thereby delete a volume (step S102). Specifically, the direct control unit 59 transmits the volume deletion command i16 to the storage device 40 via the network NW. The storage device 40 receives the volume deletion command i16 and executes the command to thereby delete the volume.

When deletion of the volume is completed (step S103: Yes), the command generation processing unit 58 accesses the database 56 and removes the content of the work tables WT1A to WT7A from the master tables MT1A to MT7A (step S104).

Operation Example 2 of Information Processing System

Figure 33:
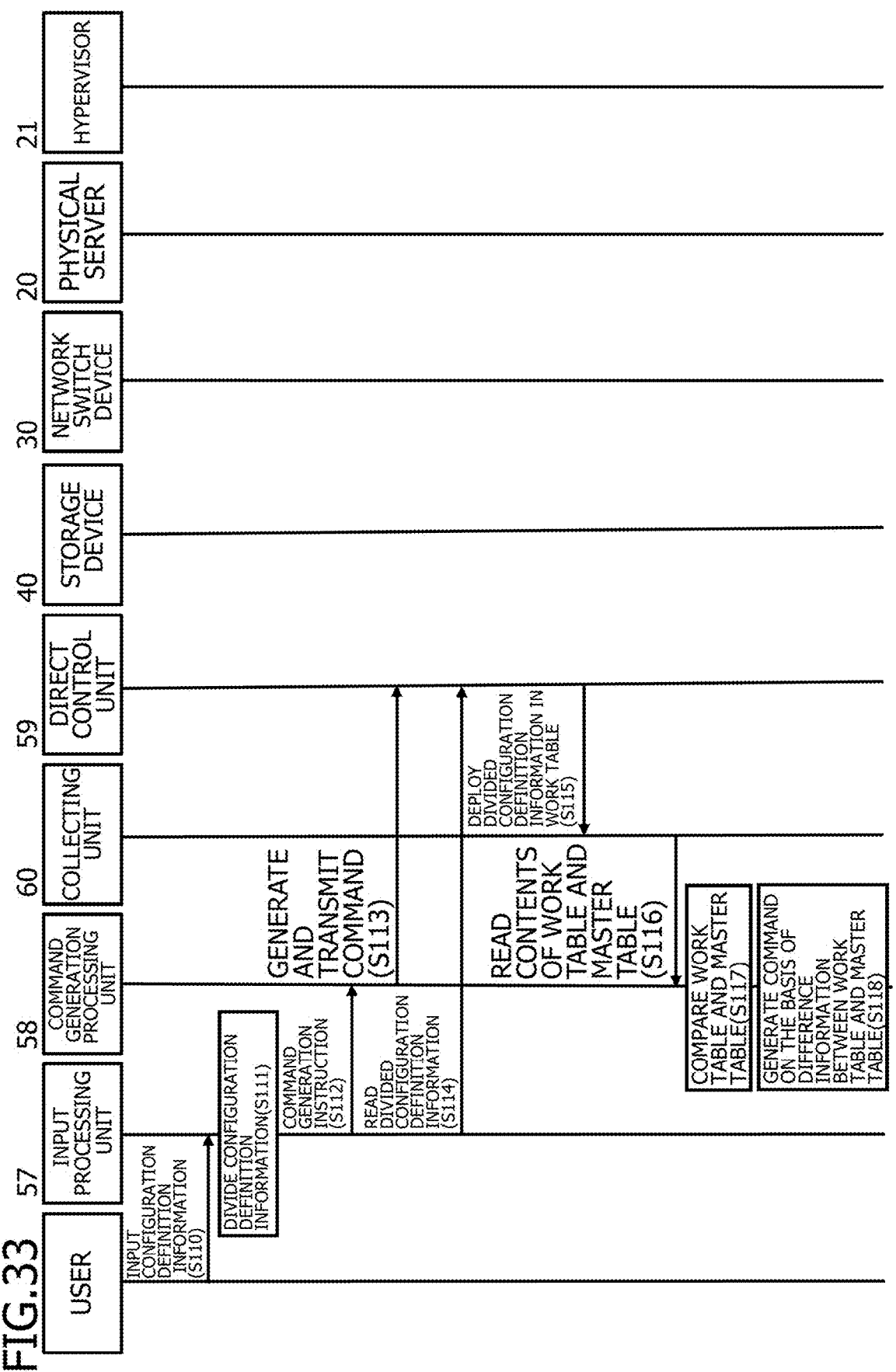
FIG. 33 is a sequence diagram for describing Operation Example 2 of the information processing system 10.
Figure 34:
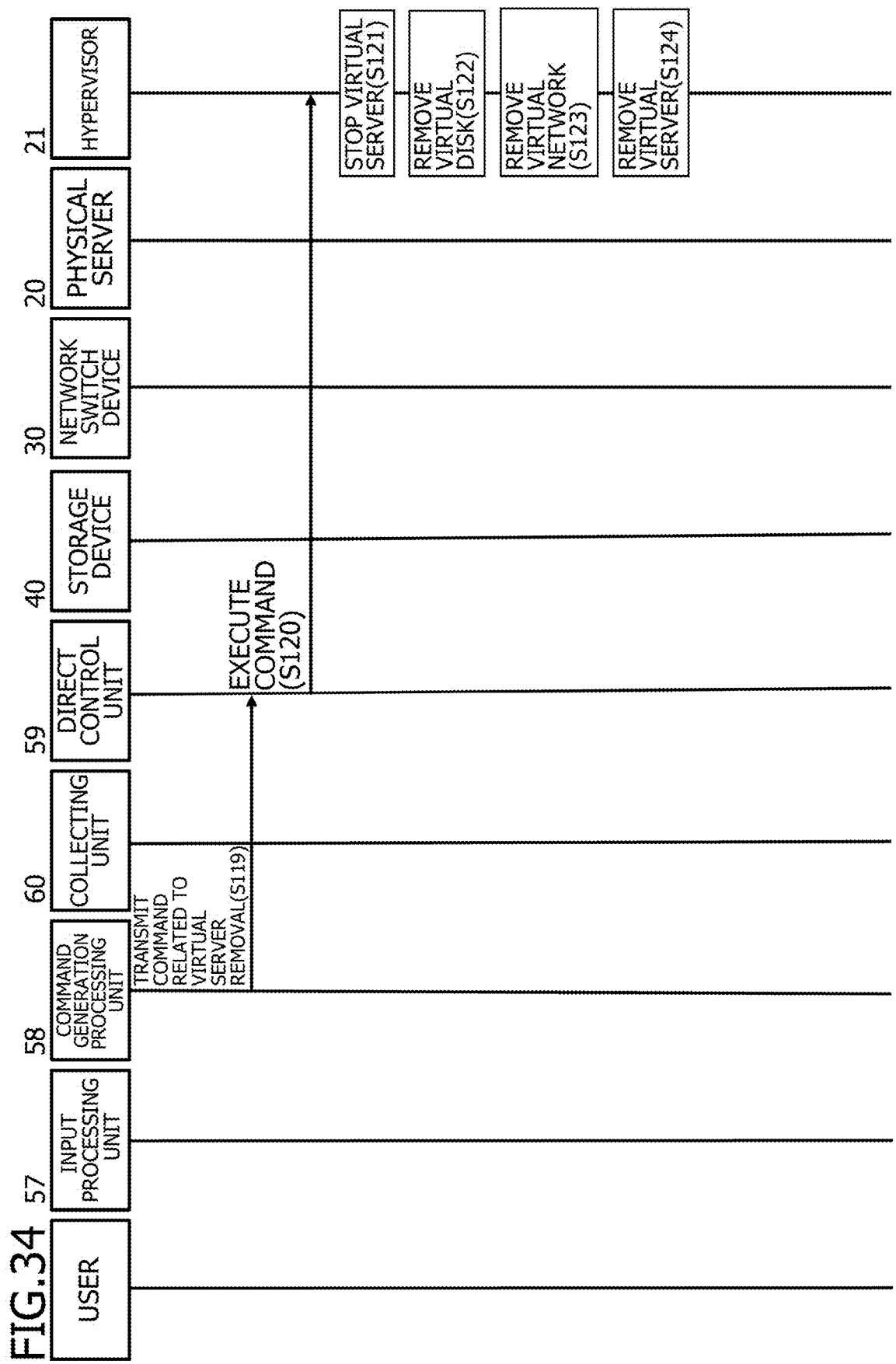
FIG. 34 is a sequence diagram for describing Operation Example 2 of the information processing system 10.
Figure 35:
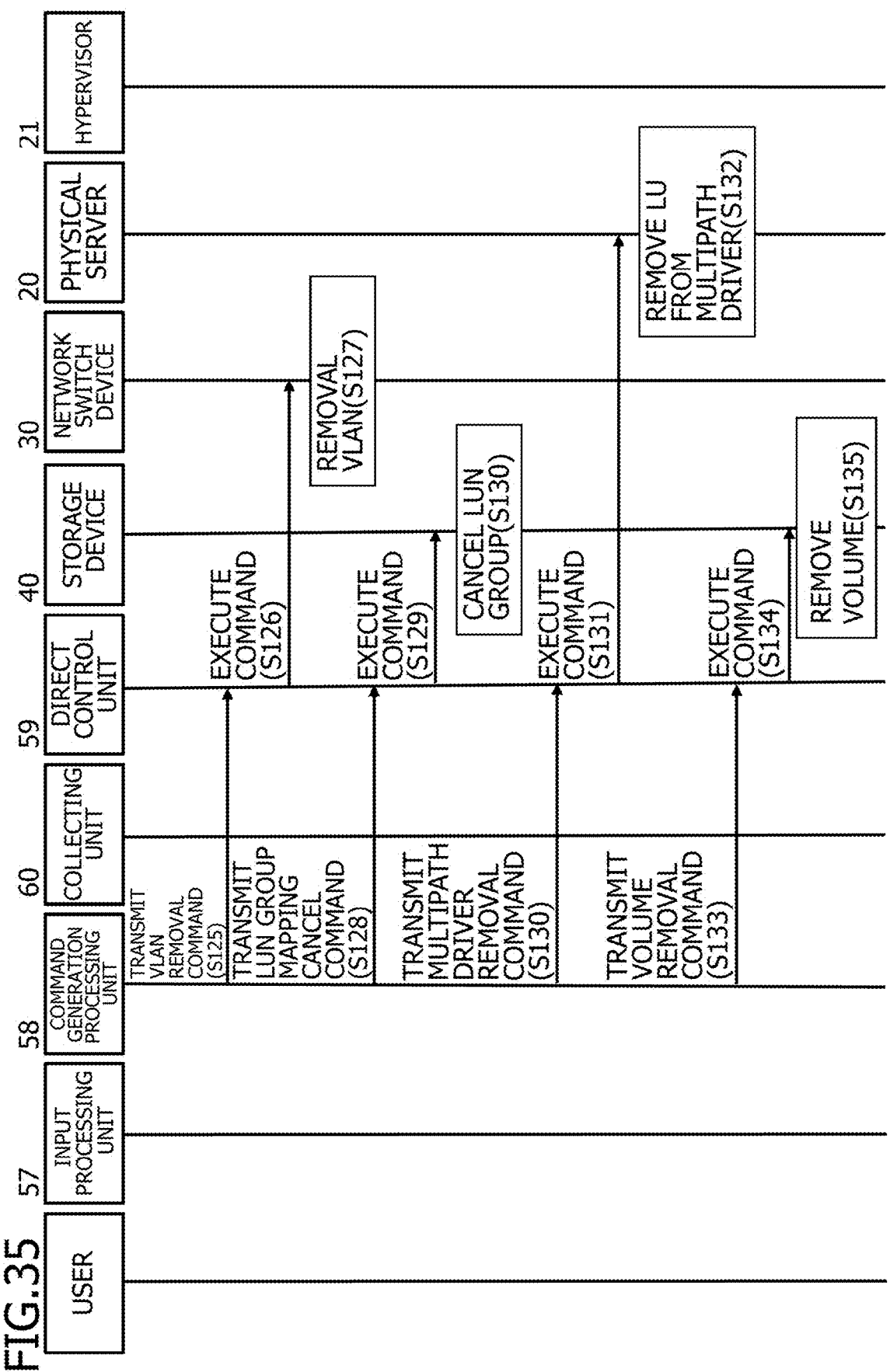
FIG. 35 is a sequence diagram for describing Operation Example 2 of the information processing system 10.
Figure 40:
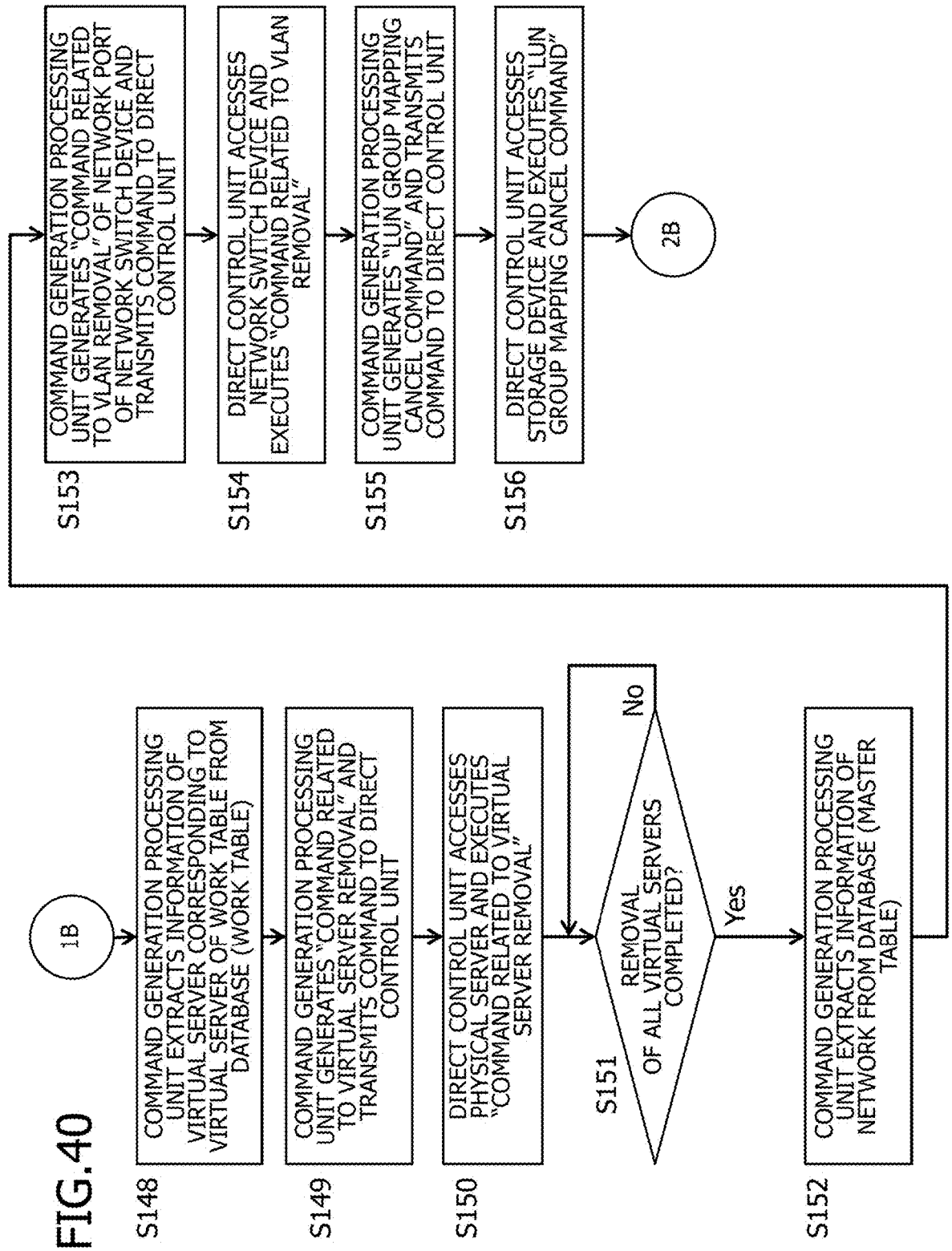
FIG. 40 is a flowchart for describing Operation Example 3 (a virtual server moving process) of the management server 50.
Figure 42:
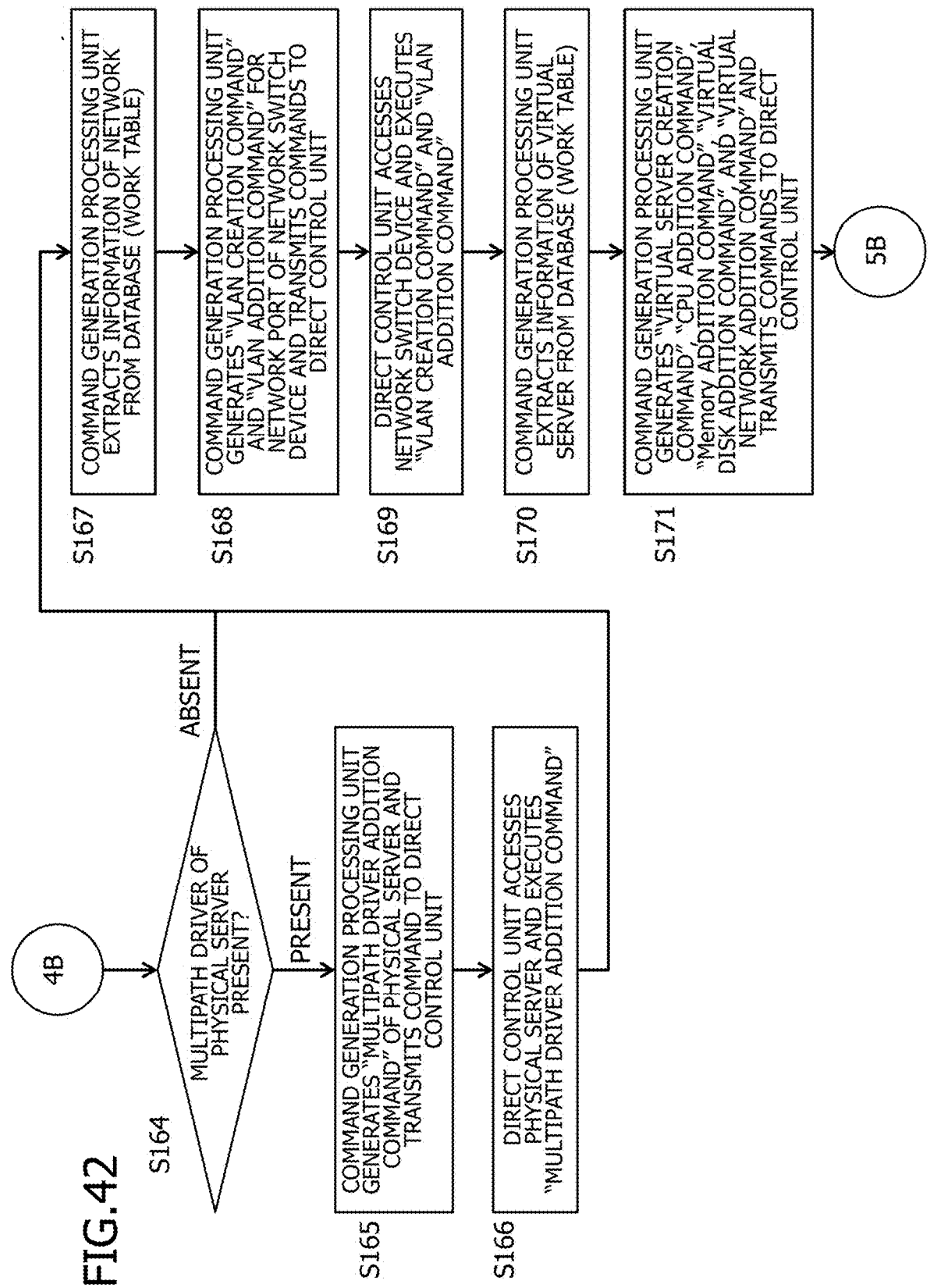
FIG. 42 is a flowchart for describing Operation Example 3 (a virtual server moving process) of the management server 50.
Figure 43:
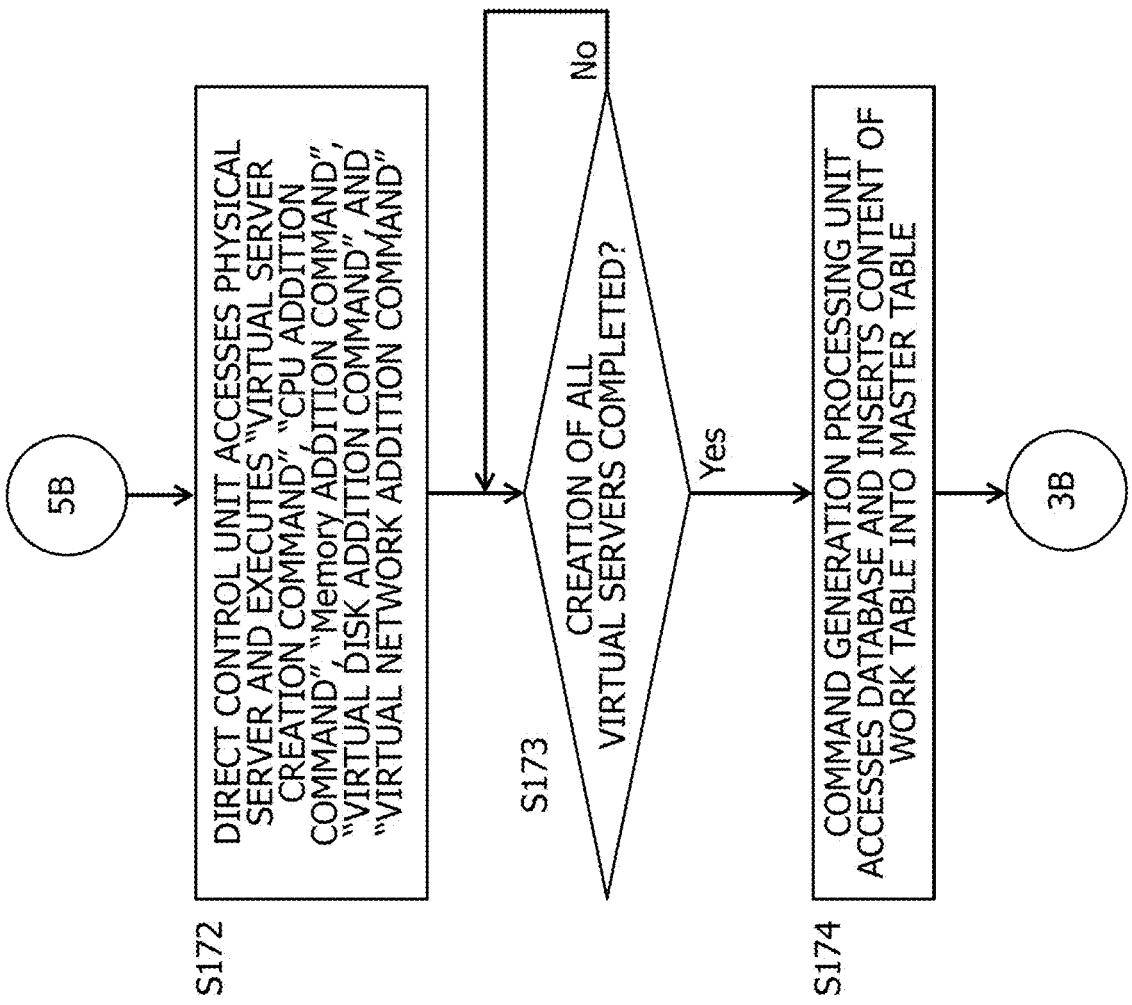
FIG. 43 is a flowchart for describing Operation Example 3 (a virtual server moving process) of the management server 50.

Subsequently, Operation Example 2 of the information processing system 10 will be described. FIGS. 33 to 35 are sequence diagrams for describing Operation Example 2 of the information processing system 10.

Hereinafter, as illustrated in FIG. 18, a process of removing the virtual server 22A (the virtual server name: Dom0001) and the virtual server 22B (the virtual server name: Dom0002) and removing an environment for connecting the virtual servers 22A and 22B in common to the storage device 40 (the volume name: vd-1101) from the state illustrated in FIG. 22 will be described as Operation Example 2 of the information processing system 10.

As illustrated in FIG. 33, first, a user inputs pieces of configuration definition information D4 to D6 (see FIG. 24) (step S110). Specifically, the user inputs the pieces of configuration definition information D4 to D6 from a terminal (not illustrated) or the like connected to the network NW. The pieces of configuration definition information D4 to D6 may be input from a keyboard or the like connected to the terminal and may be input by reading a file including the pieces of configuration definition information D4 to D6 into the terminal. The pieces of inputted configuration definition information D4 to D6 are transmitted from the terminal to the management server 50 via the network NW and are received (acquired) by the management server 50 (the input processing unit 57).

Subsequently, the input processing unit 57 divides the pieces of configuration definition information D4 to D6 (step S111). Specifically, the input processing unit 57 extracts a content of which the "status" is "removal" from the pieces of configuration definition information D4 to D6 and divides the extracted content for respective categories such as a virtual server, a virtual storage, a virtual network, a network, a storage, and the like.

Subsequently, the input processing unit 57 instructs the command generation processing unit 58 to generate a command for registering the divided pieces of configuration definition information D4 to D6 in the database 56 (the work tables WT1A to WT7A) (step S112).

Subsequently, the command generation processing unit 58 generates a command for registering the divided pieces of configuration definition information D4 to D6 in the database 56 (the work tables WT1A to WT7A) and transmits the command to the direct control unit 59 (step S113).

Subsequently, the direct control unit 59 reads the divided pieces of configuration definition information D4 to D6 from the input processing unit 57 (step S114).

Subsequently, the direct control unit 59 registers the read divided pieces of configuration definition information D4 to D6 in the database 56 (the work tables WT1A to WT7A) (step S115). In this way, the contents illustrated in FIG. 26 are registered in the work tables WT1A to WT7A.

Subsequently, the collecting unit 60 reads the contents of the work tables WT1A to WT7A and the master tables MT1A to MT7A from the database 56 and transmits the contents to the command generation processing unit 58 (step S116).

Subsequently, the command generation processing unit 58 compares the work tables WT1A to WT7A and the master tables MT1A to MT7A (step S117). When the content of the work tables WT1A to WT7A is included in the master tables MT1A to MT7A, the command generation processing unit 58 generates the commands i11 to i19 on the basis of the identical information (in this example, the content of the work tables WT1A to WT7A) between the work tables WT1A to WT7A and the master tables MT1A to MT7A (step S118). That is, the command generation processing unit 58 generates the commands i11 to i19 in which the identical information (in this example, the content of the work tables WT1A to WT7A) between the work tables WT1A to WT7A and the master tables MT1A to MT7A is set (applied). A specific example of the commands i11 to i19 will be described later.

Specific Example of Virtual Server Stop Command i11

First, the command generation processing unit 58 extracts identical information (for example, information of a virtual server) between the work tables WT1A to wt17 and the master tables MT1A to MT7A from the database 56 (the work tables WT1A to WT7A) and generates commands related to virtual server removal (the virtual server stop command i11, the virtual server removal command i12, the virtual disk removal command i13, and the virtual network removal command i14) on the basis of the extracted identical information.

A specific example of the virtual server stop command i11 will be described with reference to FIG. 27.

As illustrated in FIG. 27, the virtual server stop command i11 includes a character string "ssh" arranged at the start, "<management user>", "<physical server name>", a command "ldm stop-domain", and "<virtual server name>". The management user name (for example, root) of the physical server 20 is set in the portion "management user". The "physical server name (HW001 and HW002)" in the virtual server table WT2A is set in the portion "physical server name". The "virtual server name (Dom0001 and Dom0002)" in the virtual server table WT2A is set in the portion "virtual server name".

As a result, the following two commands are generated as the virtual server stop command i11.

(1) ssh <root>@<HW001> ldm stop-domain <Dom0001>

(2) ssh <root>@<HW002> ldm stop-domain <Dom0002>

Specific Example of Virtual Server Removal Command i12

A specific example of the virtual server removal command i12 will be described with reference to FIG. 27.

As illustrated in FIG. 27, the virtual server removal command i12 includes a character string "ssh" arranged at the start, "<management user>", "<physical server name>", a command "ldm remove-domain", and "<virtual server name>". The management user name (for example, root) of the physical server 20 is set in the portion "management user". The "physical server name (HW001 and HW002)" in the virtual server table WT2A is set in the portion "physical server name". The "virtual server name (Dom0001 and Dom0002)" in the virtual server table WT2A is set in the portion "virtual server name".

As a result, the following two commands are generated as the virtual server removal command i12.

(1) ssh <root>@<HW001> ldm remove-domain <Dom0001>

(2) ssh <root>@<HW002> ldm remove-domain <Dom0002>

Specific Example of Virtual Disk Removal Command i13

A specific example of the virtual disk removal command i13 will be described with reference to FIG. 27.

As illustrated in FIG. 27, the virtual disk removal command i13 includes a character string "ssh" arranged at the start, "<management user>", "<physical server name>", a command "ldm remove-vdsdev", "<virtual disk name>", and "virtual disk service name". The management user name (for example, root) of the physical server 20 is set in the portion "management user". The "physical server name (HW001 and HW002)" in the virtual server table WT2A is set in the portion "physical server name". The "Disk name (vd-1101 and vd-1101)" in the virtual disk table WT3A is set in the portion "virtual disk name". A default name is set in the portion "virtual disk service name".

As a result, the following two commands are generated as the virtual disk removal command i13.

(1) ssh <root>@<HW001> ldm remove-vdsdev <vd-1101>@<default name>

(2) ssh <root>@<HW002> ldm remove-vdsdev <vd-1101>@<default name>

Specific Example of Virtual Network Removal Command i14

A specific example of the virtual network removal command i14 will be described with reference to FIG. 27.

As illustrated in FIG. 27, the virtual network removal command i14 includes a character string "ssh" arranged at the start, "<management user>", "<physical server name>", a command "ldm remove-vnet", "<virtual network port name>", and "<virtual server name>". The management user name (for example, root) of the physical server 20 is set in the portion "management user". The "physical server name (HW001 and HW002)" in the virtual server table WT2A is set in the portion "physical server name". The "port name (Vnet001 and Vnet001)" in the virtual network table WT4A is set in the portion "virtual network port name". The "virtual server name (Dom0001 and Dom0002)" in the virtual server table WT2A is set in the portion "virtual server name".

As a result, the following two commands are generated as the virtual network removal command i14.

(1) ssh <root>@<HW001> ldm remove-vnet<Vnet001> <Dom0001>

(2) ssh <root>@<HW002> ldm remove-vnet<Vnet001> <Dom0002>

Subsequently, as illustrated in FIG. 34, the command generation processing unit 58 transmits the commands related to virtual server removal i11 to i14 to the direct control unit 59 (step S119).

Subsequently, the direct control unit 59 accesses the physical server 20 and executes the commands related to virtual server removal i11 to i14 (step S120). Specifically, the direct control unit 59 transmits the commands related to virtual server removal i11 to i14 to the physical server 20 using an IP address correlated with the "physical server name (HM001 and HM002)" in the commands related to virtual server removal i11 to i14.

Subsequently, the physical server 20 (the NIC 20d) receives the commands related to virtual server removal i11 to i14 transmitted from the management server 50 via the network NW. The physical server 20 (the hypervisor 21) executes the commands related to virtual server removal i11 to i14 received from the management server 50 to thereby execute a process (step S121) of stopping the virtual server 22, a process (step S122) of removing the virtual disk, a process (step S123) of removing the virtual network, and a process (step S124) of removing the virtual server. Furthermore, the physical server 20 (the hypervisor 21) may execute a process of deleting the virtual server definition table T1 stored in the memory included in the SVP 23.

Specific Example of VLAN Removal Command i18

Subsequently, as illustrated in FIG. 35, the command generation processing unit 58 generates the commands related to VLAN removal (the VLAN removal command i18 and the VLAN removal command i19) and transmits the commands related to VLAN removal i18 and i19 to the direct control unit 59 (step S125).

A specific example of the VLAN removal command i18 will be described with reference to FIG. 29.

As illustrated in FIG. 29, the VLAN removal command i18 includes a character string "ssh" arranged at the start, "<management user>", "<network switch name>", a command "no vlan", and "<VLAN ID>". The management user name (for example, root) of the network switch device 30 is set in the portion "management user". The "switch name (Nex2)" in the network configuration definition table WT6A is set in the portion "network switch name". The "VLAN (1101)" in the network configuration definition table WT6A is set in the portion "VLAN ID".

As a result, the following command is generated as the VLAN removal command i18.
 ssh <root>@<Nex2> no vlan <1101>

Specific Example of VLAN Removal Command i19

A specific example of the VLAN removal command i19 will be described with reference to FIG. 29.

As illustrated in FIG. 29, the VLAN removal command i19 includes a character string "ssh" arranged at the start, "<management user>", "<network switch name>", a command "interface", and "port". Moreover, the VLAN removal command i19 includes a character string "ssh" arranged at the start, "<management user>", "<network switch name>", and a command "switch mode trunk". Moreover, the VLAN removal command i19 includes a character string "ssh" arranged at the start, "<management user>", "<network switch name>", a command "switch trunk allowed vlan remove", and "<VLAN ID>". The management user name (for example, root) of the network switch device 30 is set in the portion "management user". The "switch name (Nex2)" in the network configuration definition table WT6A is set in the portion "network switch name". The "port (010 and 011)" in the network configuration definition table WT6A is set in the portion "port". The "VLAN (1101)" in the network configuration definition table WT6A is set in the portion "VLAN ID".

As a result, the following four commands are generated as the VLAN removal command i19.
 (1) ssh <root>@<Nex2> interface <010>
 (2) ssh <root>@<Nex2> interface <011>
 (3) ssh <root>@<Nex2> switch mode trunk
 (4) ssh <root>@<Nex2> switch trunk allowed vlan remove <1101>

Subsequently, returning to FIG. 35, the direct control unit 59 accesses the network switch device 30 and executes the commands related to VLAN removal i18 and i19 (step S126). Specifically, the direct control unit 59 transmits the commands related to VLAN removal i18 and i19 to the network switch device 30 using an IP address correlated with the "network switch name (Nex2)" in the commands related to VLAN removal i18 and i19.

Subsequently, the network switch device 30 (the SVP 31) receives the commands related to VLAN removal i18 and i19 transmitted from the management server 50 via the network NW and executes the commands related to VLAN removal i18 and i19 to thereby remove the VLAN (step S127). Furthermore, the network switch device 30 (the SVP 31) may execute a process of deleting the virtual network definition table T3 stored in the memory included in the SVP 31.

Specific Example of LUN Group Mapping Cancel Command i17

Subsequently, the command generation processing unit 58 generates the LUN group mapping cancel command i17 and transmits the command to the direct control unit 59 (step S128).

A specific example of the LUN group mapping cancel command i17 will be described with reference to FIG. 28.

As illustrated in FIG. 28, the LUN group mapping cancel command i17 includes a character string "ssh" arranged at the start, "<management user>", "<storage device name>", a command "delete lun-group-lg-name", "<LUN group name>", and "lun number". The management user name (for example, root) of the storage device 40 is set in the portion "management user". The "housing name (ET200-1)" in the volume table WT7A is set in the portion "storage device name". The "LUN group name (Dom0001 and Dom0002)" in the LUN table WT5A is set in the portion "LUN group name". The "LUN number (1101)" in the LUN table WT5A is set in the portion "lun number".

As a result, the following two commands are generated as the LUN group mapping cancel command i17.
 (1) ssh <root>@<ET200-1> delete lun-group ?lg-name <Dom0001>-lun<1101>
 (2) ssh <root>@<ET200-1> delete lun-group ?lg-name <Dom0002>-lun<1101>

Subsequently, returning to FIG. 35, the direct control unit 59 accesses the storage device 40 and executes the LUN group mapping cancel command i17 (step S129). Specifically, the direct control unit 59 transmits the LUN group mapping cancel command i17 to the storage device 40 using an IP address correlated with the "storage device name (ET200-1)" in the LUN group mapping cancel command i17.

Subsequently, the storage device 40 (the SVP 43) receives the LUN group mapping cancel command i17 transmitted from the management server 50 via the network NW and executes the received LUN group mapping cancel command i17 to thereby cancel the LUN group (step S130). Furthermore, the storage device 40 (the SVP 43) may execute a process of deleting the disk-and-server connection definition table T2 stored in the memory included in the SVP 43.

Specific Example of Multipath Driver Removal Command i15

Subsequently, the command generation processing unit 58 generates the multipath driver removal command i15 and transmits the command to the direct control unit 59 (step S130).

A specific example of the multipath driver removal command i15 will be described with reference to FIG. 27.

As illustrated in FIG. 27, the multipath driver removal command i15 includes a character string "ssh" arranged at the start, "<management user>", "<physical server name>", and a command "grmpdautoconf". The management user name (for example, root) of the physical server 20 is set in the portion "management user". The "physical server name (HW001 and HW002)" in the virtual server table WT2A is set in the portion "physical server name".

As a result, the following two commands are generated as the multipath driver removal command i15.
 (1) ssh <root>@<HW001> grmpdautoconf
 (2) ssh <root>@<HW002> grmpdautoconf Subsequently, returning to FIG. 35, the direct control unit 59 accesses the physical server 20 and executes the multipath driver removal command i15 (step S131). Specifically, the direct control unit 59 transmits the multipath driver removal command i15 to the physical server 20 using an IP address correlated with the "physical server name (HW001 and HW002)" in the multipath driver removal command i15.

Subsequently, the physical server 20 receives the multipath driver removal command i15 transmitted from the management server 50 via the network NW and executes the received multipath driver removal command i15 to thereby remove the LU from the multipath driver (step S132).

Specific Example of Volume Deletion Command i16

Subsequently, the command generation processing unit 58 generates the volume deletion command i16 and transmits the command to the direct control unit 59 (step S133).

A specific example of the volume deletion command i16 will be described with reference to FIG. 28.

As illustrated in FIG. 28, the volume deletion command i16 includes a character string "ssh" arranged at the start, "<management user>", "<storage device name>", a command "delete volume-volume-number", and "<volume number>". The management user name (for example, root) of the storage device 40 is set in the portion "management user". The "housing name (ET200-1)" in the volume table WT7A is set in the portion "storage device name". The "vol number (1101)" in the volume table WT7A is set in the portion "volume number".

As a result, the following command is generated as the volume deletion command i16.

ssh <root>@<ET200-1> delete volume-volume-number <1101>

Subsequently, returning to FIG. 35, the direct control unit 59 accesses the storage device 40 and executes the volume deletion command i16 (step S134). Specifically, the direct control unit 59 transmits the volume deletion command i16 to the storage device 40 using an IP address correlated with the "storage device name (ET200-1)" in the volume deletion command i16.

Subsequently, the storage device 40 (the SVP 43) receives the volume deletion command i16 transmitted from the management server 50 via the network NW and executes the received volume deletion command i16 to thereby delete the volume (step S135). Furthermore, the storage device 40 (the SVP 43) may execute a process of deleting the disk-and-server connection definition table T2 stored in the memory included in the SVP 43.

As described above, according to Operation Example 2, it is possible to generate the removal commands i11 to i17 for virtual servers and the like on the basis of the identical information (for example, the content of the work tables WT1A to WT7A) between the work tables WT1A to WT7A and the master tables MT1A to MT7A, transmit the generated removal commands i11 to i17 for virtual servers and the like to the physical server 20 (for example, the hypervisor), the network switch device 30 (the SVP 31), and the storage device 40 (the SVP 43) to remove the virtual servers 22, and remove an environment for connecting the virtual servers 22 in common to the storage device 40.

Operation Example 3 (Virtual Server Moving Process) of Management Server

Configuration Definition Information

First, a specific example of the configuration definition information used in Operation Example 3 will be described. FIG. 36 is a specific example of the configuration definition information used in Operation Example 3.

Figure 50:
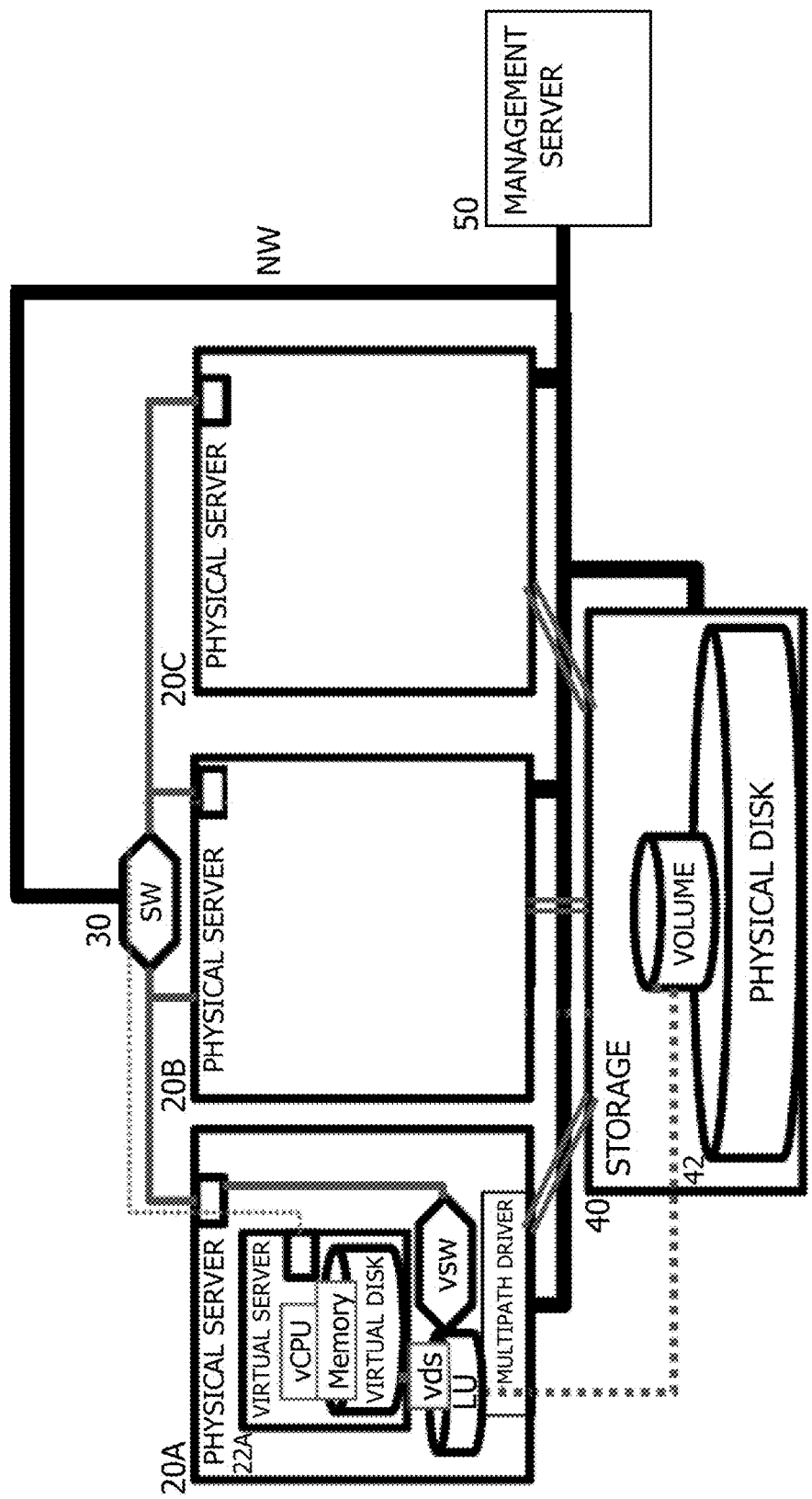
FIG. 50 illustrates a state in which the virtual server 22B (the virtual server name: Dom0002) is removed in the state illustrated in FIG. 49.
Figure 51:
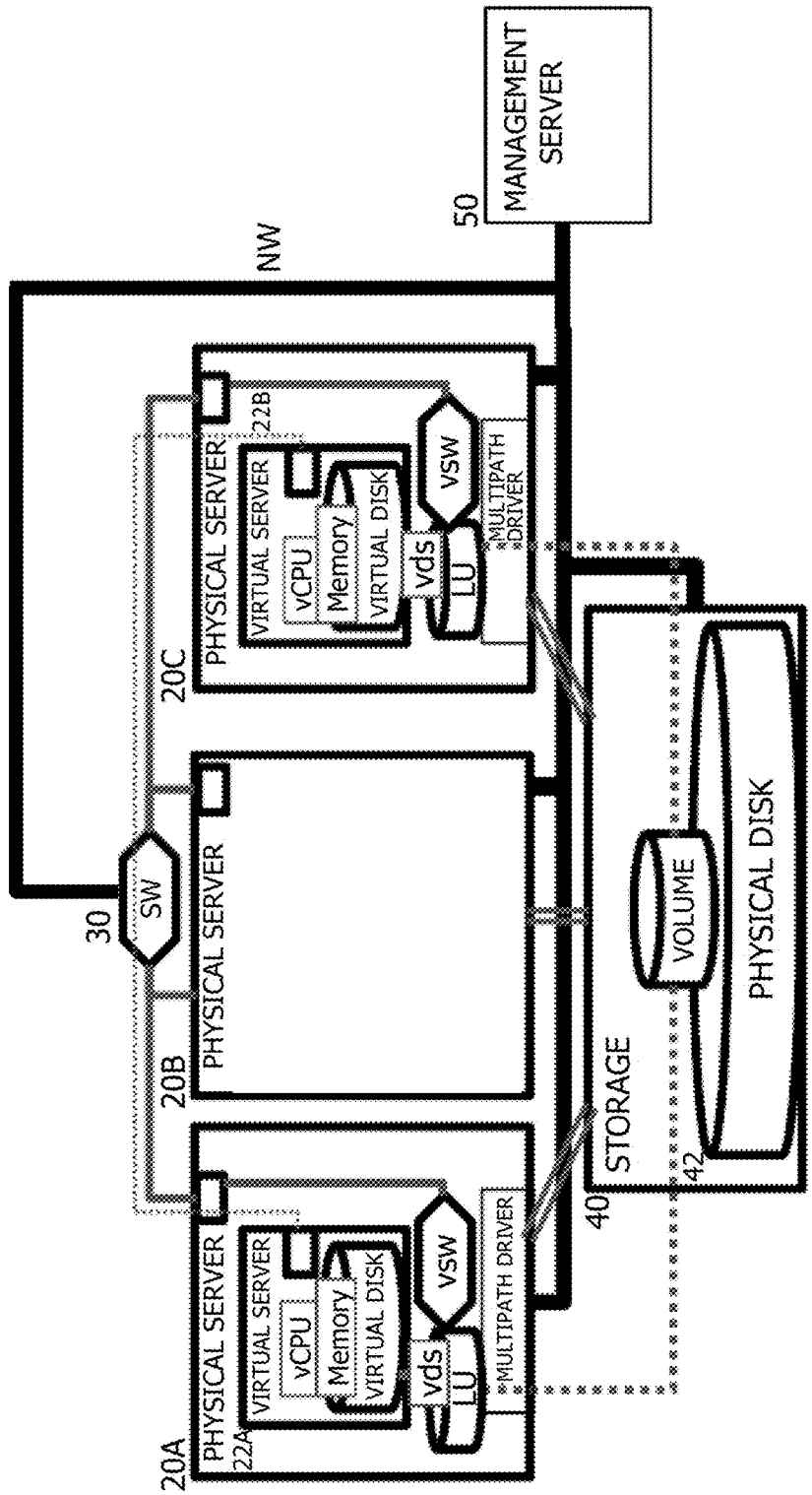
FIG. 51 illustrates a state in which the virtual server 22B (the virtual server name: Dom0002) is created in the state illustrated in FIG. 50.

The configuration definition information illustrated in FIG. 36 is information for removing the virtual server 22B (the virtual server name: Dom0002) as illustrated in FIG. 50, generating the virtual server 22B (the virtual server name: Dom0002) in a physical server 20C (the physical server name: HW004) as illustrated in FIG. 51, and constructing an environment for connecting the virtual server 22A and 22B in common to the storage device 40 (the volume name: vd-1101) in a case in which the virtual server 22A (the virtual server name: Dom0001) and the virtual server 22B (the virtual server name: Dom0002) are generated in the physical server 20A (the physical server name: HW001) and the physical server 20B (the physical server name: HW002) and an environment for connecting the virtual servers 22A and 22B in common to the storage device 40 (the volume name: vd-1101) is constructed as illustrated in FIG. 49.

Figure 49:
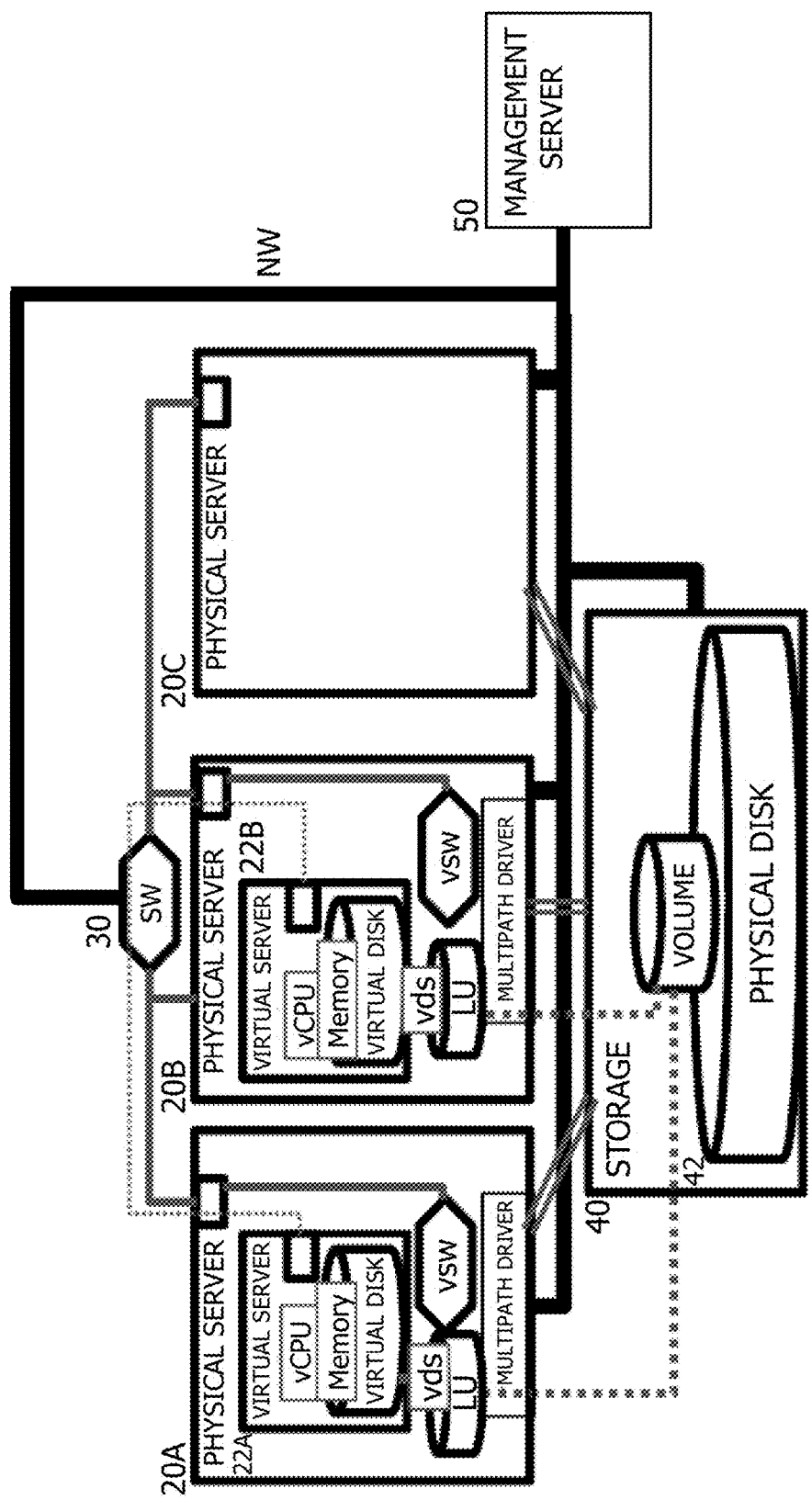
FIG. 49 illustrates a state in which the virtual server 22A (the virtual server name: Dom0001) and the virtual server 22B (the virtual server name: Dom0002) are generated in the physical server 20A (the physical server name: HW001) and the physical server 20B (the physical server name: HW002), respectively, and an environment for connecting the virtual servers 22A and 22B in common to the storage device 40 (the volume name: vd-1101) is constructed.

As illustrated in FIG. 49, in Operation Example 3, the physical server 20C is further added to the configuration illustrated in FIG. 1.

As illustrated in FIG. 36, the configuration definition information includes server configuration definition information D7, network configuration definition information D8, and storage configuration definition information D9. The pieces of configuration definition information D7 to D9 correspond to information in which "new" of the "status" in the pieces of configuration definition information D1 to D3 is replaced with "change", "HW0001" of the "physical server name" in the server configuration definition information D7 is replaced with "HW0004", "011" of the "Port" in the network configuration definition information D8 is replaced with "013", "HW0002" of the "connection destination server" in the network configuration definition information D8 is replaced with "HW0004", and "Dom0002" of the "LUN group" is replaced with "Dom0004".

Master Table

Subsequently, a specific example of the master table used in Operation Example 3 will be described. FIG. 37 illustrates a specific example of the master table used in Operation Example 3.

Hereinafter, it is assumed that the content of the work tables WT1 to WT7 (see FIG. 7) is registered in the master table MT as information indicating the present configuration (a logical configuration) of the information processing system 10.

As illustrated in FIG. 37, the master table MT includes a user table MT1B, a virtual server table MT2B, a virtual disk table MT3B, a virtual network table MT4B, a LUN table MT5B, a network configuration definition table MT6B, a volume table MT7B, and a machine type table MT8B. Since the respective items of the master tables MT (MT1B to MT7B) are the same as the respective items in the pieces of configuration definition information D7 to D9, the description thereof will be omitted.

Work Table

Next, a specific example of the work table used in Operation Example 3 will be described. FIG. 38 illustrates a specific example of the work table used in Operation Example 3.

Information for changing (deleting) the present configuration (the logical configuration) of the information processing system 10 is registered in the work table WT. Hereinafter, it is assumed that information for removing the virtual server 22B (the virtual server name: Dom0002) as illustrated in FIG. 50, generating the virtual server 22B (the virtual server name: Dom0002) in the physical server 20C (the physical server name: HW004) as illustrated in FIG. 51, and removing an environment for connecting the virtual servers 22A and 22B in common to the storage device 40 (the volume name: vd-1101) is registered in the work table WT as the information for changing (removing) the present configuration (the logical configuration) of the information processing system 10.

As illustrated in FIG. 37, the work table WT includes a user table WT1B, a virtual server table WT2B, a virtual disk table WT3B, a virtual network table WT4B, a LUN table WT5B, a network configuration definition table WT6B, and a volume table WT7B. The work tables WTs (WT1B to WT7B) are obtained by dividing the pieces of configuration definition information D7 to D9 illustrated in FIG. 36 for respective categories such as a virtual server, a virtual storage, a virtual network, a network, a storage, and the like.

Since the respective items of the work tables WTs (WT1B to WT7B) are the same as the respective items in the pieces of configuration definition information D7 to D8, the description thereof will be omitted.

Commands Generated by Management Server in Operation Example 3

The commands generated by the management server 50 in Operation Example 3 include the commands i1 to i10 (FIGS. 8 to 10) described in Operation Example 1 and the commands i11 to i19 (FIGS. 27 to 29) described in Operation Example 2.

Next, Operation Example 3 (a virtual server moving process) of the management server 50 will be described. FIGS. 39 to 43 are flowcharts for describing Operation Example 3 (a virtual server moving process) of the management server 50.

As illustrated in FIG. 39, first, a user deploys the pieces of configuration definition information D7 to D9 (see FIG. 36) in the management server 50 (step S141). Specifically, the user inputs the respective pieces of configuration definition information D7 to D9 from a terminal (not illustrated) connected to the network NW. The pieces of inputted configuration definition information D7 to D9 are transmitted to the management server 50 via the network NW and the management server 50 (the input processing unit 57) receives (acquires) the same.

Subsequently, the input processing unit 57 extracts the content (row) of which the "status" is "change" from the pieces of configuration definition information D7 to D9 and divides the same for respective categories such as a virtual server, a virtual storage, a virtual network, a network, and a storage (step S142).

Subsequently, the input processing unit 57 instructs the direct control unit 59 to register the divided pieces of configuration definition information D7 to D9 in the database 56 (the work tables WT1B to WT7B) (step S143).

Subsequently, the direct control unit 59 registers the divided pieces of configuration definition information D7 to D9 in the database 56 (the work tables WT1B to WT7B) (step S144). In this way, the contents illustrated in FIG. 38 is registered in the work tables WT1B to WT7B.

Subsequently, the collecting unit 60 reads the contents of the work tables WT1B to WT7B and the master tables MT1B to MT7B from the database 56 and transmits the contents to the command generation processing unit 58 (step S145).

Subsequently, the command generation processing unit 58 compares the work tables WT1B to WT7B and the master tables MT1B to MT7B (step S146). When the virtual server (the virtual server name: Dom0002) of the work tables WT1B to WT7B is not included in the master tables MT1B to MT7B (step S147: No), the process ends.

On the other hand, when the virtual server (the virtual server name: Dom0002) of the work table WT1b to WT7B is included in the master table MT1B to MT7B (step S147: Yes), the command generation processing unit 58 extracts information of a virtual server included in the row corresponding to the virtual server (the virtual server name: Dom0002) of the work tables WT1B to WT7B from the database 56 (the master tables MT1B to MT7B) (step S148).

Subsequently, in order to remove the virtual server (the virtual server name: Dom0002), the command generation processing unit 58 generates the commands related to virtual server removal i11 to i14 (the virtual server stop command i11, the virtual server removal command i12, the virtual disk removal command i13, and the virtual network removal command i14) on the basis of the extracted information and transmits the generated commands related to virtual server removal i11 to i14 to the direct control unit 59 (step S149).

Subsequently, the direct control unit 59 accesses the physical server 20B (the physical server name: HW002) and executes the commands related to virtual server removal i11 to i14 (step S150). Specifically, the direct control unit 59 transmits the commands related to virtual server removal i11 to i14 to the physical server 20B via the network NW. The physical server 20B receives the commands related to virtual server removal i11 to i14 and executes the commands to thereby remove the virtual server 22B (the virtual server name: Dom0002).

When removal of all virtual servers 22 is completed (step S151: Yes), the command generation processing unit 58 extracts information of a network included in the row corresponding to the virtual server (the virtual server name: Dom0002) of the work tables WT1B to WT7B from the database 56 (the master tables MT1B to MT7B) (step S152).

Subsequently, the command generation processing unit 58 generates the commands related to VLAN removal i18 to i19 of the network port of the network switch device 30 on the basis of the extracted information and transmits the commands to the direct control unit 59 (step S153).

Subsequently, the direct control unit 59 accesses the network switch device 30 and executes the commands related to VLAN removal i18 to i19 (step S154). Specifically, the direct control unit 59 transmits the commands related to VLAN removal i18 to i19 to the network switch device 30 via the network NW. The network switch device 30 (the SVP 31) receives the commands related to VLAN removal i18 to i19 and executes the commands to thereby remove the VLAN.

Subsequently, the command generation processing unit 58 generates the LUN group mapping cancel command i17 on the basis of the information extracted in step S152 and transmits the command to the direct control unit 59 (step S155).

Subsequently, the direct control unit 59 accesses the storage device 40 and executes the LUN group mapping cancel command i17 (step S156). Specifically, the direct control unit 59 transmits the LUN group mapping cancel command i17 to the storage device 40 via the network NW. The storage device 40 (the SVP 43) receives the LUN group mapping cancel command i17 and executes the command to thereby cancel the LUN group mapping.

Subsequently, the management server 50 determines whether the multipath driver of the physical server 20B is present (step S157). When the multipath driver is present (step S157: present), the command generation processing unit 58 generates the multipath driver removal command i15 on the basis of the information extracted in step S152 and transmits the command to the direct control unit 59 (step S158).

Subsequently, the direct control unit 59 accesses the physical server 20B and executes the multipath driver removal command i15 (step S159). Specifically, the direct control unit 59 transmits the multipath driver removal command i15 to the physical server 20B via the network NW. The physical server 20B receives the multipath driver removal command i15 and executes the command to thereby remove an LU from the multipath driver.

Subsequently, the command generation processing unit 58 accesses the database 56 and deletes the contents of the work tables WT1A to WT7A from the master tables MT1B to MT7B (step S160).

Subsequently, the command generation processing unit 58 extracts information of a storage from the database 56 (the work tables WT1B to WT7B) (step S161).

Subsequently, the command generation processing unit 58 generates the LUN group mapping command i8 for collaborating a volume with server connection on the basis of the extracted information and transmits the command to the direct control unit 59 (step S162).

Subsequently, the direct control unit 59 accesses the storage device 40 and executes the LUN group mapping command i8 (step S163). Specifically, the direct control unit 59 transmits the LUN group mapping command i8 to the storage device 40 via the network NW. The storage device 40 (the SVP 43) receives the LUN group mapping command i8 and executes the command to thereby create a LUN group (configures the connection with the physical server 20C (the physical server name: HW004)).

Subsequently, the management server 50 determines whether the multipath driver of the physical server 20C is present (step S164). When the multipath driver is present (step S164: present), the command generation processing unit 58 generates the multipath driver addition command i6 of the physical server 20C and transmits the command to the direct control unit 59 (step S165).

Subsequently, the direct control unit 59 accesses the physical server 20C and executes the multipath driver addition command i6 (step S166). Specifically, the direct control unit 59 transmits the multipath driver addition command i6 to the physical server 20C via the network NW. The physical server 20C receives the multipath driver addition command i6 and executes the command to thereby incorporate the LU into the multipath driver.

Subsequently, the command generation processing unit 58 extracts information of a network from the database 56 (the work tables WT1B to WT7B) (step S167).

Subsequently, the command generation processing unit 58 generates the VLAN creation command i9 and the VLAN addition command i10 for the network port of the network switch device 30 on the basis of the extracted information and transmits the commands to the direct control unit 59 (step S168).

Subsequently, the direct control unit 59 accesses the network switch device 30 and executes the VLAN creation command i9 and the VLAN addition command i10 (step S169). Specifically, the direct control unit 59 transmits the VLAN creation command i9 and the VLAN addition command i10 to the network switch device 30 via the network NW. The network switch device 30 (the SVP 31) receives the VLAN creation command i9 and the VLAN addition command i10 and executes the commands to thereby add a VLAN.

Subsequently, the command generation processing unit 58 extracts information of a virtual server from the database 56 (the work tables WT1B to WT7B) (step S170).

Subsequently, the command generation processing unit 58 generates the virtual server creation command i1, the CPU addition command i2, the Memory addition command i3, the virtual disk addition command i4, and the virtual network addition command i5 on the basis of the extracted information and transmits the commands to the direct control unit 59 (step S171).

Subsequently, the direct control unit 59 accesses the physical server 20C and executes the virtual server creation command i1, the CPU addition command i2, the Memory addition command i3, the virtual disk addition command i4, and the virtual network addition command i5 (step S172). Specifically, the direct control unit 59 transmits the virtual server creation command i1, the CPU addition command i2, the Memory addition command i3, the virtual disk addition command i4, and the virtual network addition command i5 to the server 20C via the network NW. The physical server 20C receives the virtual server creation command i1, the CPU addition command i2, the Memory addition command i3, the virtual disk addition command i4, and the virtual network addition command i5 and executes the commands to thereby add the virtual server 22B.

When creation of all virtual servers 22 is completed (step S173: Yes), the command generation processing unit 58 accesses the database 56 and inserts (registers) the contents of the work tables WT1B to WT7B in the master tables MT1B to MT7B (step S174).

Operation Example 3 of Information Processing System

Next, Operation Example 3 of the information processing system 10 will be described. FIGS. 44 to 48 are sequence diagrams for describing Operation Example 3 of the information processing system 10.

Hereinafter, a process of moving the virtual server 22B (see FIG. 49) on the physical server 20B from the physical server 20B to the physical server 20C will be described as Operation Example 3 of the information processing system 10, as illustrated in FIG. 51.

Figure 44:
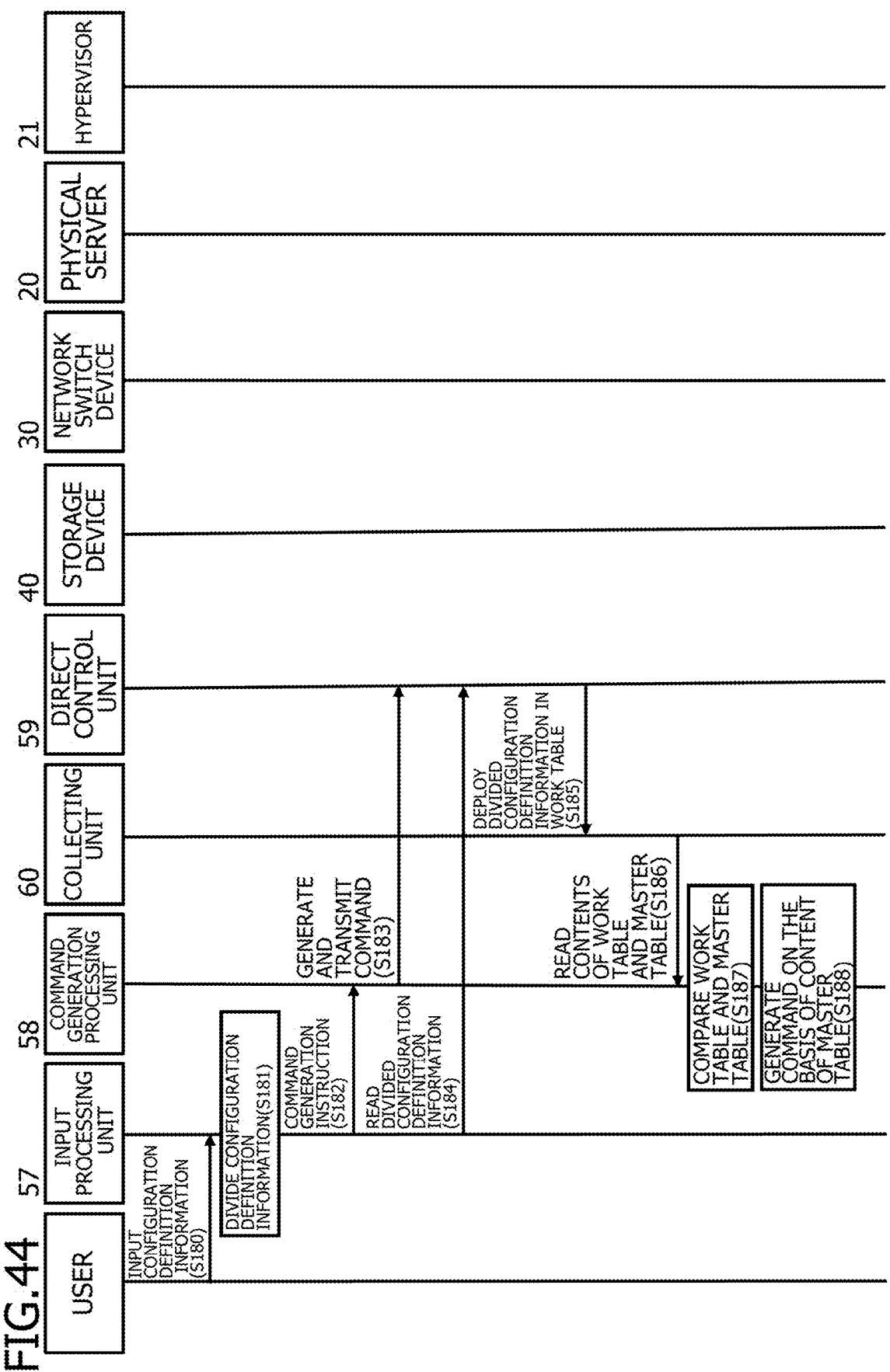
FIG. 44 is a sequence diagram for describing Operation Example 3 of the information processing system 10.

As illustrated in FIG. 44, first, a user inputs the pieces of configuration definition information D7 to D9 (see FIG. 36) (step S180). Specifically, the user inputs the respective pieces of configuration definition information D7 to D9 from a terminal (not illustrated) connected to the network NW. The pieces of configuration definition information D7 to D9 may be input from a keyboard or the like connected to the terminal and may be input by reading a file including the pieces of configuration definition information D7 to D9 into the terminal. The pieces of inputted configuration definition information D7 to D9 are transmitted to the management server 50 via the network NW and are received (acquired) by the management server 50 (the input processing unit 57).

Subsequently, the input processing unit 57 divides the pieces of configuration definition information D7 to D9 (step S181). Specifically, the input processing unit 57 extracts a content (row) of which the "status" is "change" from the pieces of configuration definition information D7 to D9 and divides the extracted content for respective categories such as a virtual server, a virtual storage, a virtual network, a network, a storage, and the like.

Subsequently, the input processing unit 57 instructs the command generation processing unit 58 to generate a command for registering the divided pieces of configuration definition information D7 to D9 in the database 56 (the work tables WT1B to WT7B) (step S182).

Subsequently, the command generation processing unit 58 generates a command for registering the divided pieces of configuration definition information D7 to D9 in the database 56 (the work tables WT1B to WT7B) and transmits the command to the direct control unit 59 (step S183).

Subsequently, the direct control unit 59 reads the divided pieces of configuration definition information D7 to D9 from the input processing unit 57 (step S184).

Subsequently, the direct control unit 59 registers the read divided pieces of configuration definition information D7 to D9 in the database 56 (the work tables WT1B to WT7B) (step S185). In this way, the contents illustrated in FIG. 38 are registered in the work tables WT1B to WT7B.

Subsequently, the collecting unit 60 reads the contents of the work tables WT1B to WT7B and the master tables MT1B to MT7B from the database 56 and transmits the contents to the command generation processing unit 58 (step S186).

Subsequently, the command generation processing unit 58 compares the work tables WT1B to WT7B and the master tables MT1B to MT7B (step S187). When the virtual server (the virtual server name: Dom0002) of the work tables WT1B to WT7B is included in the master tables MT1B to MT7B, the command generation processing unit 58 generates the commands i11 to i19 on the basis of the content of the master tables MT1B to MT7B (the content of a row corresponding to the virtual server (the virtual server name: Dom0002) of the master tables MT1B to MT7B) (step S188). That is, the command generation processing unit 58 generates the commands i11 to i19 in which the content of the master tables MT1B to MT7B (the content of a row corresponding to the virtual server (the virtual server name: Dom0002) of the master tables MT1B to MT7B) is applied.

Specific Example of Virtual Server Stop Command i11

First, the command generation processing unit 58 generates commands related to virtual server removal (the virtual server stop command i11, the virtual server removal command i12, the virtual disk removal command i13, and the virtual network removal command i14) on the basis of the content of the master tables MT1B to MT7B (the content of a row corresponding to the virtual server (the virtual server name: Dom0002) of the master tables MT1B to MT7B).

The management user name (for example, root) of the management server 50 is set in the portion "management user" in the virtual server stop command i11 (see FIG. 27). The "physical server name (HW002)" in the virtual server table MT2B is set in the portion "physical server name". The "virtual server name (Dom0002)" in the virtual server table MT2B is set in the portion "virtual server name".

As a result, the following command is generated as the virtual server stop command i11.
  ssh <root>@<HW002> ldm stop-domain <Dom0002>

Specific Example of Virtual Server Removal Command i12

The same contents as those described in the virtual server stop command i11 are set in the portion "management user", the portion "physical server name", and the portion "virtual server name" in the virtual server removal command i12 (see FIG. 27).

As a result, the following command is set as the virtual server removal command i12.
  ssh <root>@<HW002> ldm remove-domain <Dom0002>

Specific Example of Virtual Disk Removal Command i13

The same contents as those described in the virtual server stop command i11 are set in the portion "management user" and the portion "physical server name" in the virtual disk removal command i13 (see FIG. 27). The "Disk name (vd-1101)" in the virtual disk table MT3B is set in the portion "virtual disk name". A default name is set in the portion "virtual disk service name".

As a result, the following command is generated as the virtual disk removal command i13.
  ssh <root>@<HW002> ldm remove-vdsdev <vd-1101>@<default name>

Specific Example of Virtual Network Removal Command i14

The same contents as those of the virtual server stop command i11 are set in the portion "management user", the portion "physical server name", and the portion "virtual server name" in the virtual network removal command i14 (see FIG. 27). The "port name (Vnet001)" in the virtual network table MT4B is set in the portion "virtual network port name".

As a result, the following command is generated as the virtual network removal command i14.
  ssh <root>@<HW002> ldm remove-vnet<Vnet001> <Dom0002>

Figure 45:
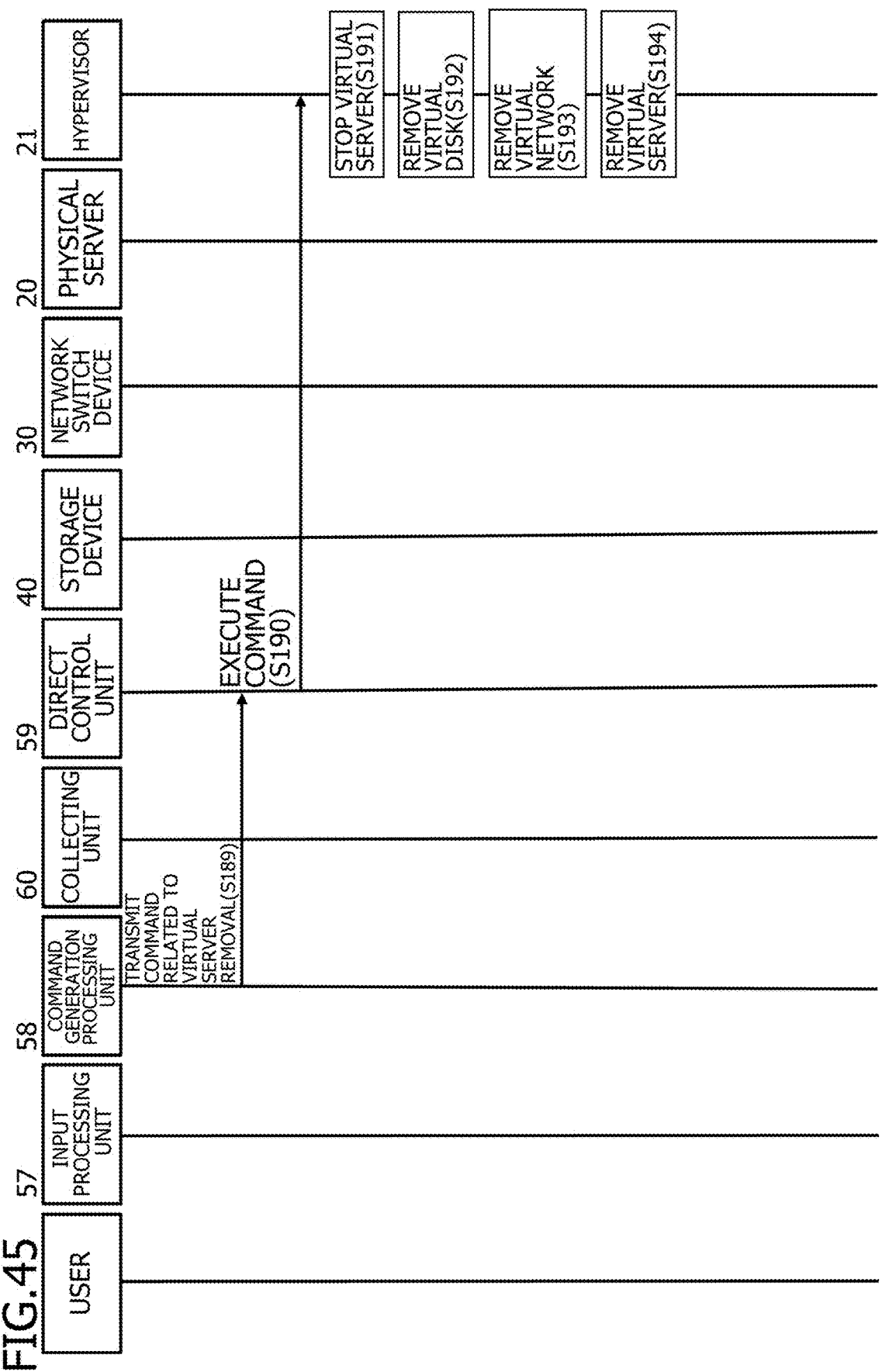
FIG. 45 is a sequence diagram for describing Operation Example 3 of the information processing system 10.

Subsequently, as illustrated in FIG. 45, the command generation processing unit 58 transmits the commands related to virtual server removal i11 to i14 to the direct control unit 59 (step S189).

Subsequently, the direct control unit 59 accesses the physical server 20B and executes the commands related to virtual server removal i11 to i14 (step S190). Specifically, the direct control unit 59 transmits the commands related to virtual server removal i11 to i14 to the physical server 20B using an IP address correlated with the "physical server name (HM002)" in the commands related to virtual server removal i11 to i14.

Subsequently, the physical server 20B (the NIC 20d) receives the commands related to virtual server removal i11 to i14 transmitted from the management server 50 via the network NW. The physical server 20B (the hypervisor 21B) executes the commands related to virtual server removal i11 to i14 received from the management server 50 to thereby execute a process (step S191) of stopping the virtual server 22, a process (step S192) of removing the virtual disk, a process (step S193) of removing the virtual network, and a process (step S194) of removing the virtual server. Furthermore, the physical server 20B (the hypervisor 21B) may execute a process of deleting the virtual server definition table T1 stored in the memory included in the SVP 23B.

Specific Example of VLAN Removal Command i18

Figure 46:
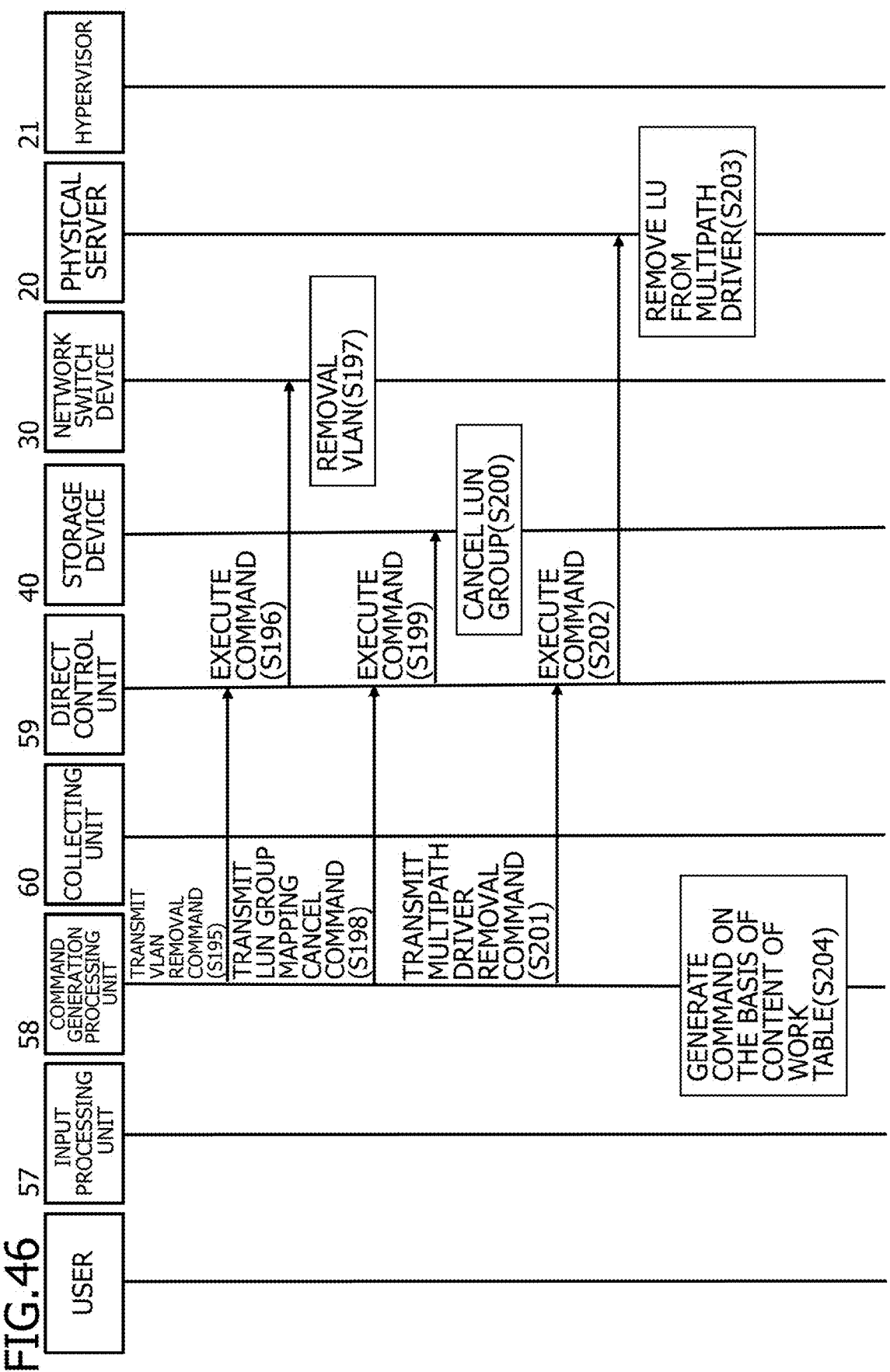
FIG. 46 is a sequence diagram for describing Operation Example 3 of the information processing system 10.
Figure 47:
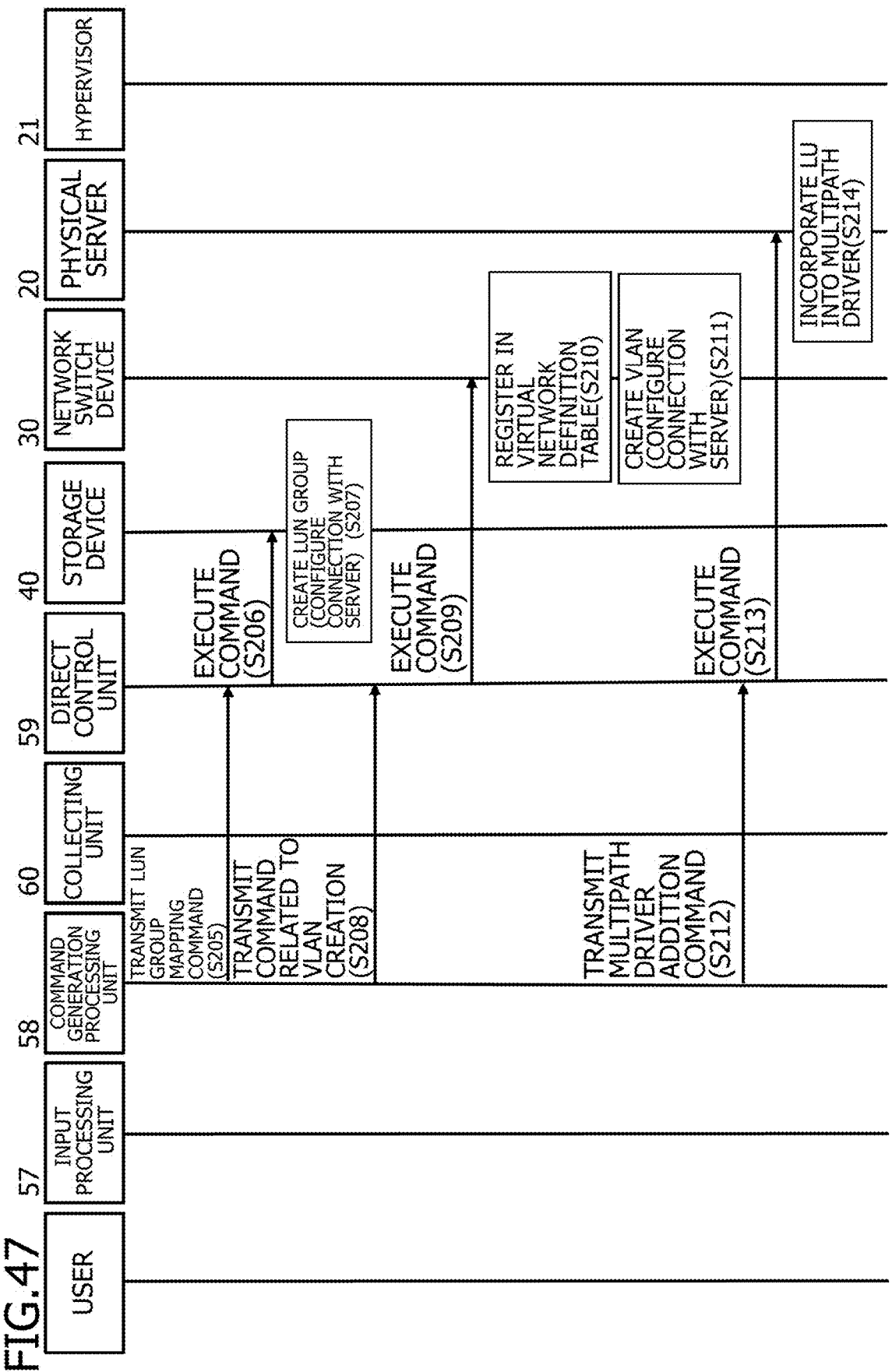
FIG. 47 is a sequence diagram for describing Operation Example 3 of the information processing system 10.

Subsequently, as illustrated in FIG. 46, the command generation processing unit 58 generates the commands related to VLAN removal (the VLAN removal command i18 and the VLAN removal command i19) on the basis of the content of the master tables MT1B to MT7B (the content of the row corresponding to the virtual server (the virtual server name: Dom0002) of the work tables WT1B to WT7B) and transmits the commands related to VLAN removal i18 and i19 to the direct control unit 59 (step S195).

The management user name (for example, root) of the network switch device 30 is set in the "management user" in the VLAN removal command i18 (see FIG. 29). The "switch name (Nex2)" in the network configuration definition table MT6B is set in the portion "network switch name". The "VLAN (1101)" in the network configuration definition table MT6B is set in the portion "VLAN ID".

As a result, the following command is generated as the VLAN removal command i18.
  ssh <root>@<Nex2> no vlan <1101>

Specific Example of VLAN Removal Command i19

The same contents as those of the VLAN removal command i18 are set in the portion "management user", the portion "network switch name", and the portion "VLAN ID" in the VLAN removal command i19 (see FIG. 29). The "port (011)" in the network configuration definition table MT6B is set in the portion "port".

As a result, the following three commands are generated as the VLAN removal command i19.

(1) ssh <root>@<Nex2> interface <011>

(2) ssh <root>@<Nex2> switch mode trunk (3) ssh <root>@<Nex2> switch trunk allowed vlan remove <1101>

Subsequently, returning to FIG. 46, the direct control unit 59 accesses the network switch device 30 and executes the commands related to VLAN removal i18 and i19 (step S196). Specifically, the direct control unit 59 transmits the commands related to VLAN removal i18 and i19 to the network switch device 30 using an IP address correlated with the "network switch name (Nex2)" in the commands related to VLAN removal i18 and i19.

Subsequently, the network switch device 30 (the SVP 31) receives the commands related to VLAN removal i18 and i19 transmitted from the management server 50 via the network NW and executes the commands related to VLAN removal i18 and i19 to thereby remove the VLAN (step S197). Furthermore, the network switch device 30 (the SVP 31) may execute a process of deleting the virtual network definition table T3 stored in the memory included in the SVP 31.

Specific Example of LUN Group Mapping Cancel Command i17

Subsequently, the command generation processing unit 58 generates the LUN group mapping cancel command i17 and transmits the command to the direct control unit 59 (step S198).

The same contents as those described in the volume deletion command i16 are set in the portion "management user" and the portion "storage device name" in the LUN group mapping cancel command i17 (see FIG. 28). The "LUN group name (Dom0003)" in the LUN table MT5B is set in the portion "LUN group name". The "LUN number (1101)" in the LUN table MT5B is set in the portion "lun number".

As a result, the following command is generated as the LUN group mapping cancel command i17.

ssh <root>@<ET200-1> delete lun-group ?Ig-name <Dom0003>-lun<1101>

Subsequently, returning to FIG. 46, the direct control unit 59 accesses the storage device 40 and executes the LUN group mapping cancel command i17 (step S199). Specifically, the direct control unit 59 transmits the LUN group mapping cancel command i17 to the storage device 40 using an IP address correlated with the "storage device name (ET200-1)" in the LUN group mapping cancel command i17.

Subsequently, the storage device 40 (the SVP 43) receives the LUN group mapping cancel command i17 transmitted from the management server 50 via the network NW and executes the received LUN group mapping cancel command i17 to thereby cancel the LUN group (step S200). Furthermore, the storage device 40 (the SVP 43) may execute a process of deleting the disk-and-server connection definition table T2 stored in the memory included in the SVP 43.

Specific Example of Multipath Driver Removal Command i15

Subsequently, the command generation processing unit 58 generates the multipath driver removal command i15 and transmits the command to the direct control unit 59 (step S201).

The same contents as those described in the virtual server stop command i11 are set in the portion "management user" and the portion "physical server name" in the multipath driver removal command i15 (see FIG. 27).

As a result, the following command is generated as the multipath driver removal command i15.

ssh <root>@<HW002> grmpdautoconf

Subsequently, returning to FIG. 46, the direct control unit 59 accesses the physical server 20 and executes the multipath driver removal command i15 (step S202). Specifically, the direct control unit 59 transmits the multipath driver removal command i15 to the physical server 20B using an IP address correlated with the "physical server name (HM002)" in the multipath driver removal command i15.

Subsequently, the physical server 20B receives the multipath driver removal command i15 transmitted from the management server 50 via the network NW and executes the received multipath driver removal command i15 to thereby remove the LU (or LUN) from the multipath driver (step S203).

Subsequently, the command generation processing unit 58 generates the commands i11 to i19 on the basis of the contents of the work tables WT1B to WT7B (step S204). That is, the command generation processing unit 58 generates the commands i11 to i19 in which the contents of the work tables WT1B to WT7B are set (applied).

Specific Example of LUN Group Mapping Command i8

Subsequently, the command generation processing unit 58 generates the LUN group mapping command i8 and transmits the command to the direct control unit 59 (step S205).

The management user name (for example, root) of the storage device 40 is set in the portion "management user" in the LUN group mapping command i8 (see FIG. 9). The "housing name (ET200-1)" in the volume table WT7B is set in the portion "storage device name". The "LUN group name (Dom0003)" in the LUN table WT5B is set in the portion "LUN group name". The "vol name (vd-1101)" in the LUN table WT5B is set in the portion "volume name". The "LUN number (1101)" in the LUN table WT5B is set in the portion "lun number".

As a result, the following command is generated as the LUN group mapping command i8.

ssh <root>@<ET200-1> set lun-group-Ig-name <Dom0003>-volume-name<vd-1101>-lun <1101>

Subsequently, returning to FIG. 47, the direct control unit 59 accesses the storage device 40 and executes the LUN group mapping command i8 (step S206). Specifically, the direct control unit 59 transmits the LUN group mapping command i8 to the storage device 40 using an IP address correlated with the "storage device name (ET200-1)" in the LUN group mapping command i8.

Subsequently, the storage device 40 (the SVP 43) executes a process of receiving the LUN group mapping command i8 transmitted from the management server 50 via the network NW and a process of registering the data in the disk-and-server connection definition table T2 stored in the memory included in the SVP 43.

The storage device 40 (the SVP 43) executes the LUN group mapping command i8 received from the management server 50 to thereby create a LUN group (the LUN group name: Dom0003) (configure the connection with the physical server 20C) (step S207).

Specific Example of VLAN Creation Command i9

Subsequently, the command generation processing unit 58 generates commands related to VLAN creation (the VLAN creation command i9 and the VLAN addition command i10) and transmits the commands related to VLAN creation i9 and i10 to the direct control unit 59 (step S208).

The management user name (for example, root) of the network switch device 30 is set in the portion "management user" in the VLAN creation command i9 (see FIG. 10). The "switch name (Nex2)" in the network configuration definition table WT6B is set in the portion "network switch name". The "VLAN (1101)" in the network configuration definition table WT6B is set in the portion "VLAN ID".

As a result, the following command is generated as the VLAN creation command i9.

ssh <root>@<Nex2> vlan <1101>

Specific Example of VLAN Addition Command i10

The same contents as those described in the VLAN creation command i9 are set in the portion "management user" and the portion "network switch name" in the VLAN creation command i9 (see FIG. 10). Moreover, the "port (013)" in the network configuration definition table WT6B is set in the portion "port".

As a result, the following three commands are generated as the VLAN addition command i10.

(1) ssh <root>@<Nex2> interface <013>
(2) ssh <root>@<Nex2> switch mode trunk
(3) ssh <root>@<Nex2> switch trunk allowed vlan add <1101>

Subsequently, returning to FIG. 47, the direct control unit 59 accesses the network switch device 30 and executes commands related to VLAN creation i9 and i10 (step S209). Specifically, the direct control unit 59 transmits the commands related to VLAN creation i9 and i10 to the network switch device 30 using an IP address correlated with the "network switch name (Nex2)" in the commands related to VLAN creation i9 and i10.

Subsequently, the network switch device 30 (the SVP 31) executes a process of receiving the commands related to VLAN creation i9 and i10 transmitted from the management server 50 via the network NW and a process of registering the data in the virtual network definition table T3 stored in the memory included in the SVP 31 (step S210).

The network switch device 30 (the SVP 31) executes the commands related to VLAN creation i9 and i10 received from the management server 50 to thereby create a VLAN (configure the connection with the physical server 20C) (step S211).

Specific Example of Multipath Driver Addition Command i6

Subsequently, when the multipath driver is present in the physical server 20C, the command generation processing unit 58 generates the multipath driver addition command i6 of the physical server 20C and transmits the command to the direct control unit 59 (step S212).

The management user name (for example, root) of the physical server 20 is set in the portion "management user" in the multipath driver addition command i6 (see FIG. 8). The "physical server name (HM004)" in the virtual server table WT2B is set in the portion "physical server name".

As a result, the following command is generated as the multipath driver addition command i6.

ssh <root>@<HW004> grmpdautoconf

Subsequently, returning to FIG. 47, the direct control unit 59 accesses the physical server 20C and executes the multipath driver addition command i6 (step S213). Specifically, the direct control unit 59 transmits the multipath driver addition command i6 to the physical server 20C using an IP address correlated with the "physical server name (HM004)" in the multipath driver addition command i6.

Subsequently, the physical server 20C executes a process of receiving the multipath driver addition command i6 from the management server 50 via the network NW (for example, the NIC 20d receives the command) and a process of registering the data in the virtual server definition table T1 stored in the memory included in the SVP 23 (for example, the hypervisor 21 causes the SVP 23 to register the data) (step S214). Specifically, when the multipath driver is present in the physical server 20C, "present" is registered in the "multipath" in the virtual server definition table T1 (see FIG. 23).

The physical server 20C executes the multipath driver addition command i6 received from the management server 50 (for example, the hypervisor 21 executes the command) to thereby incorporate an LU into the multipath driver (step S214).

Figure 48:
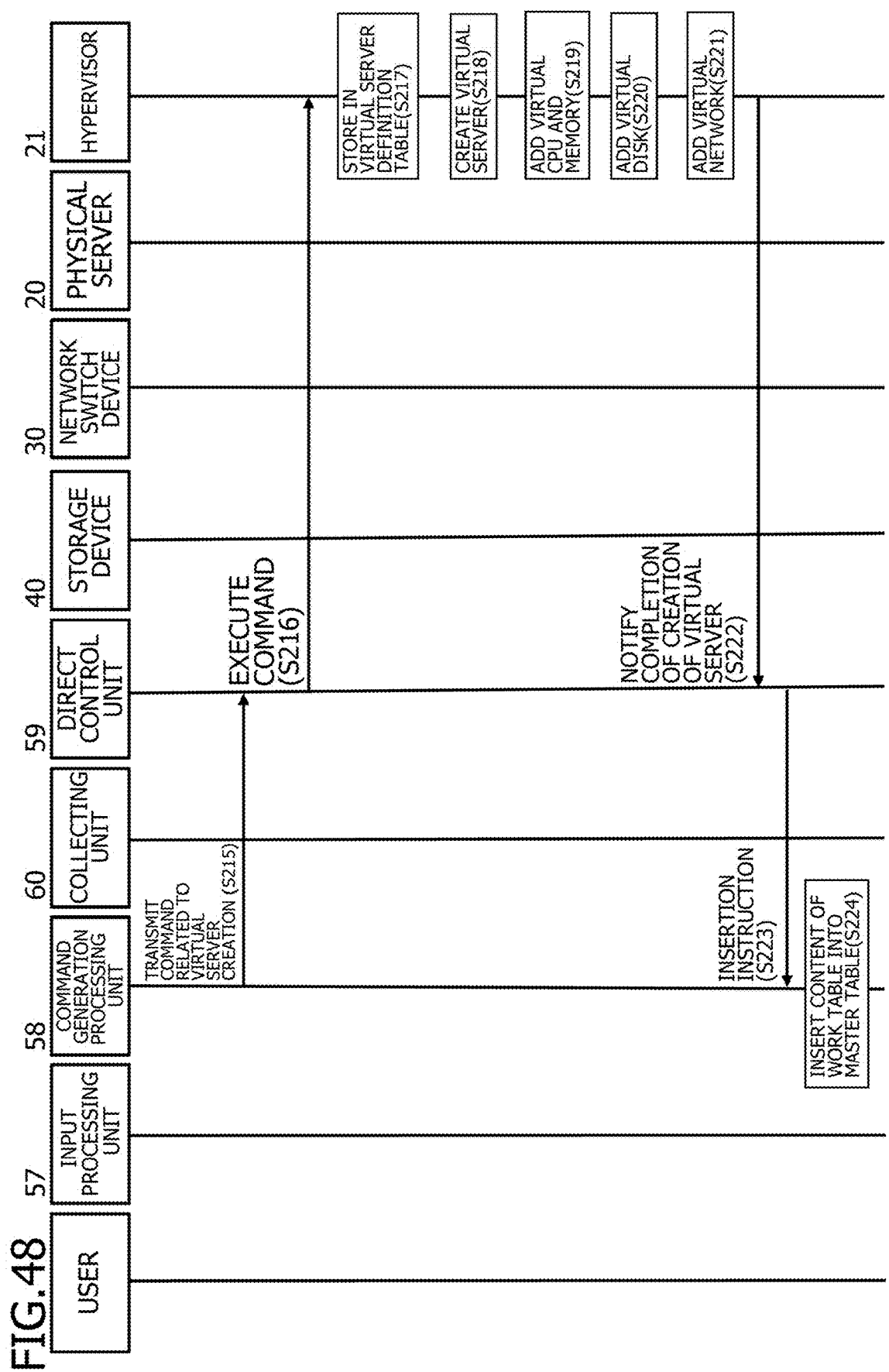
FIG. 48 is a sequence diagram for describing Operation Example 3 of the information processing system 10.

Subsequently, as illustrated in FIG. 48, the command generation processing unit 58 generates commands related to virtual server creation (the virtual server creation command i1, the CPU addition command i2, the Memory addition command i3, the virtual disk addition command i4, and the virtual network addition command i5) and transmits the commands related to virtual server creation i1 to i5 to the direct control unit 59 (step S215).

Specific Example of Virtual Server Creation Command i1

The management user name (for example, root) of the management server 50 is set in the portion "management user" in the virtual server creation command i1 (see FIG. 8). The "physical server name (HM004)" in the virtual server table WT2B is set in the portion "physical server name". The "virtual server name (Dom0002)" in the virtual server table WT2B is set in the portion "virtual server name".

As a result, the following command is generated as the virtual server creation command i1.

ssh <root>@<HW004> ldm add-domain <Dom0002>

Specific Example of CPU Addition Command i2

The management user name (for example, root) of the management server 50 is set in the portion "management user" in the virtual server creation command i1 (see FIG. 8). The "physical server name (HM004)" in the virtual server table WT2B is set in the portion "physical server name". The "virtual server name (Dom0002)" in the virtual server table WT2B is set in the portion "virtual server name". The "number of CPUs" in the machine type table MT8B corresponding to the "type" the same as the "machine type" in the virtual server table WT2B is set in the portion "number of cores". For example, as illustrated in FIG. 38, when the "machine type" in the work table WT2B is 2, the "number of CPUs (in this example, 4)" in the machine type table MT8B corresponding to the "type (in this example, 2)" the same as the "machine type (in this example, 2)" in the virtual server table WT2B is set in the "number of cores".

As a result, the following command is generated as the CPU addition command i2.

ssh <root>@<HWO04> Idm set-core <4> <Dom0002>

Specific Example of Memory Addition Command i3

The management user name (for example, root) of the management server 50 is set in the portion "management user" in the Memory addition command i3 (see FIG. 8). The "physical server name (HM004)" in the virtual server table WT2B is set in the portion "physical server name". The "Memory capacity" in the machine type table MT8B corresponding to the "type" the same as the "machine type" in the virtual server table WT2B is set in the portion "capacity". For example, as illustrated in FIG. 6, when the "machine type" in the work table WT2B is 2, the "Memory capacity (in this example, 64 GB)" in the machine type table MT8B corresponding to the "type (in this example, 2)" the same as the "machine type (in this example, 2)" in the virtual server table WT2B is set in the portion "capacity". The "virtual server name (Dom0002)" in the virtual server table WT2B is set in the portion "virtual server name".

As a result, the following command is generated as the Memory addition command i3.

ssh <root>@<HWO04> Idm set-memory <4> <Dom0002>

Specific Example of Virtual Disk Addition Command i4

The management user name (for example, root) of the management server 50 is set in the portion "management user" in the virtual disk addition command i4 (see FIG. 8). The "physical server name (HM004)" in the virtual server table WT2 is set in the portion "physical server name". The "Lun number (1101)" in the virtual disk table WT3 is set in the portion "LUN". The "Disk name (vd-1101)" in the virtual disk table WT3 is set in the portion "virtual disk name". A default name is set in the portion "virtual disk service name". The "virtual server name (Dom0002)" in the virtual disk table WT3 is set in the portion "virtual server name".

As a result, the following two commands are generated as the virtual disk addition command i4.

(1) ssh <root>@<HWO04> Idm add-vdsdev <1101> <vd-1101>@<default name>

(2) ssh <root>@<HWO04> Idm add-vdisk <vd-1101> <vd-1101>@<default name> <Dom0002>

Specific Example of Virtual Network Addition Command i5

The management user name (for example, root) of the physical server 20C is set in the portion "management user" in the virtual network addition command i5 (see FIG. 8). The "physical server name (HW004)" in the virtual server table WT2B is set in the portion "physical server name". The "VLAN (1101)" in the virtual network table WT4B is set in the portion "VLAN ID". The "port name (Vnet001)" in the virtual network table WT4B is set in the portion "virtual network port name". The "virtual switch name (VNex2)" in the network configuration definition table WT6B is set in the portion "virtual switch name". The "virtual server name (Dom0002)" in the virtual network table WT4 is set in the portion "virtual server name".

As a result, the following command is generated as the virtual network addition command i5.

ssh <root>@<HWO04> Idm add-vnet pvid=<1101> <Vnet001> <VNex2> <Dom0002>

Subsequently, returning to FIG. 48, the direct control unit 59 accesses the physical server 20C and executes the commands related to virtual server creation i1 to i5 (step S216). Specifically, the direct control unit 59 transmits the commands related to virtual server creation i1 to i5 to the physical server 20C using an IP address correlated with the "physical server name (HW004)" in the commands related to virtual server creation i1 to i5.

Subsequently, the physical server 20C executes a process of receiving the commands related to virtual server creation i1 to i5 transmitted from the management server 50 via the network NW (for example, the NIC 20d receives the commands) and a process of registering the data in the virtual server definition table T1 stored in the memory included in the SVP 23 (for example, the hypervisor 21 causes the SVP 23 to register the data) (step S217).

The physical server 20 (the hypervisor 21) executes the commands related to virtual server creation i1 to i5 received from the management server 50 to thereby create the virtual server 22 (a virtual CPU, a memory, a virtual disk, a virtual network, and the like) (steps S218 to S221).

When the creation of the virtual servers is completed, the physical server 20C (the hypervisor 21 or the SVP 23) notifies the direct control unit 59 of completion of creation of the virtual servers (step S222).

Subsequently, the command generation processing unit 58 accesses the database 56 according to an instruction (step S223) of the direct control unit 59 and inserts the contents of the work tables WT1B to WT7B into the master tables MT1B to MT7B (step S224).

As described above, according to Operation Example 3, it is possible to move the virtual server 22 from a certain physical server to another physical server by the creation commands i1 to i10 for virtual servers and the like and the removal commands i11 to i17 for virtual servers and the like. In this case, since volumes are not deleted (see FIG. 51), it is possible to move virtual servers between physical servers quickly.

As described above, according to the present embodiment, it is possible to provide an information processing system capable of changing a system configuration dynamically and suppressing an identical configuration that does not change before and after the system configuration is changed from being changed wastefully and to provide a management device and a method for controlling the information processing system.

This results from the fact that the creation commands i1 to i10 for virtual servers and the like are generated on the basis of the difference information (for example, the contents of the work tables WT1 to WT7) which is a difference between the work tables WT1 to WTA and the master tables MT1 to MT7.

According to the present embodiment, by managing the resources of physical devices (a physical server, a storage device, and a network switch device) and the connection configurations in a correlated manner, it is possible to construct a virtual resource system in which the contents of the resources of the physical devices and the connection configurations are applied. In this way, the following advantages are obtained.

Firstly, since respective devices and the arrangement and the connection configuration of resources can be controlled directly, it is possible to construct a distributed configuration of a plurality of virtual servers, a shared disk connection configuration, and a dedicated interconnect network configuration, as needed for a cluster system.

Secondly, it is possible to construct and provide a system that is independent of a server, a storage, and a network of other systems. As a result, it is possible to secure independence from other servers, of a server device on which server resources of a system to be constructed operate and to manage software licenses dependent on each server device.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing system comprising:
a plurality of electronic devices each including a processing unit that changes a configuration of a device, in which the processing unit itself is included, on the basis of received control information; and
a management device that manages the plurality of electronic devices, each of the plurality of electronic devices includes:
a plurality of information processing devices that execute virtual machines, respectively; and
a storage device that can be shared from the plurality of information processing devices, and the management device includes:
a collecting unit that collects present configuration information of the information processing system from the plurality of electronic devices;
a storage unit that stores first configuration definition information indicating a present configuration of the information processing system on the basis of the configuration information collected by the collecting unit and second configuration definition information indicating a configuration after changing of the information processing system; and
a control unit that generates first control information to the effect that the plurality of information processing devices are connected in common to the storage device and second control information to the effect that the plurality of information processing devices are not connected in common to the storage device according to a determination result on whether the plurality of virtual machines share the storage device on the basis of difference information which is a difference between the first configuration definition information and the second configuration definition information and transmits the generated control information to the processing unit included in the storage device and the processing unit included in each of the plurality of information processing devices.

2. The information processing system according to claim 1, wherein each of the plurality of electronic devices includes:
a plurality of information processing devices that execute virtual machines, respectively; and
a communication device that can be connected to the plurality of information processing devices, and
on the basis of the difference information and according to a determination result on whether the plurality of virtual machines are connected via the communication device, the control unit generates control information to the effect that the plurality of information processing devices are connected via a virtual switch allocated to the communication device and transmits the generated control information to a processing unit included in the communication device and the processing unit included in each of the plurality of information processing devices.

3. The information processing system according to claim 1, wherein each of the plurality of electronic devices includes:
a plurality of information processing devices that execute virtual machines, respectively; and
a communication device that can be connected to the plurality of information processing devices, and
on the basis of the difference information and according to a determination result on whether the plurality of virtual machines are connected via the communication device, the control unit generates control information to the effect that the plurality of information processing devices are connected via a virtual switch allocated to the communication device and transmits the generated control information to a processing unit included in the communication device and the processing unit included in each of the plurality of information processing devices.

4. The information processing system according to claim 1, wherein the generated control information is control information for generating a configuration indicated by the difference information, within the configuration after the change of the information processing system.

5. An information processing system comprising:
a plurality of electronic devices each including a processing unit that changes a configuration of a device, in which the processing unit itself is included, on the basis of received control information; and
a management device that manages the plurality of electronic devices, each of the plurality of electronic devices includes:
a plurality of information processing devices that execute virtual machines, respectively; and
a storage device that can be shared from the plurality of information processing devices, and
the management device includes:
a storage unit that stores first configuration definition information indicating a present configuration of the information processing system and second configuration definition information indicating a configuration after changing of the information processing system;
a control information generating unit that generates first control information to the effect that the virtual machines executed by the plurality of information processing devices are connected in common to the storage device and second control information to the effect that the virtual machines executed by the plurality of information processing devices are not connected in common to the storage device according to a determination result on whether the plurality of virtual machines share the storage device on the basis of difference information which is a difference between the first configuration definition information and the second configuration definition information; and a control unit that transmits the control information generated by the control information generating unit to the processing unit included in the storage device and the processing unit included in each of the plurality of information processing devices.

6. The information processing system according to claim 5, wherein each of the plurality of electronic devices includes:

a plurality of information processing devices that execute virtual machines, respectively; and a communication device that can be connected to the plurality of information processing devices, the control information generating unit generates control information to the effect that the virtual machines executed by the plurality of information processing devices are connected via a virtual switch on the basis of the difference information, and the control unit transmits the control information generated by the control information generating unit to a processing unit included in the communication device and the processing unit included in each of the plurality of information processing devices.

7. The information processing system according to claim 5, wherein each of the plurality of electronic devices includes:

a plurality of information processing devices that execute virtual machines, respectively; and a communication device that can be connected to the plurality of information processing devices, the control information generating unit generates control information to the effect that the virtual machines executed by the plurality of information processing devices are connected via a virtual switch on the basis of the difference information, and the control unit transmits the control information generated by the control information generating unit to a processing unit included in the communication device and the processing unit included in each of the plurality of information processing devices.

8. The information processing system according to claim 5, wherein the generated control information is control information for generating a configuration indicated by the difference information, within the configuration after the change of the information processing system.

9. A method of controlling an information processing system, the method comprising:

collecting present configuration information of the information processing system from a plurality of electronic devices, the information processing system including the plurality of electronic devices each including a processing unit that changes a configuration of a device, in which the processing unit itself is included, on the basis of received control information and a management device that manages the plurality of electronic devices, and each of the plurality of electronic devices including a plurality of information processing devices that execute virtual machines, respectively, and a storage device that can be shared from the plurality of information processing devices;

storing, in a storage unit, first configuration definition information indicating a present configuration of the information processing system on the basis of the collected configuration information and second configuration definition information indicating a configuration after changing of the information processing system; and generating first control information to the effect that the plurality of information processing devices are connected in common to the storage device and second control information to the effect that the plurality of information processing devices are not connected in common to the storage device according to a determination result on whether the plurality of virtual machines share the storage device on the basis of difference information which is a difference between the first configuration definition information and the second configuration definition information and transmitting the generated control information to the processing unit included in the storage device and the processing unit included in each of the plurality of information processing devices.

* * * * *